US010642449B2

(12) United States Patent
Clarke

(10) Patent No.: US 10,642,449 B2
(45) Date of Patent: May 5, 2020

(54) IDENTIFYING APPLICATIONS ON WHICH CONTENT IS AVAILABLE

(71) Applicant: Apple Inc., Cupertino, CA (US)

(72) Inventor: Graham R. Clarke, Mountain View, CA (US)

(73) Assignee: Apple Inc., Cupertino, CA (US)

(*) Notice: Subject to any disclaimer, the term of this patent is extended or adjusted under 35 U.S.C. 154(b) by 310 days.

(21) Appl. No.: 15/272,393

(22) Filed: Sep. 21, 2016

(65) Prior Publication Data

US 2017/0357387 A1 Dec. 14, 2017

Related U.S. Application Data

(60) Provisional application No. 62/348,976, filed on Jun. 12, 2016.

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/016* (2013.01); *G06F 3/0414* (2013.01);
(Continued)

(58) Field of Classification Search
CPC ... G06F 8/61; G06F 8/65; G06F 21/10; G06F 21/51; G06F 21/53; G06F 21/6218; G06F 3/017
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 2 642 402 A2 | 9/2013 |
| EP | 2 672 703 A1 | 12/2013 |

(Continued)

OTHER PUBLICATIONS

International Search Report dated Jul. 13, 2017, for PCT Application No. PCT/US2017/029448, four pages.

(Continued)

*Primary Examiner* — Claudia Dragoescu
(74) *Attorney, Agent, or Firm* — Kubota & Basol LLP

(57) ABSTRACT

In some embodiments, an electronic device receives an input corresponding to a request for information about a user-specified topic. In response, the electronic device displays information about media that is relevant to the user-specified topic, including concurrently displaying: a representation of respective media that is available for viewing on a first set of applications, the electronic device having a second set of applications downloaded on it, and a respective selectable user interface element associated with the respective media. In some embodiments, if the second set of applications includes at least one application in the first set of applications, the respective selectable user interface element is selectable to initiate a process for launching a respective application of the first set of applications.

87 Claims, 53 Drawing Sheets

(51) Int. Cl.
| | |
|---|---|
| *H04N 21/482* | (2011.01) |
| *H04N 21/431* | (2011.01) |
| *H04N 21/81* | (2011.01) |
| *G06F 3/01* | (2006.01) |
| *G06F 3/041* | (2006.01) |
| *G06F 3/0488* | (2013.01) |
| *G06F 3/16* | (2006.01) |

(52) U.S. Cl.
CPC .......... *G06F 3/04883* (2013.01); *G06F 3/167* (2013.01); *H04N 21/431* (2013.01); *H04N 21/482* (2013.01); *H04N 21/8173* (2013.01); *G06F 2203/0383* (2013.01); *G06F 2203/04104* (2013.01); *G06F 2203/04105* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 8,762,852 | B2 | 6/2014 | Davis et al. |
| 2006/0197753 | A1 | 9/2006 | Hotelling |
| 2010/0080163 | A1 | 4/2010 | Krishnamoorthi et al. |
| 2010/0159898 | A1 | 6/2010 | Krzyzanowski et al. |
| 2011/0175930 | A1 | 7/2011 | Hwang et al. |
| 2013/0205312 | A1* | 8/2013 | Huang ................. H04N 21/482 725/11 |
| 2014/0208360 | A1* | 7/2014 | Kardatzke ............ H04N 21/482 725/48 |
| 2014/0359598 | A1* | 12/2014 | Oliver ....................... G06F 8/61 717/174 |
| 2015/0205591 | A1* | 7/2015 | Jitkoff ....................... G06F 8/61 717/176 |
| 2015/0296072 | A1 | 10/2015 | Zhou et al. |
| 2015/0355816 | A1 | 12/2015 | Shim |
| 2015/0382047 | A1 | 12/2015 | Van Os et al. |

FOREIGN PATENT DOCUMENTS

| | | |
|---|---|---|
| JP | 2000-163031 A | 6/2000 |
| JP | 2002-342033 A | 11/2002 |
| WO | WO-2012/061760 A2 | 5/2012 |

OTHER PUBLICATIONS

Danish Search Report dated Oct. 28, 2016, for Application No. PA 2016 70582, four pages.
Danish Search Report dated Mar. 6, 2018, for Application No. PA 2016 70582, two pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Danish Search Report dated Feb. 9, 2017, for Application No. PA 2016 70582, two pages.
Office Action received for Australian Patent Application No. 2017284847, dated May 24, 2019, 3 pages.
Office Action received for Australian Patent Application No. 2017284847, dated Oct. 18, 2019, 4 pages.
Office Action received for Danish Patent Application No. PA201670582, dated Oct. 18, 2019, 4 pages.
Extended European Search Report received for European Patent Application No. 17813728.7, dated Feb. 11, 2019, 8 pages.

\* cited by examiner

IDENTIFYING APPLICATIONS ON WHICH CONTENT IS AVAILABLE

CROSS-REFERENCE TO RELATED APPLICATIONS

This application claims benefit of U.S. Provisional Patent Application No. 62/348,976, filed Jun. 12, 2016, which is hereby incorporated by reference it its entirety.

FIELD OF THE DISCLOSURE

This relates generally to electronic devices that identify one or more applications on which media is available for viewing by a user, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device has access to media (e.g., music, movies, etc.) via one or more applications, and user interaction with such a device entails requesting to view that media. Enhancing these interactions improves the user's experience with the device and decreases user interaction time, which is particularly important where input devices are battery-operated.

SUMMARY OF THE DISCLOSURE

The embodiments described in this disclosure are directed to one or more electronic devices that determine on which applications media specified by a user is available, and that present the user with appropriate options for viewing the media, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
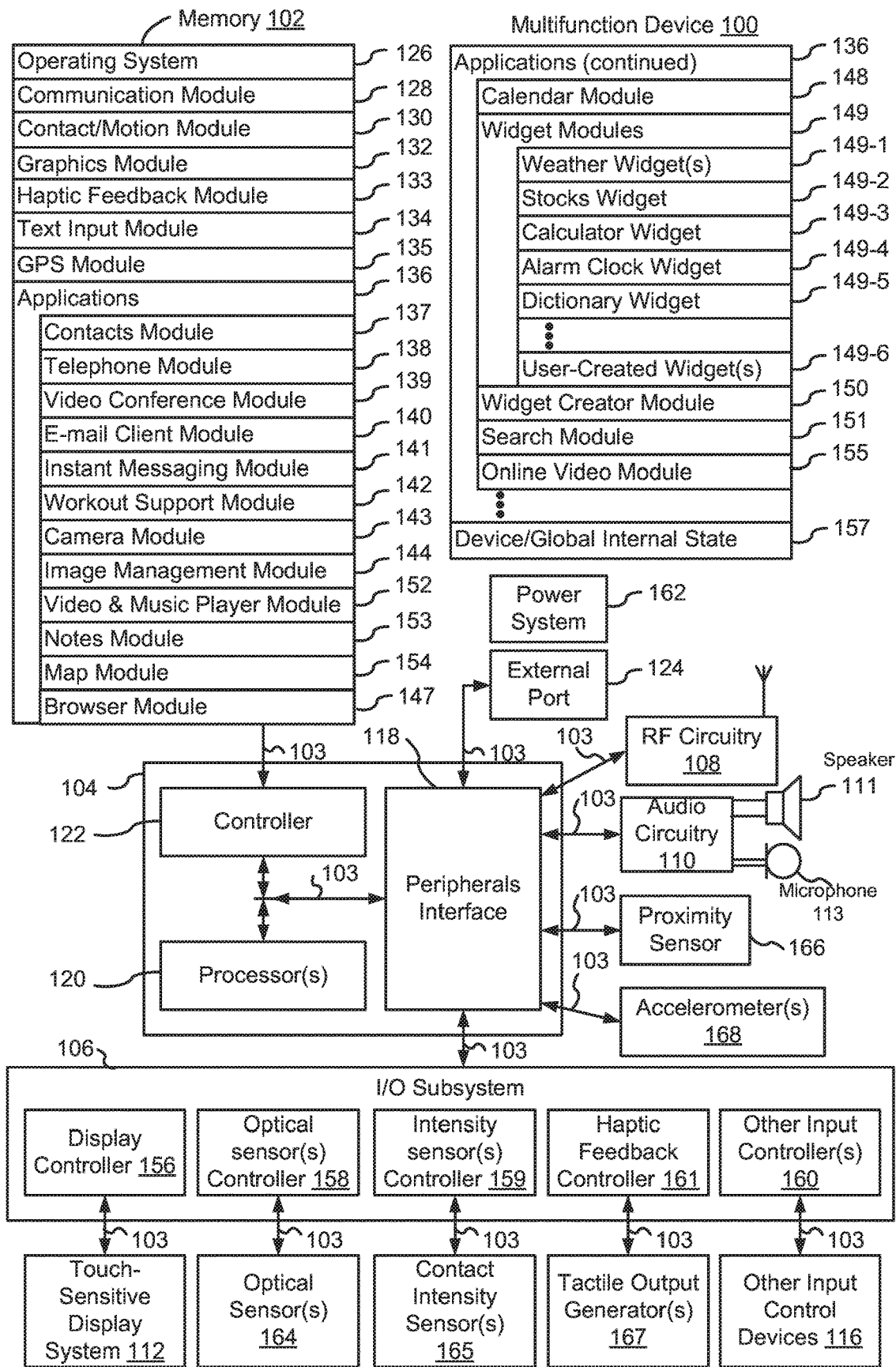
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HS-DPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
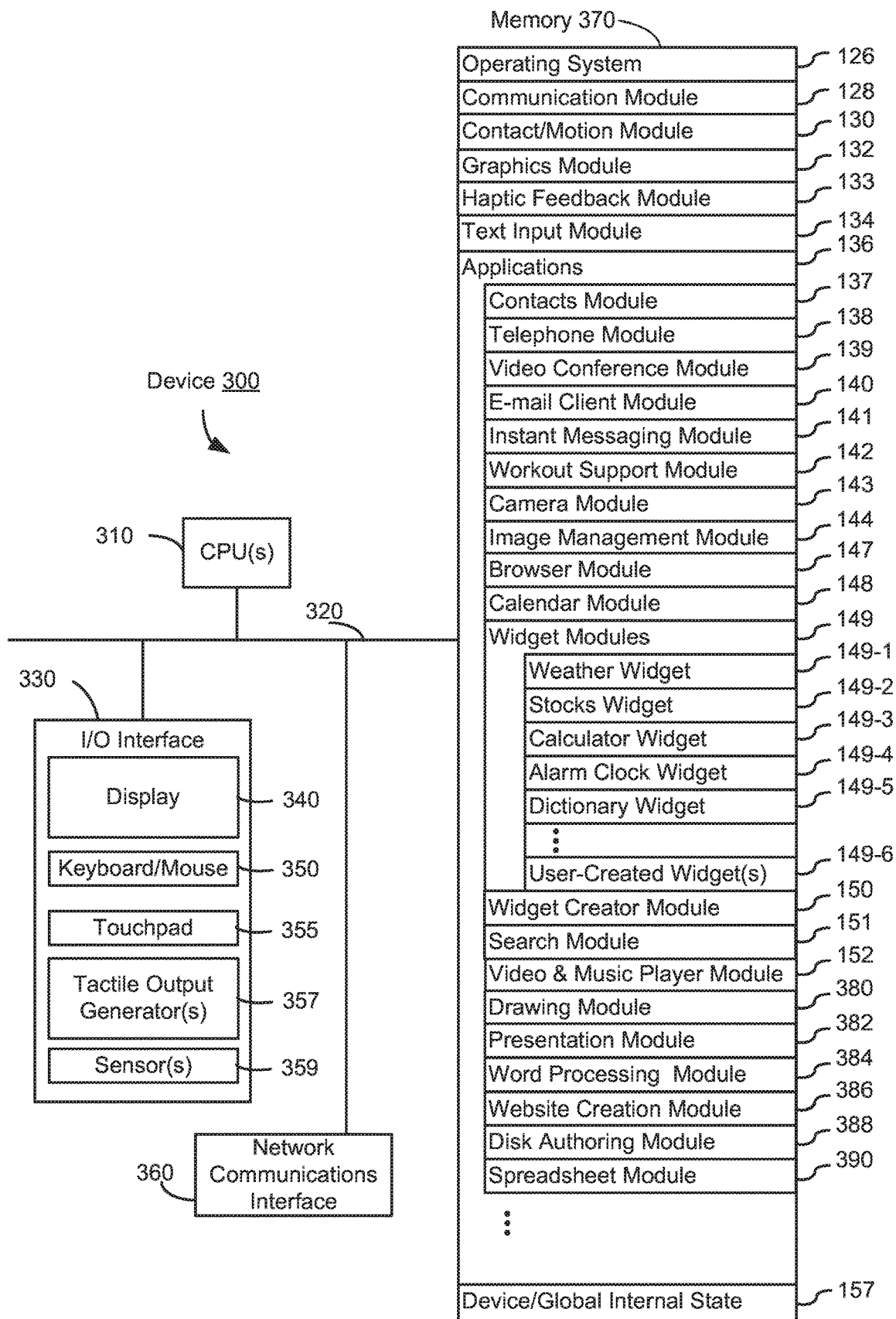
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124.

External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
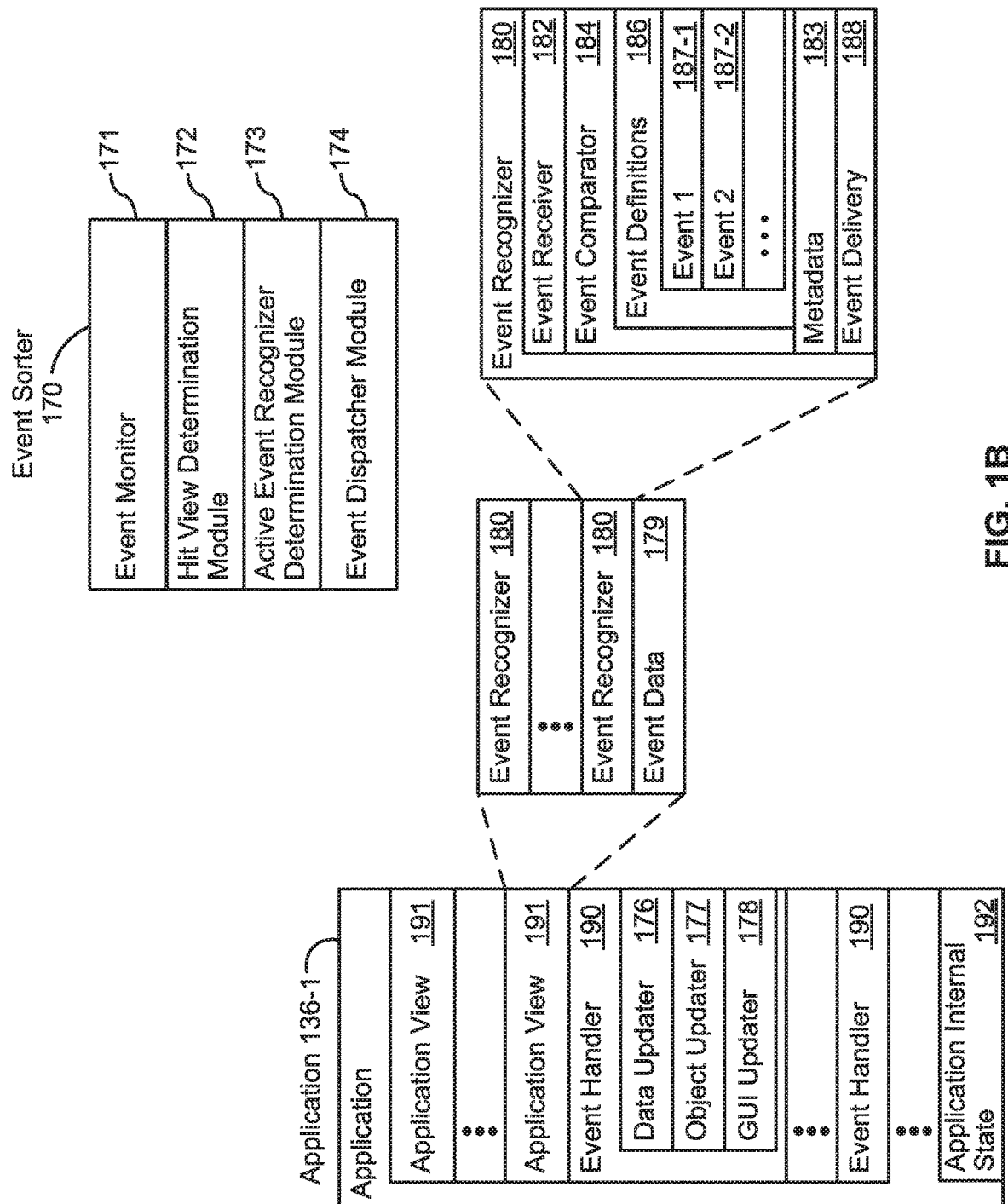
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur.

The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
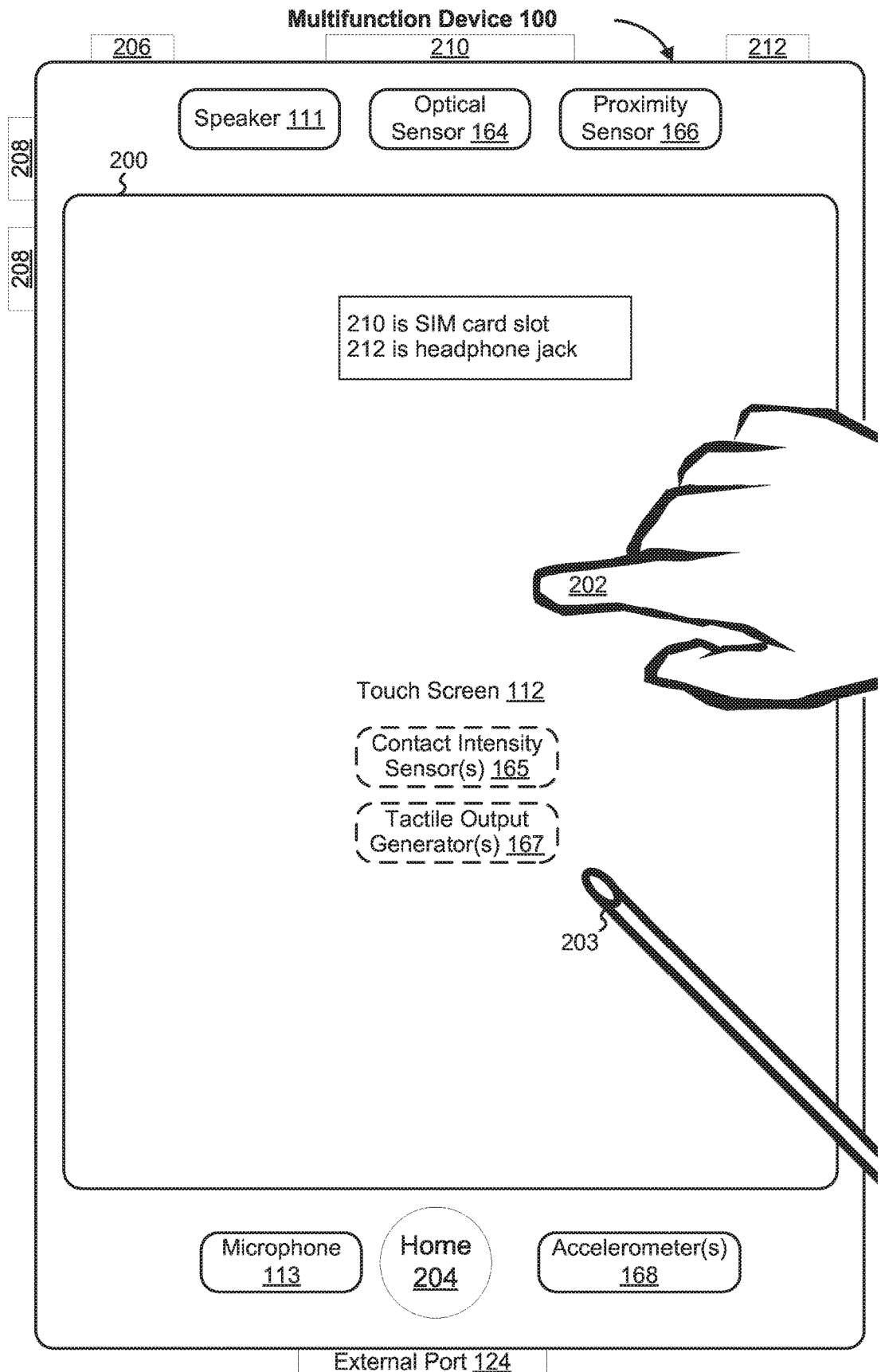
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
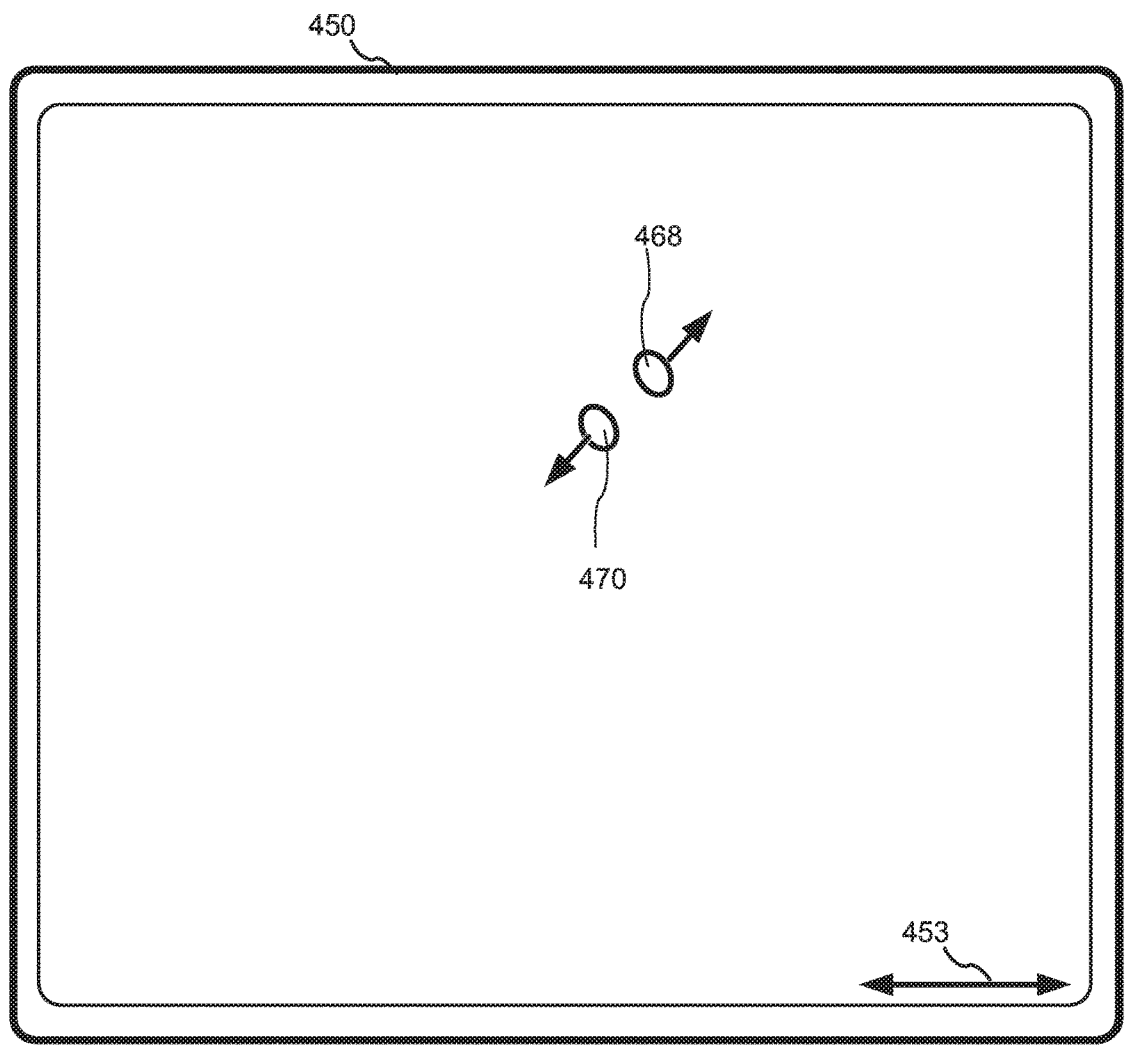
FIG. 4 illustrates an exemplary user interface for a multifunction device with a touch-sensitive surface that is separate from the display in accordance with some embodiments of the disclosure.
Figure 4:
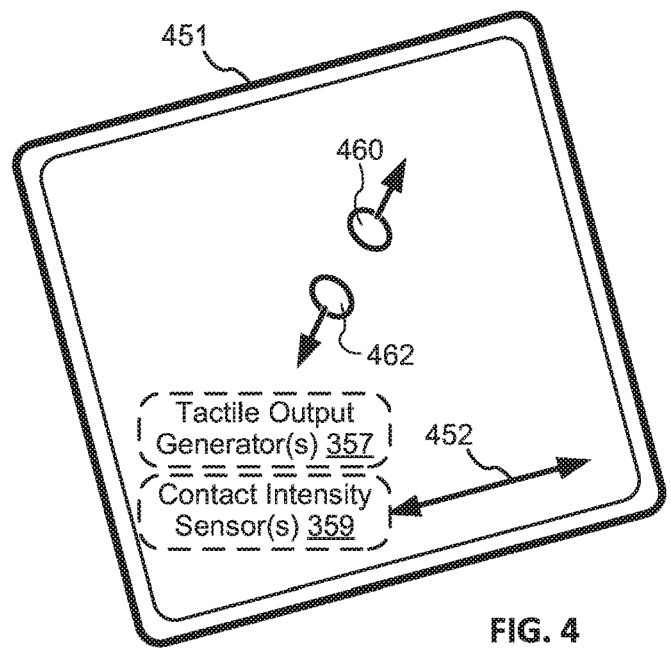

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
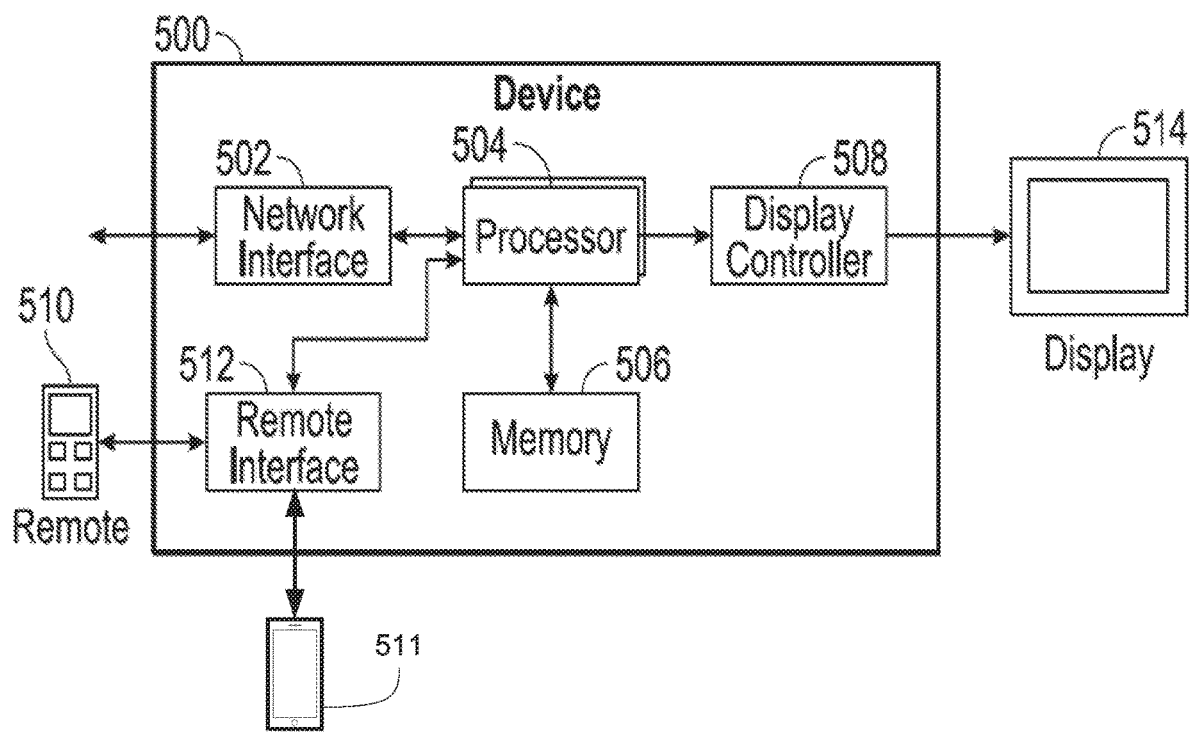
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
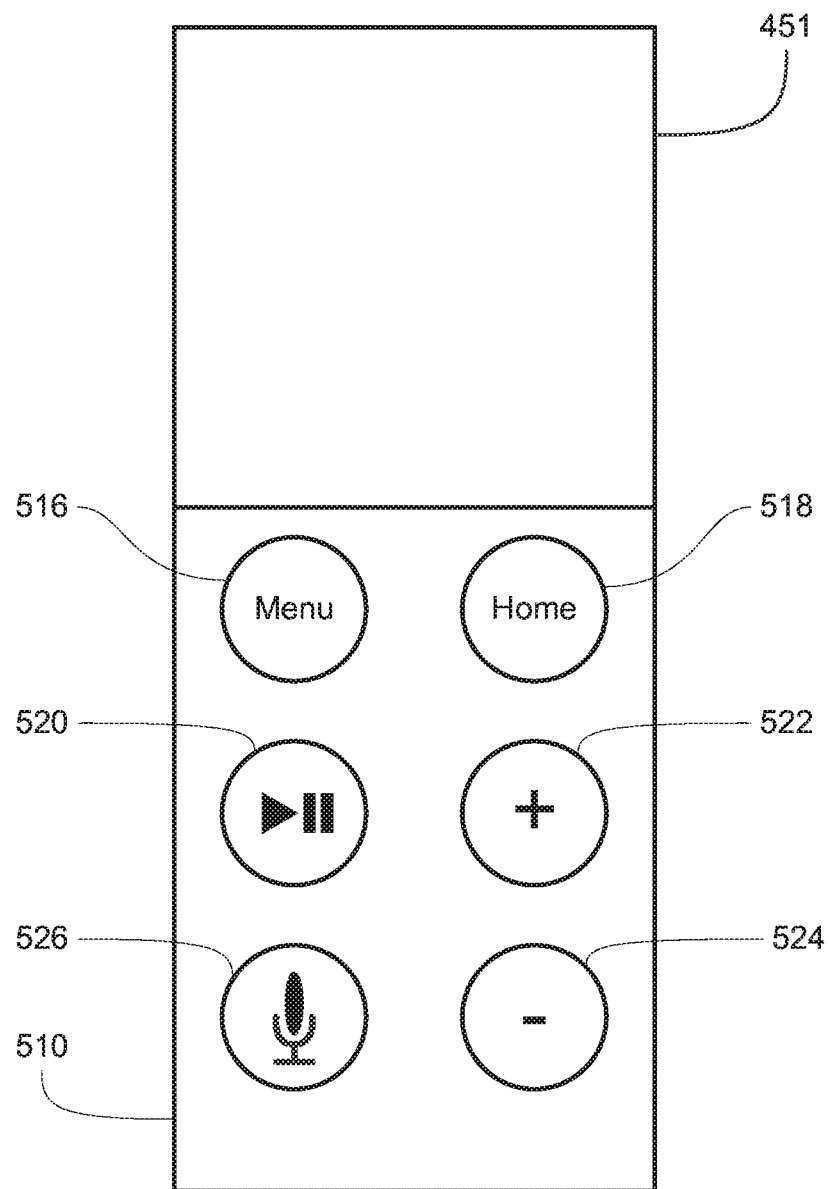

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

User Interfaces and Associated Processes

Application Identification

Users interact with electronic devices in many different manners, including interacting with media (e.g., music, movies, live sporting events, etc.) that may be available (e.g., stored or otherwise accessible) on the electronic devices. In some circumstances, a user may request to view media on the electronic device that is accessible via one or more applications on the electronic device. The embodiments described below provide ways of presenting a user with options for viewing media on one or more applications, thereby enhancing users' interactions with electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6EE illustrate exemplary ways in which an electronic device presents a user with options for viewing media on one or more applications in accordance with some embodiments of the disclosure. The embodiments in these figures are used to illustrate the processes described below, including the processes described with reference to FIGS. 7A-7N.

It should be noted that the examples illustrated in FIGS. 6A-6EE are directed to electronic devices that display information on non-touch-sensitive displays, though it is understood that the electronic devices may instead display information on displays having touch-sensitive capability (e.g., touch screens). For example, the electronic devices may include touch screens, or the electronic devices may be capable of outputting display information for display on separate touch screens, as previously described in this disclosure—in such circumstances, the displays described below optionally correspond to the touch screens mentioned above, and the inputs described below are optionally detected on the touch screens.

Figure 6A:
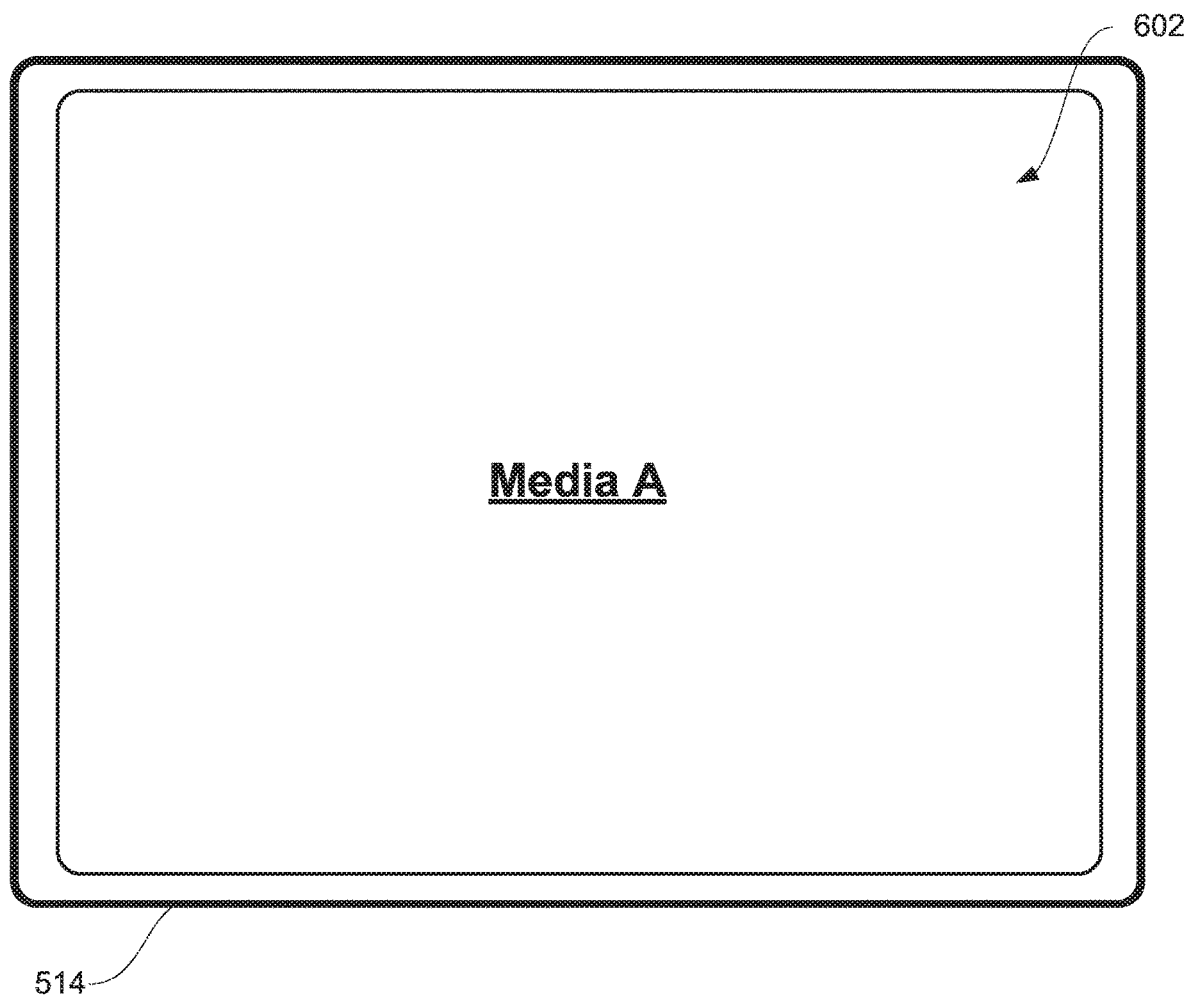
FIGS. 6A-6EE illustrate exemplary ways in which an electronic device presents a user with options for viewing media on one or more applications in accordance with some embodiments of the disclosure.

FIG. 6A illustrates exemplary display 514. Display 514 optionally displays one or more user interfaces that include various media. In the example illustrated in FIG. 6A, display 514 displays media viewer user interface 602 of an electronic device (e.g., electronic device 500 of FIG. 5A) of which display 514 is a part, or to which display 514 is connected. The media viewer user interface 602 is optionally configured to display media (e.g., a future media event such as a future live concert or sporting event, an ongoing media event such as a live sporting event, or recorded media content such as a recorded sporting event, a movie, or a television show) on the electronic device. In the example of FIG. 6A, user interface 602 is displaying media A (e.g., a movie).

In some embodiments, the electronic device includes one or more applications via which the electronic device has access to various media. For example, the electronic device optionally has a first application installed on it that provides access to a first set of media (e.g., the user of the electronic device may launch the first application to view the first set of media on the electronic device), and a second application installed on it that provides access to a second set of media (e.g., the user of the electronic device may launch the second application to view the second set of media on the electronic device). The electronic device optionally has additional or fewer applications on it for viewing media, as described above. Further, the electronic device optionally has the ability to download additional applications for viewing media that are not yet downloaded or installed on the electronic device. Additionally, in some embodiments, the user of the electronic device is optionally required to have entitlement to view media using a particular application (e.g., via a subscription or other access credentials) before that particular application provides the electronic device access to its media (e.g., the user is optionally required to subscribe to the particular application, or have a subscription with a media provider, such as a cable or satellite provider, that provides the user access to content through the particular application). The discussion that follows focuses on manners in which the electronic device presents, to the user of the electronic device, information about, and options for viewing, media available on such applications as described above.

For example, in some embodiments, the electronic device is configured to receive inputs, such as voice inputs, text inputs, etc., requesting information about a user-specified topic, such as information about one or more sporting events. For instance, using remote 510 of FIG. 5B, a user of the electronic device optionally presses "voice input" button 526, and provides voice input to remote 510 requesting information about a user-specified topic. In response, the electronic device searches for such information about the user-specified topic, and provides it to the user. For example, in FIG. 6B, the user has provided the voice input "What is going on with the Giants game right now?", as shown by the visual indication 604 of the voice input displayed by the electronic device on display 514. In response, the electronic device displays, on display 514, information about media that is relevant to the Giants game that the user specified, as shown in FIG. 6C. Specifically, the electronic device optionally displays overlay 606, which is overlaid over media A in user interface 602, and includes the information about the Giants game. For example, overlay 606 includes a representation of the Giants game (e.g., representation 608, which, in FIG. 6C, includes the score of the Giants game—in some embodiments, representation 608 includes additional or alternative content, such as team logos, an image from the Giants game, etc.).

Overlay 606 also includes buttons 614A and 614B, indicating that the Giants game is available to watch on application A and application D. Specifically, the electronic device optionally has downloaded/installed on it applications A, D, E and F, as shown in box 612. Further, the Giants game is optionally available to be viewed on applications A, B and D, as shown in box 610. Therefore, because the electronic device has applications A and D, on which the Giants game is available, downloaded on it, overlay 606 includes button 614A (selectable to watch the Giants game on application A) and button 614B (selectable to watch the Giants game on application D). Overlay 606 does not include a button for watching the Giants game on application B, because application B is not downloaded on the electronic device. As a result, the user is able to easily see the applications on which the Giants game is available and that are already downloaded on the electronic device, and is able to easily launch an application to watch the Giants game by selecting an appropriate one of buttons 614A and 614B.

In the embodiment of FIG. 6C, the electronic device optionally does not have information about the user's entitlement to watch the Giants game on a particular application, or does not account for such entitlement information in presenting buttons 614A and 614B to the user. However, in some embodiments, the electronic does account for user entitlement in providing buttons in overlay 606. For example, in FIG. 6D, the electronic device is optionally entitled to watch the Giants game (e.g., via user subscription(s) to applications and/or media providers) on applications D, E and F, as indicated by the dots next to applications D, E and F in box 612. Thus, the electronic device optionally only displays button 614B in overlay 606 for watching the Giants game on application D, and does not display button 614A in overlay 606, because the electronic device is not entitled to watch the Giants game on application A. In this way, the electronic device only gives the user the option to watch the Giants game on an application on which the electronic device has entitlement to watch the Giants game, thus facilitating the user's ability to quickly and easily watch the Giants game.

Figure 6B:
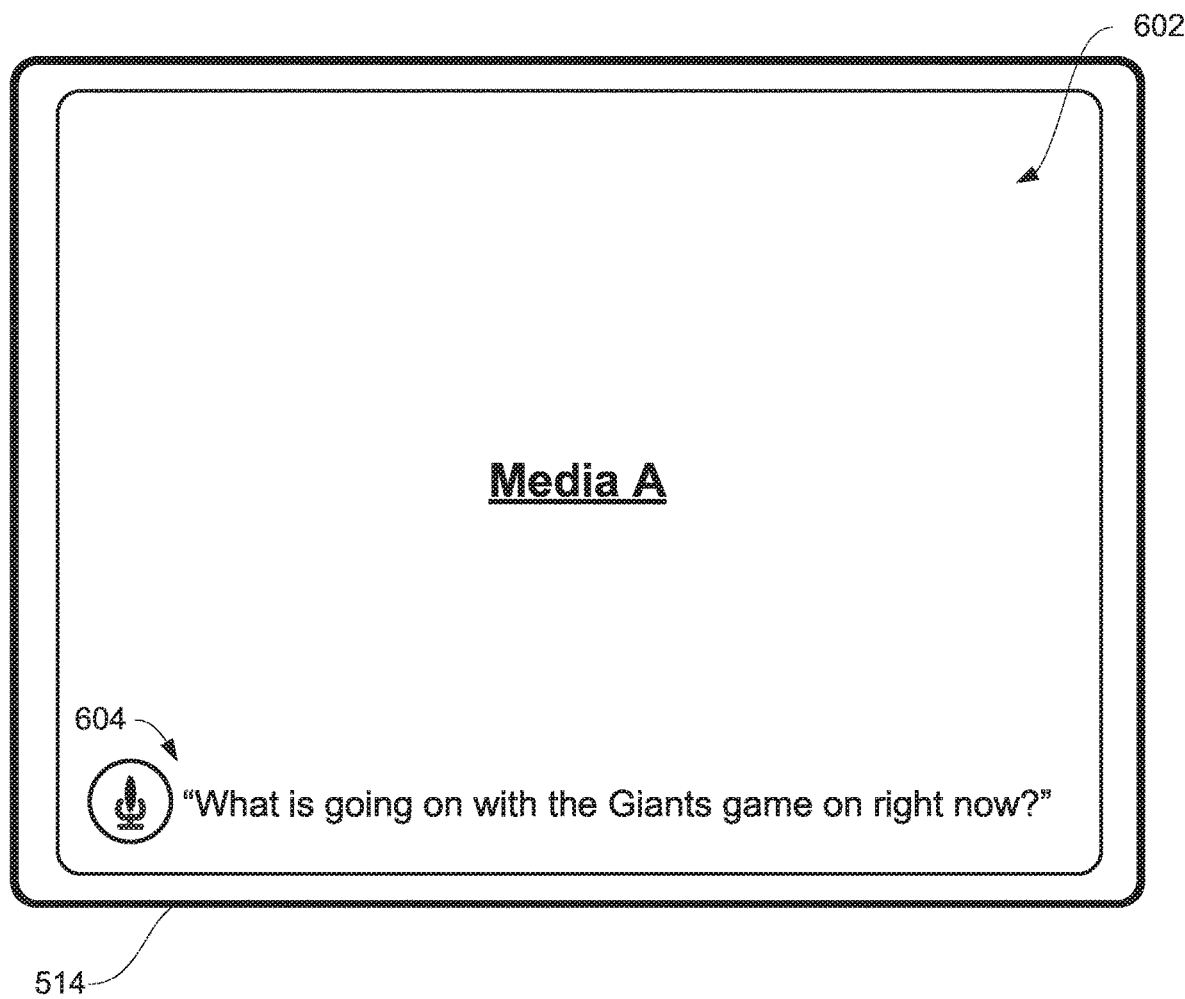
Figure 6C:
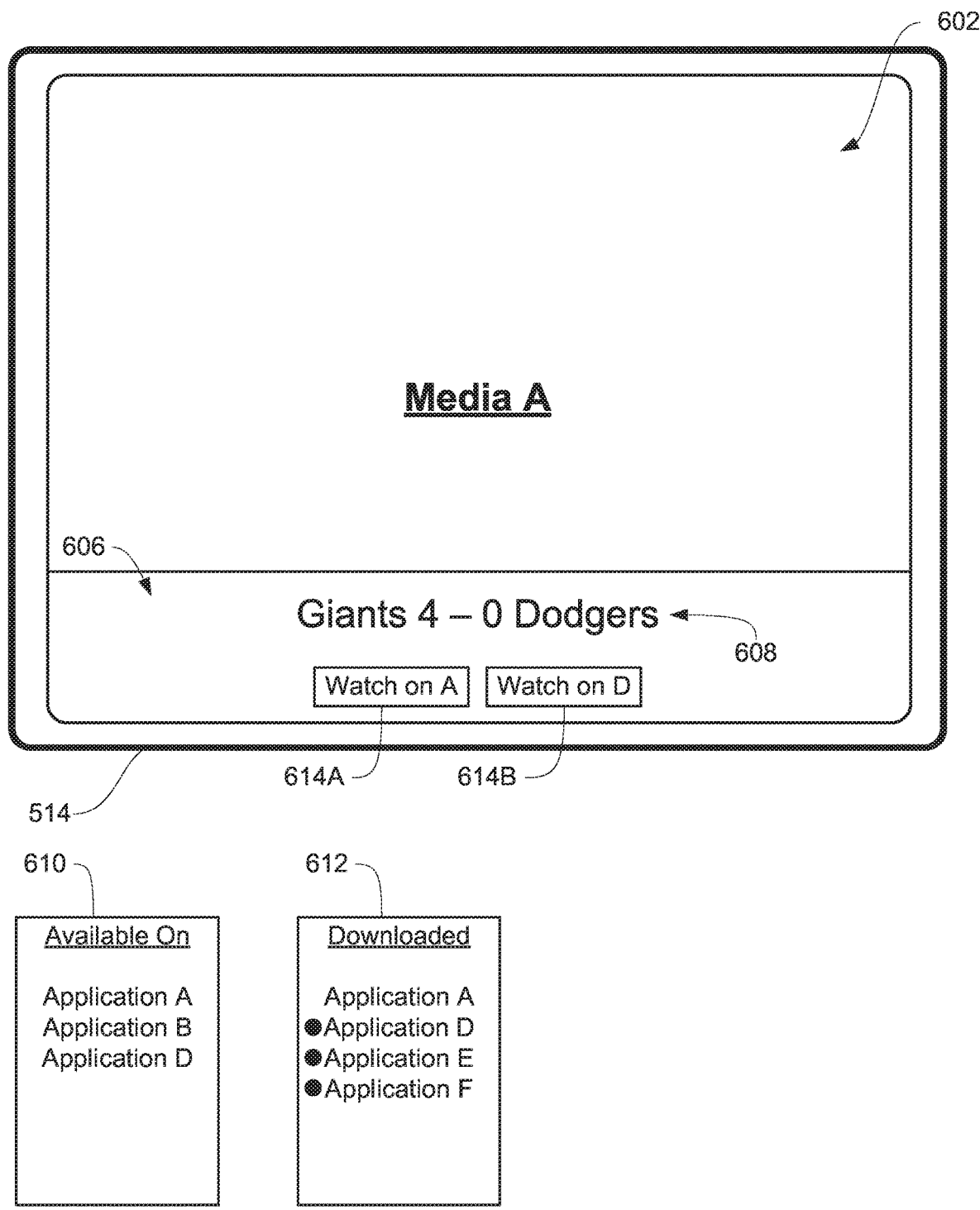

In some embodiments, rather than displaying different buttons for each application on which the Giants game is available to watch, the electronic device displays a single button, selection of which causes a disambiguation user interface to be displayed via which the user selects a particular application on which to watch the Giants game. For example, in FIG. 6E, the electronic device makes the determination about which applications on which the Giants game should be watched without regard to entitlement information, as in FIG. 6C. The information about which applications are downloaded on the electronic device, and on which applications the Giants game is available, is the same as in FIG. 6C. Because the electronic device has two applications downloaded on it on which the Giants game is available (e.g., applications A and D), the electronic device displays a single button 616 in overlay 606 that indicates that the Giants game is available to be watched (e.g., "watch"), but does not indicate a particular application on which it should be watched. Rather, when the user selects button 616, as shown in FIG. 6E, the electronic device displays disambiguation user interface 618 from which the user selects the application on which the user wishes to watch the Giants game, as shown in FIG. 6F. Specifically, disambiguation user interface 618 includes buttons 620 selectable by the user for selecting the application on which the user wishes to watch the Giants game (e.g., applications A and D, in FIG. 6F). In response to a selection, by the user, of a particular button in disambiguation user interface 618, the electronic device displays the selected application on display 514, and optionally plays the Giants game on the selected application.

Figure 6D:
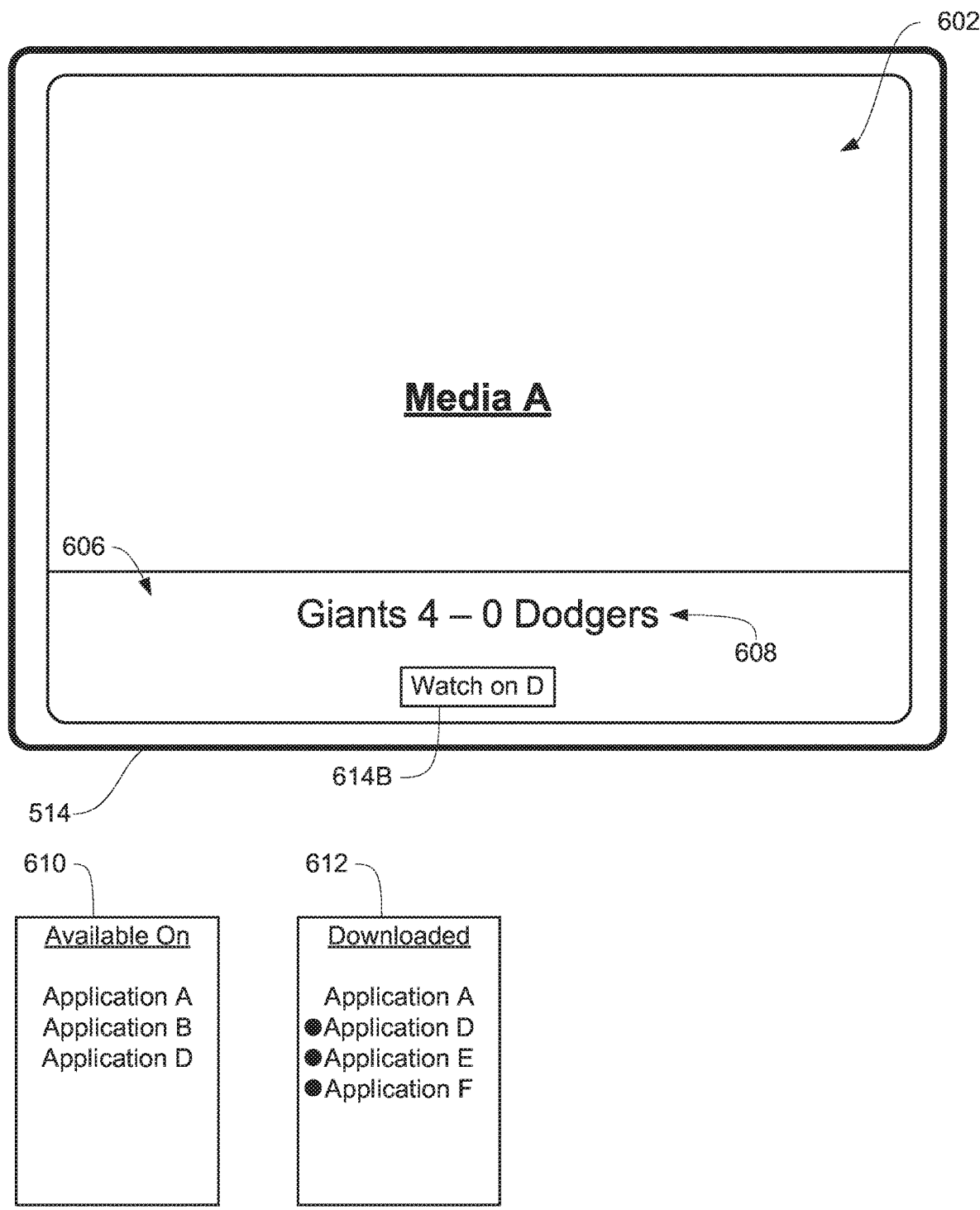
Figure 6E:
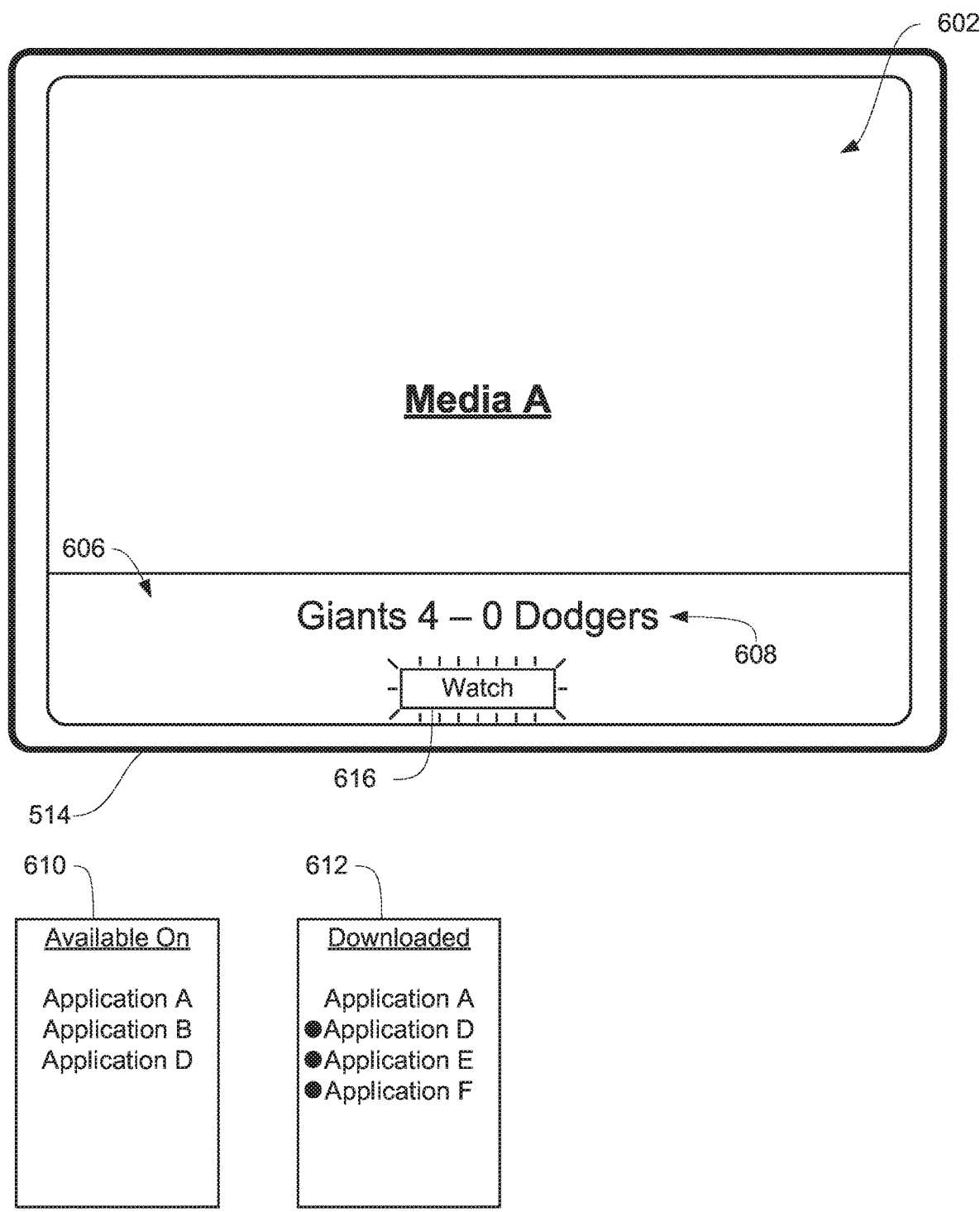
Figure 6F:
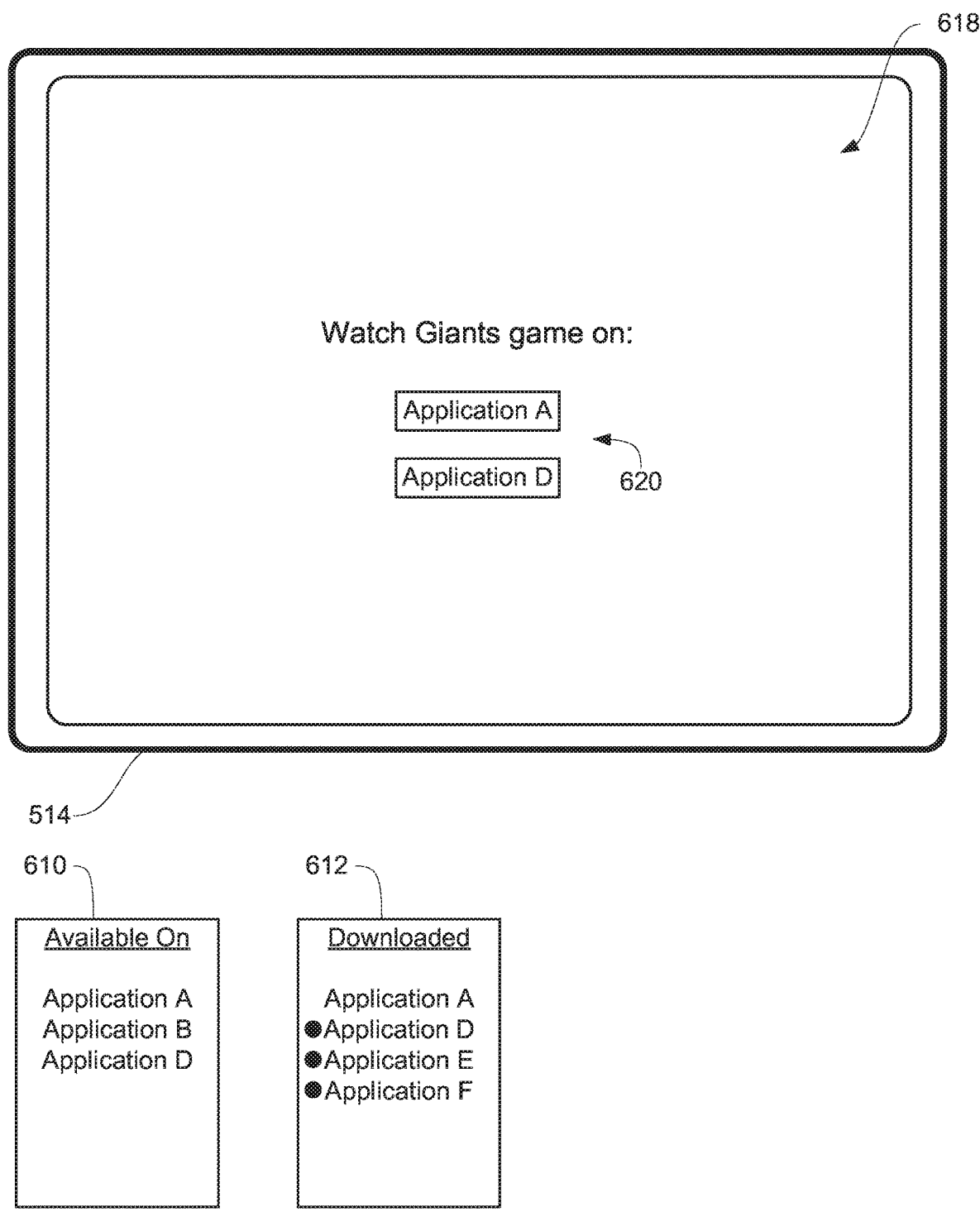
Figure 6G:
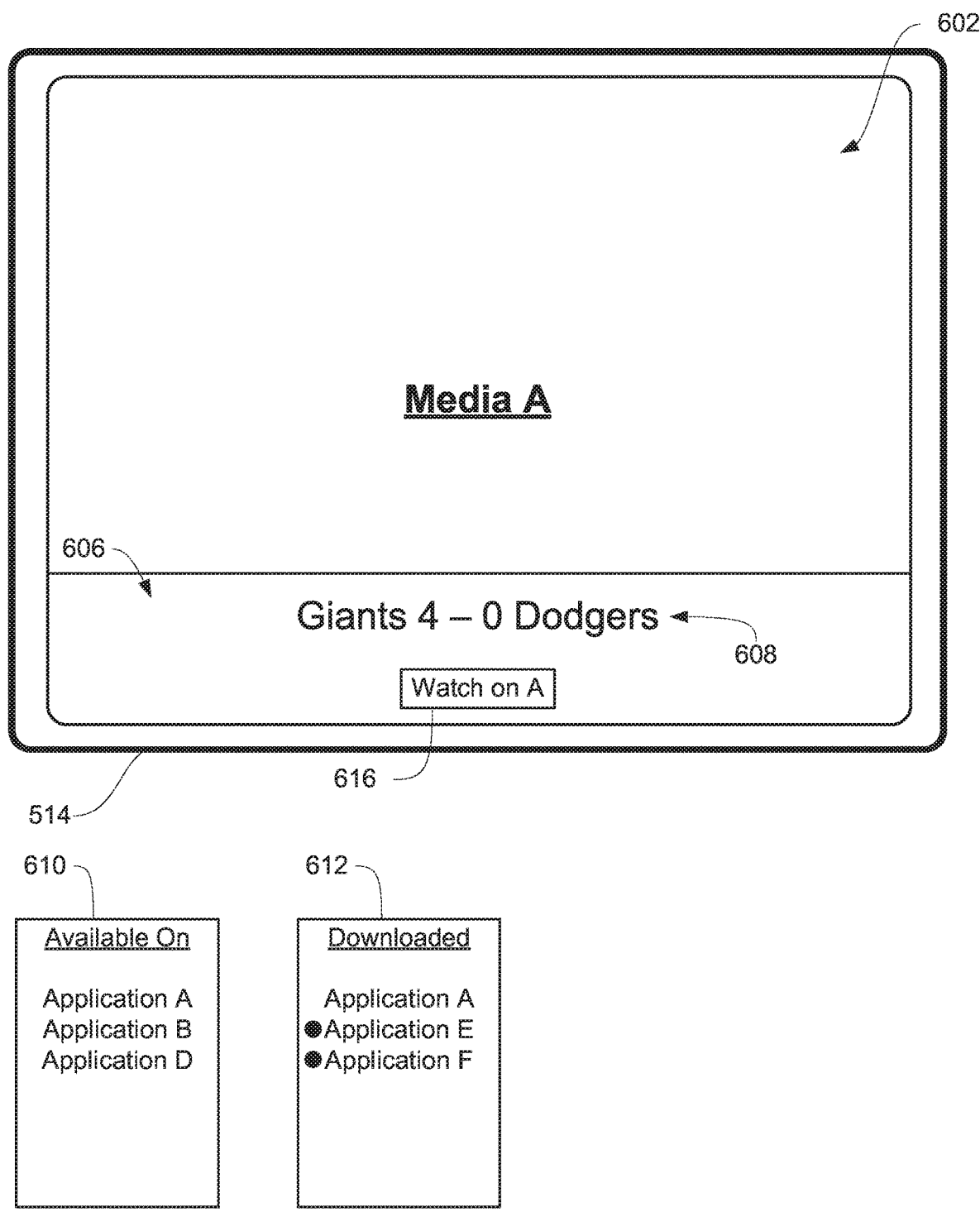

If, instead of having two applications downloaded on it on which the Giants game is available, the electronic device only has one application downloaded on it on which the Giants game is available, the electronic device optionally indicates that one application in single button 616, as shown in FIG. 6G. Specifically, the Giants game is available on applications A, B and D, but the electronic device only has application A downloaded on it. As a result, the electronic device displays single button 616 indicating that the Giants game is available to be watched (e.g., "watch"), and indicating the particular application on which it should be watched (e.g., application A). Single button 616 is optionally selectable to launch and watch the Giants game on application A.

Figure 6H:
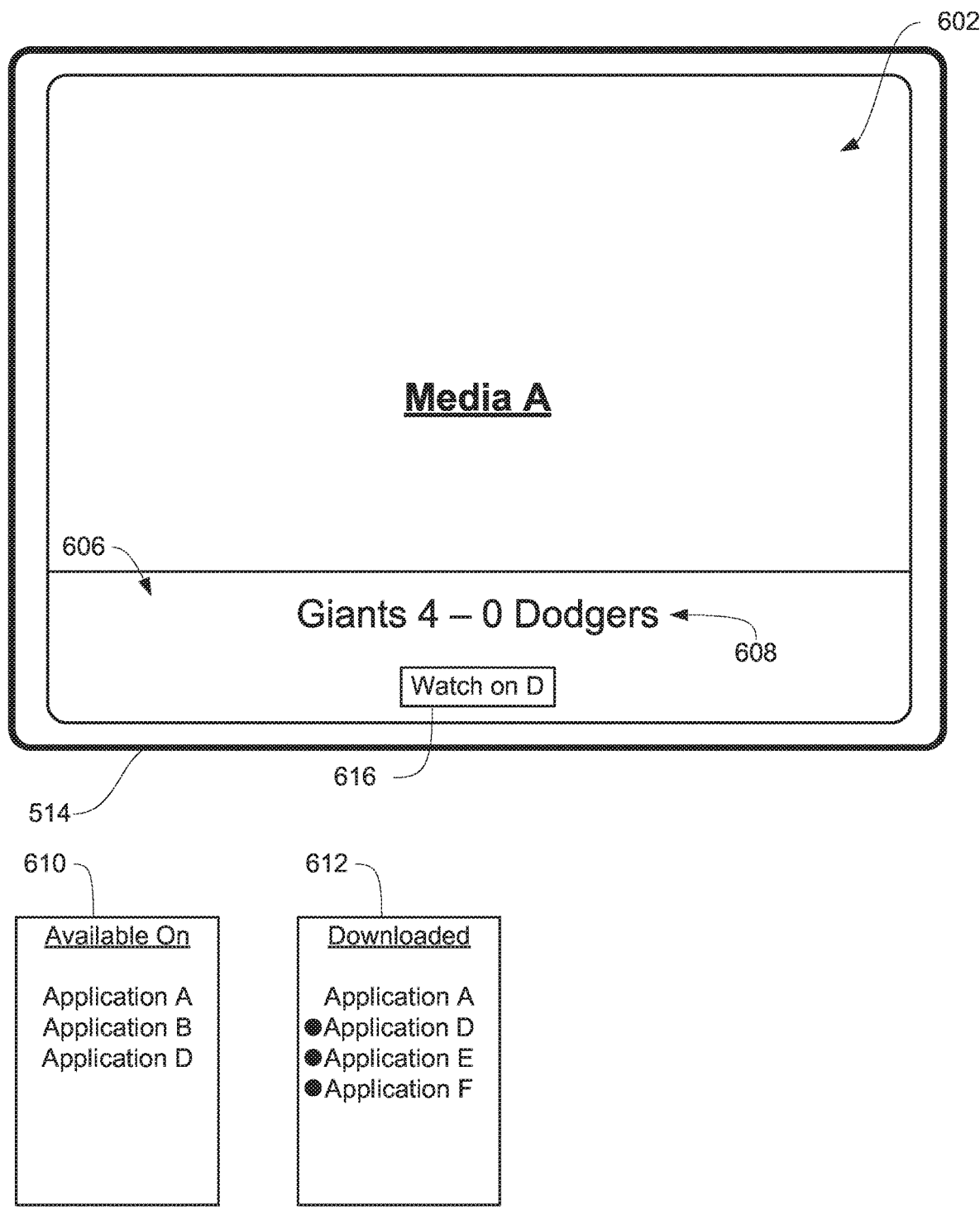

In FIG. 6H, the electronic device has made the determination about which applications on which the Giants game should be watched while taking into account entitlement information, as in FIG. 6D. Specifically, with the same information as in FIGS. 6E-6F about which applications are downloaded on the electronic device, and on which applications the Giants game is available, the electronic device has determined that the user should watch the Giants game on application D, because despite applications A and D both being downloaded on the electronic device, the electronic device only has entitlement to watch the Giants game on application D. As a result, the electronic device displays single button 616 indicating that the Giants game is available to be watched (e.g., "watch"), and indicating the particular application on which it should be watched (e.g., application D). Single button 616 is optionally selectable to launch and watch the Giants game on application D.

Figure 6I:
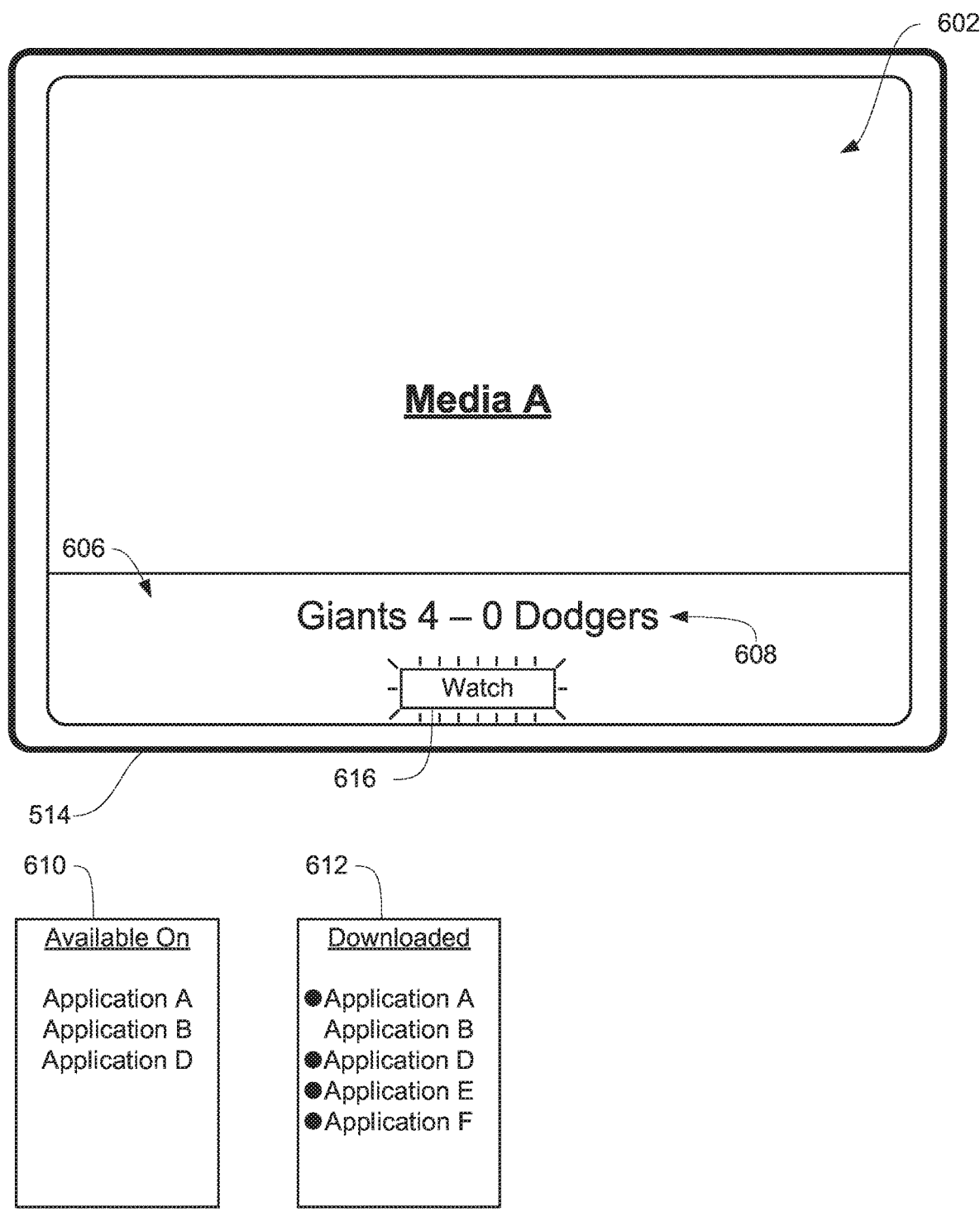
Figure 6J:
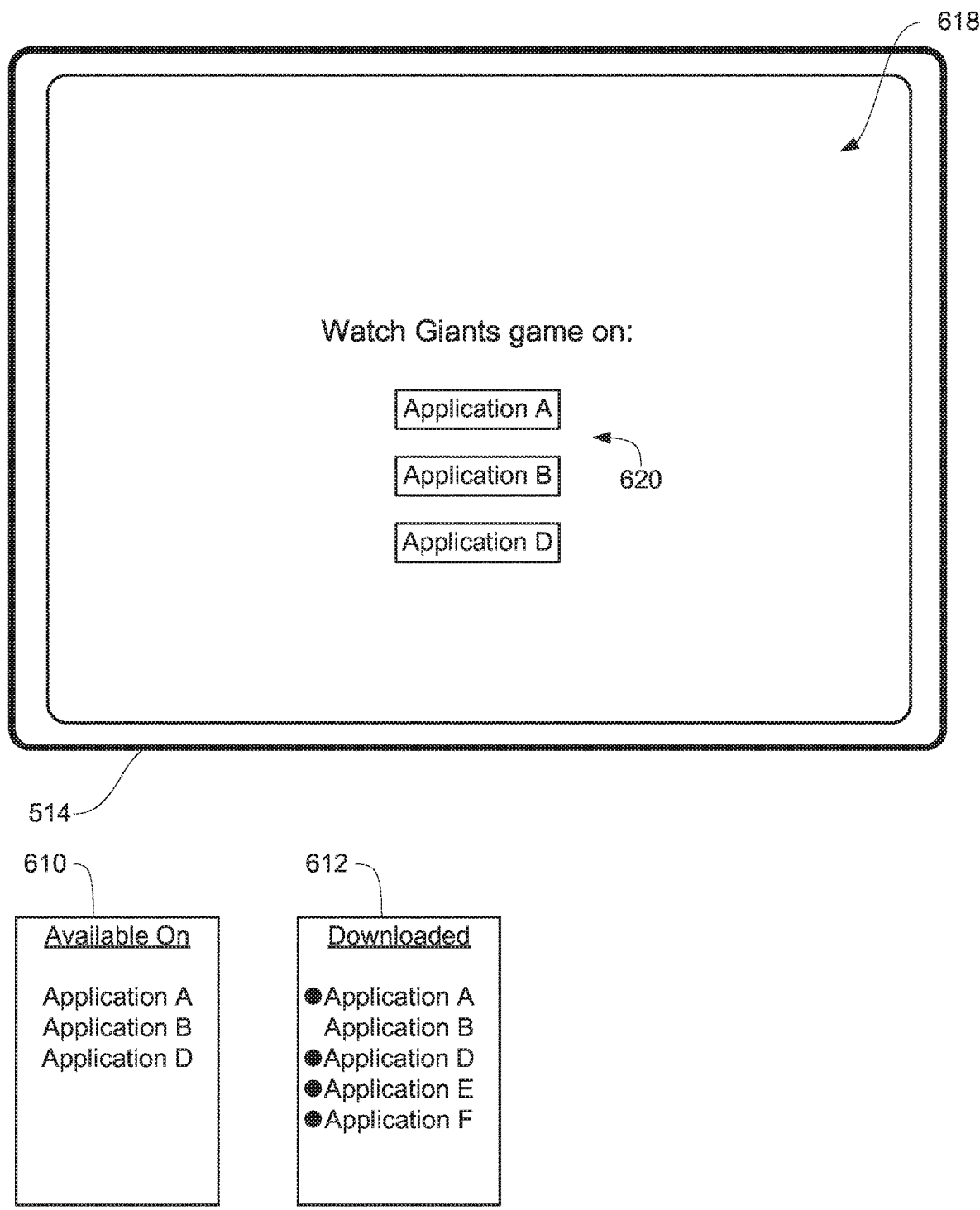
Figure 6K:
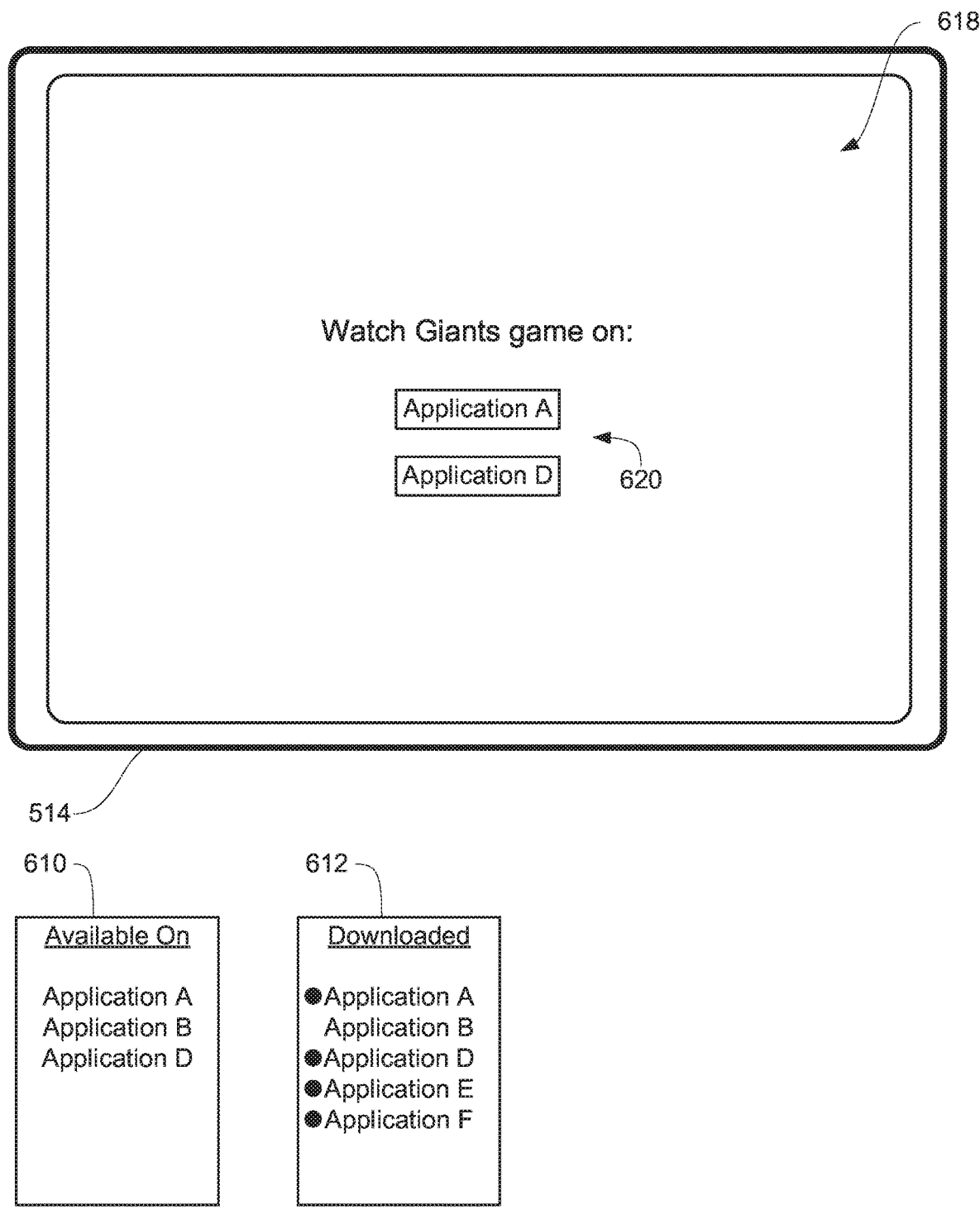

In FIG. 6I, the electronic device has made the determination about which applications on which the Giants game should be watched without taking into account entitlement information. Specifically, in FIG. 6I, the electronic device has applications A, B and D downloaded on it and on which the Giants game is available. As a result, the electronic device displays a single button 616 in overlay 606 that indicates that the Giants game is available to be watched (e.g., "watch"), but does not indicate a particular application on which it should be watched. Rather, when the user selects button 616, as shown in FIG. 6I, the electronic device displays disambiguation user interface 618 from which the user selects the application on which the user wishes to watch the Giants game, as shown in FIG. 6J. Specifically, disambiguation user interface 618 includes buttons 620 selectable by the user for selecting the application on which the user wishes to watch the Giants game (e.g., applications A, B and D, in FIG. 6J). In response to a selection, by the user, of a particular button in disambiguation user interface 618, the electronic device displays the selected application on display 514, and optionally plays the Giants game on the selected application. If the electronic device in FIG. 6I had made the determination about which applications on which the Giants game should be watched while taking into account entitlement information, disambiguation user interface 618 would only include buttons 620 for applications A and D, as shown in FIG. 6K, because the electronic device does not have entitlement to watch the Giants game on application B.

In some embodiments, the contents of single button 616 changes depending on whether or not the electronic device has at least one application downloaded on it on which the electronic device is entitled to watch the Giants game. For example, in FIG. 6L, the electronic device has applications A and D downloaded on it on which the electronic device is entitled to watch the Giants game. As a result, the electronic device displays a single button 616 in overlay 606 that indicates that the Giants game is available to be watched (e.g., "watch"). However, if the electronic device has no applications downloaded on it on which the electronic device is entitled to watch the Giants game, but does have downloaded on it applications on which the Giants game is available, the electronic device optionally displays a single button 616 in overlay 606 that indicates the ability of the user to open an application on which the Giants game is available (e.g., "open"), but does not indicate an ability of the user to watch the Giants game, as shown in FIG. 6M.

Figure 6L:
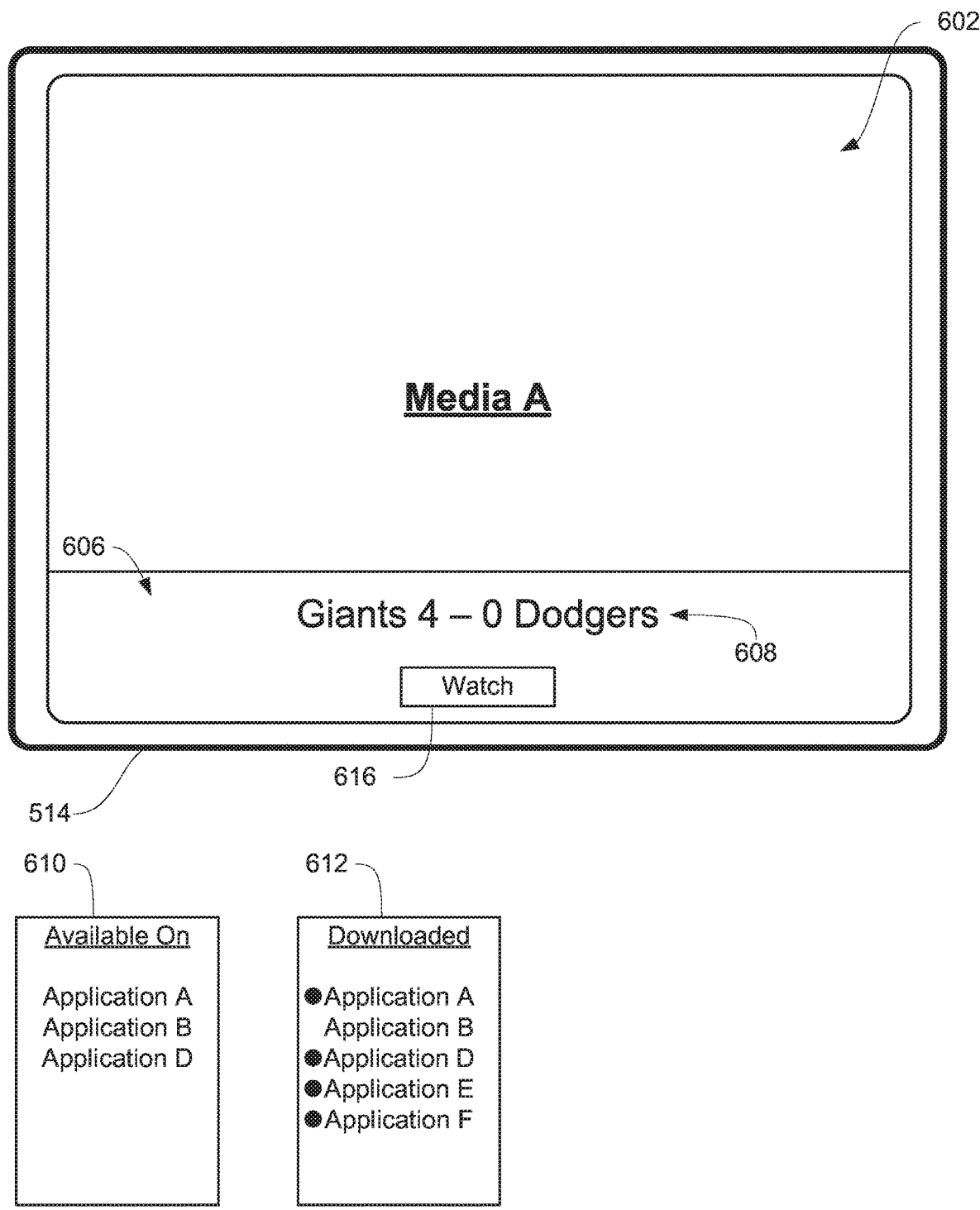
Figure 6M:
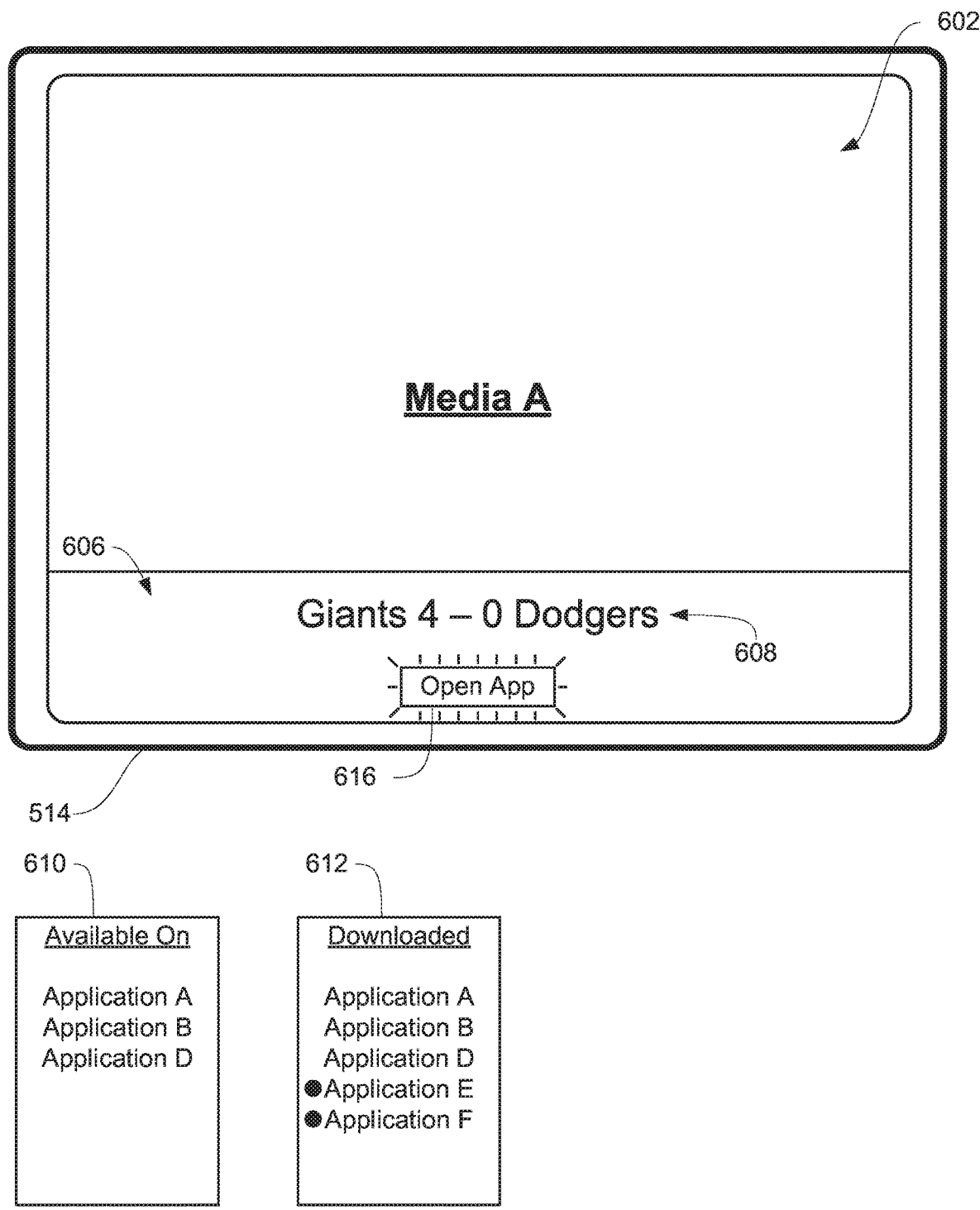
Figure 6N:
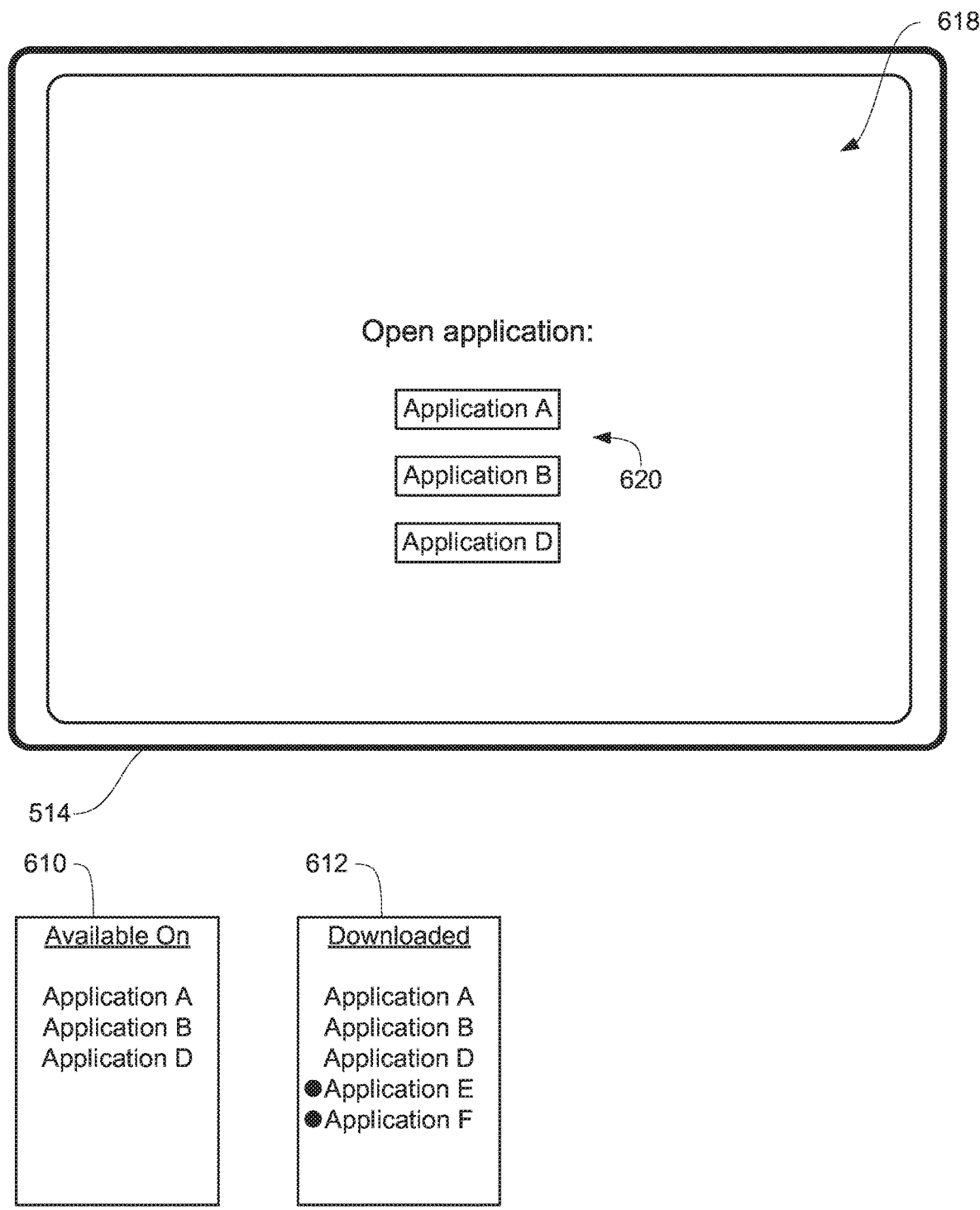

Also shown in FIG. 6M is a circumstance in which the electronic device has multiple applications downloaded on it on which the Giants game is available, but on none of those applications does the electronic device have entitlement to watch the Giants game. Specifically, the electronic device has applications A, B and D downloaded on it on which the Giants game is available, but the electronic device does not have entitlement to watch the Giants game on any of applications A, B and D. As a result, the electronic device displays a single button 616 in overlay 606 that indicates the ability of the user to open an application on which the Giants game is available (e.g., "open"), but does not indicate a particular application that will be opened. Rather, when the user selects button 616, as shown in FIG. 6M, the electronic device displays disambiguation user interface 618 from which the user selects the application the user wishes open, as shown in FIG. 6N. Specifically, disambiguation user interface 618 includes buttons 620 selectable by the user for selecting the application the user wishes to open, and on which the Giants game is available (e.g., applications A, B and D, in FIG. 6N). In response to a selection, by the user, of a particular button in disambiguation user interface 618, the electronic device displays the selected application on display 514, without playing the Giants game on the display (e.g., because the electronic device is not entitled to watch the Giants game on any of applications A, B and D).

Figure 6O:
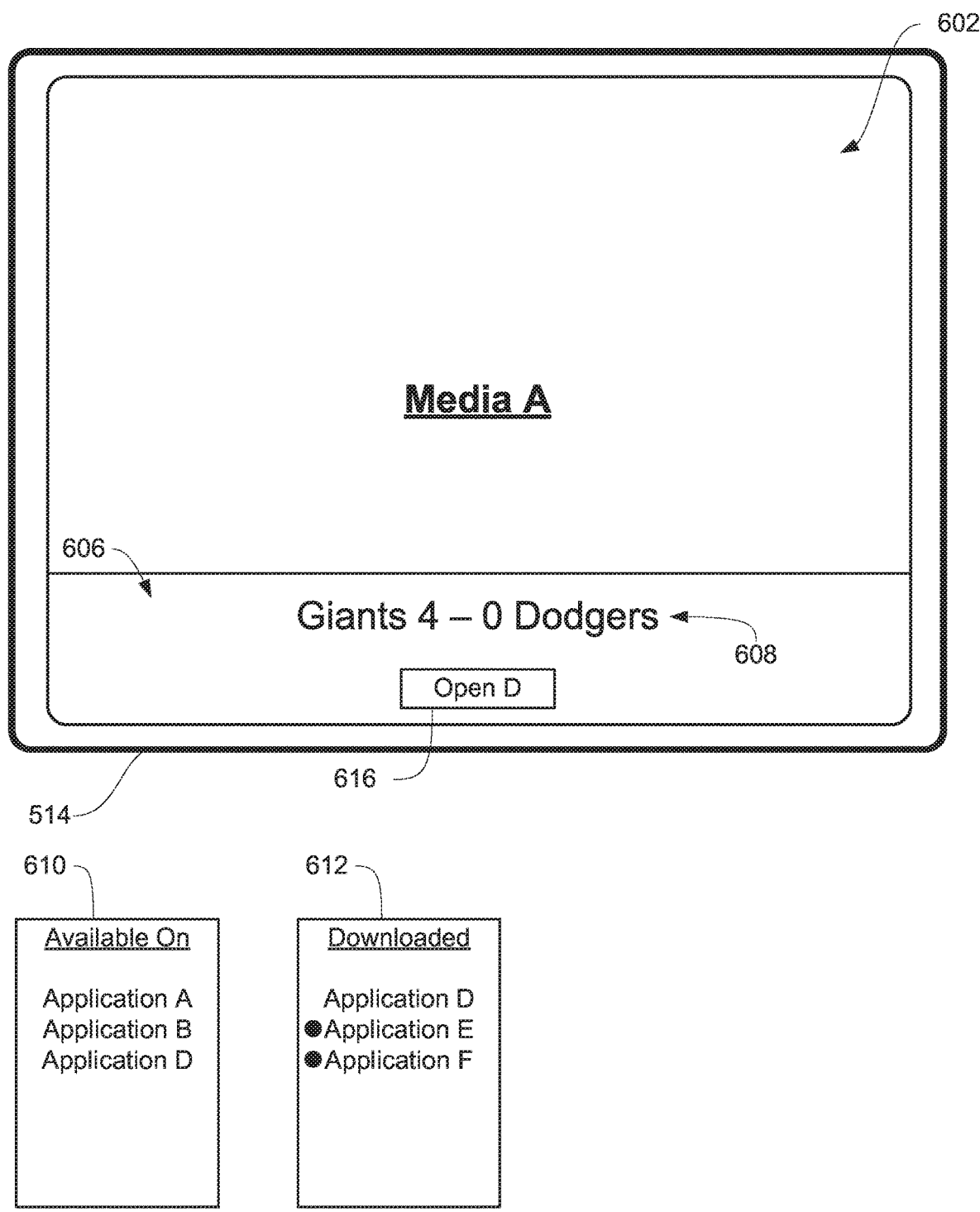

In FIG. 6O, the electronic device has only one application downloaded on it on which the Giants game is available (e.g., application D), but the electronic device does not have entitlement to watch the Giants game on that application. As a result, the electronic device displays a single button 616 in overlay 606 that indicates the ability of the user to open a particular application on which the Giants game is available (e.g., "open D"), without indicating the ability of the user to watch the Giants game. Single button 616 is optionally selectable to display application D on display 514, without playing the Giants game on the display (e.g., because the electronic device is not entitled to watch the Giants game on application D).

Figure 6P:
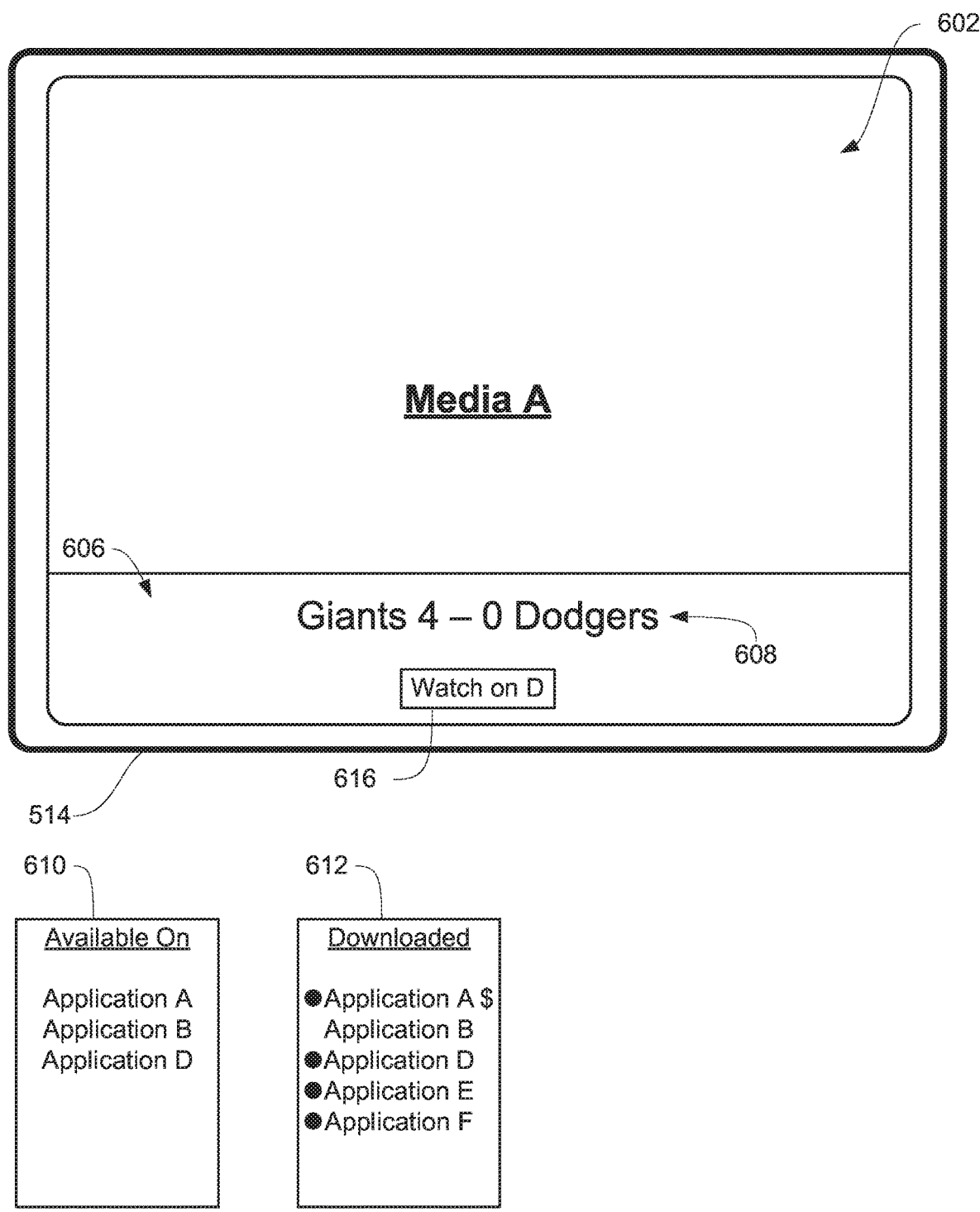

In some embodiments, the electronic device has multiple applications downloaded on it on which it is entitled to watch the Giants game, but one of those applications is preferred to the other applications (e.g., because watching the Giants game on that one application is free, while watching the Giants game on the other applications is not free). FIG. 6P illustrates such a circumstance. Specifically, the electronic device has applications A, B and D downloaded on it on which the Giants game is available, and the electronic device has entitlement to watch the Giants game on both of applications A and D. However, watching the Giants game on application A optionally costs money (indicated by "$" next to application A in box 612), whereas watching the Giants game on application D does not cost money. Therefore, application D is optionally preferred to application A for watching the Giants game. As a result, the electronic device displays single button 616 indicating that the Giants game is available to be watched (e.g., "watch"), and indicating the particular application on which it should be watched (e.g., application D). Single button 616 is optionally selectable to launch and watch the Giants game on application D.

Figure 6Q:
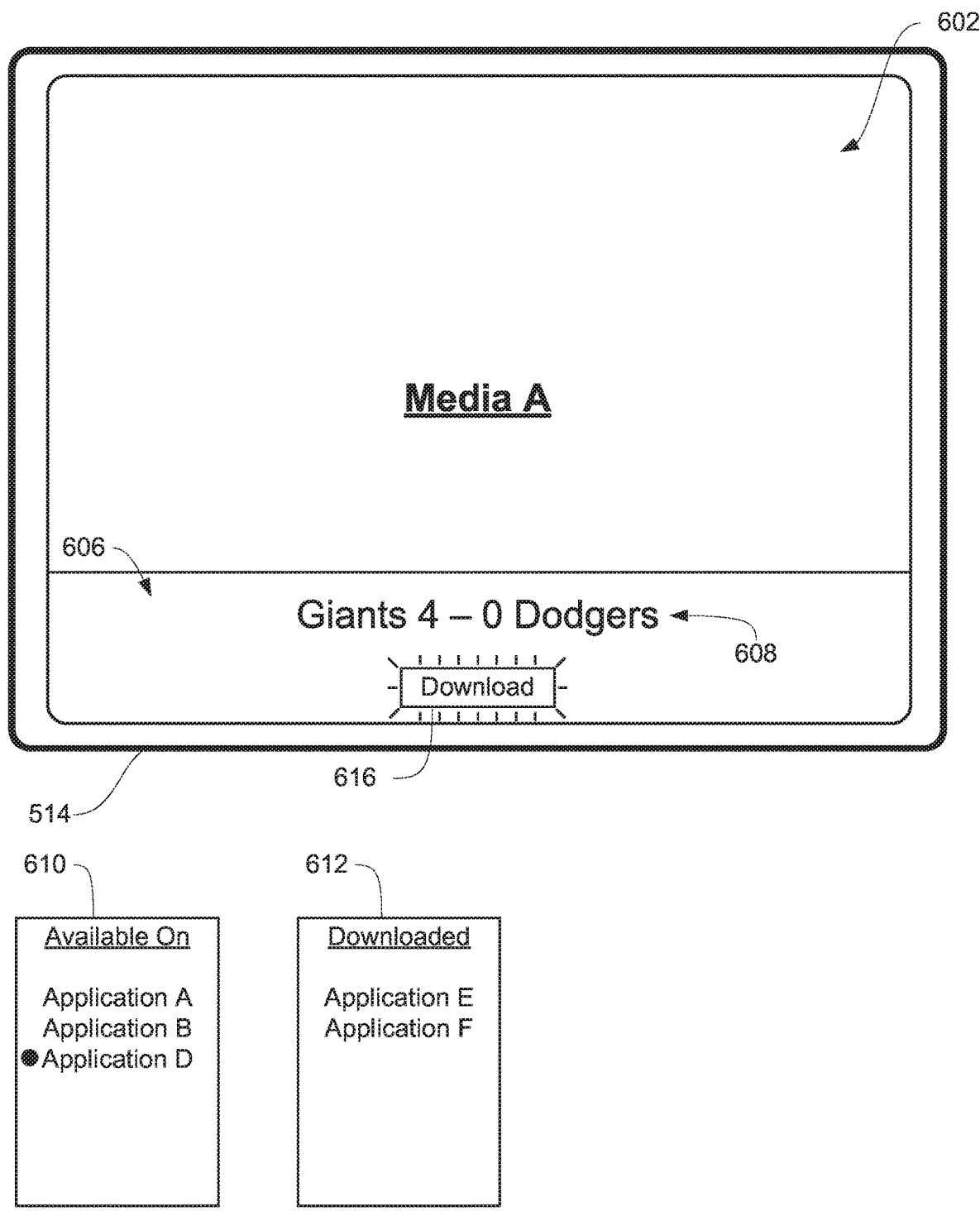
Figure 6R:
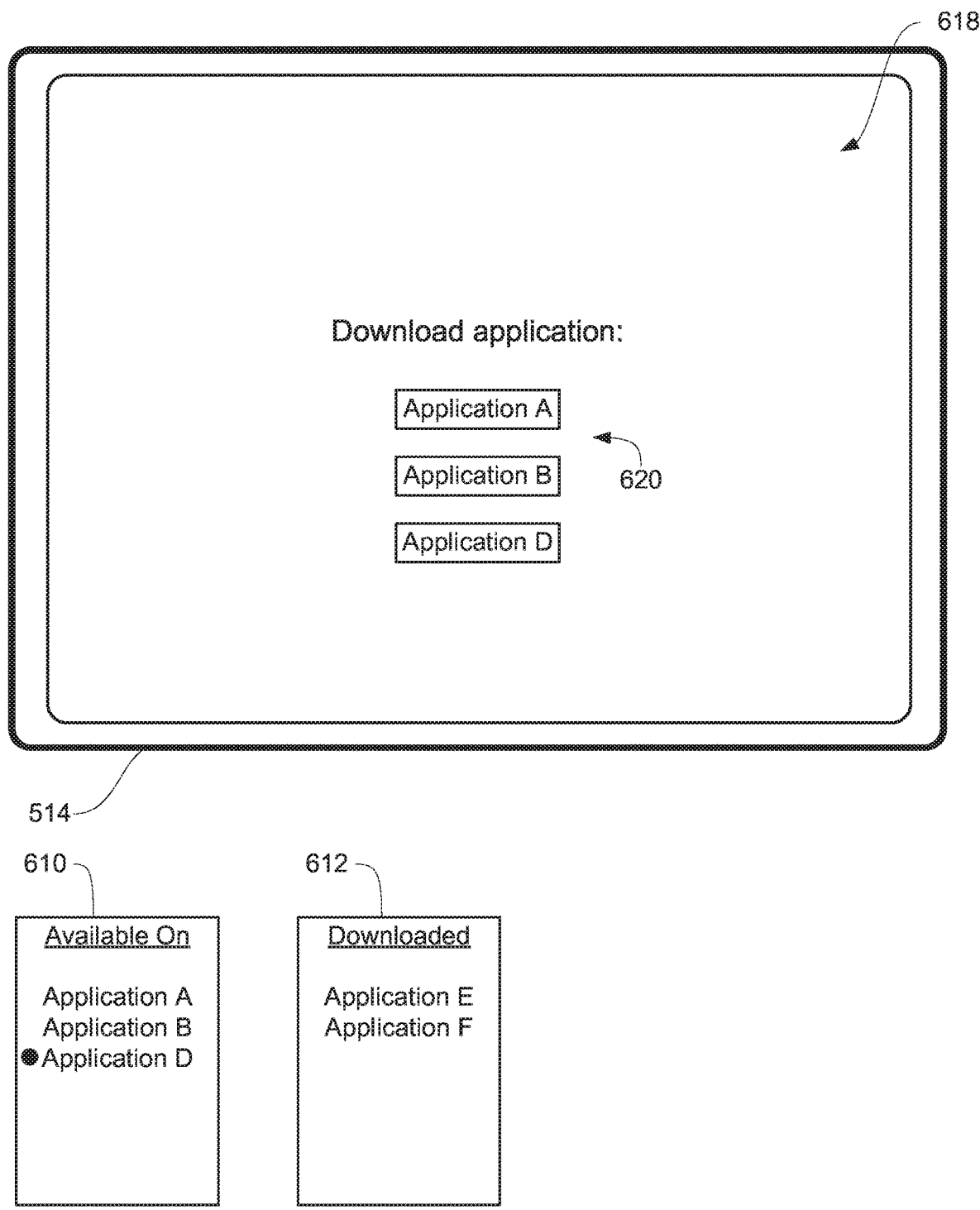

In some embodiments, the electronic device has no applications downloaded on it on which the Giants game is available, as in FIGS. 6Q-6Y. In such circumstances, single button 616 is optionally selectable to initiate a process for downloading an application on which the Giants game is available. For example, in FIG. 6Q, the Giants game is available on applications A, B and D, and the electronic device has applications E and F downloaded on it. The electronic device has entitlement to watch the Giants game on application D, but the electronic device optionally does not account for entitlement information in making its determinations about which application the user should download. As a result, the electronic device displays a single button 616 in overlay 606 that indicates the ability of the user to download an application on which the Giants game is available (e.g., "download"), but does not indicate a particular application that will be downloaded. Rather, when the user selects button 616, as shown in FIG. 6Q, the electronic device displays disambiguation user interface 618 from which the user selects the application the user wishes to download, as shown in FIG. 6R. Specifically, disambiguation user interface 618 includes buttons 620 selectable by the user for selecting the application the user wishes to download, and on which the Giants game is available (e.g., applications A, B and D, in FIG. 6R). In response to a selection, by the user, of a particular button in disambiguation user interface 618, the electronic device downloads the selected application.

Figure 6S:
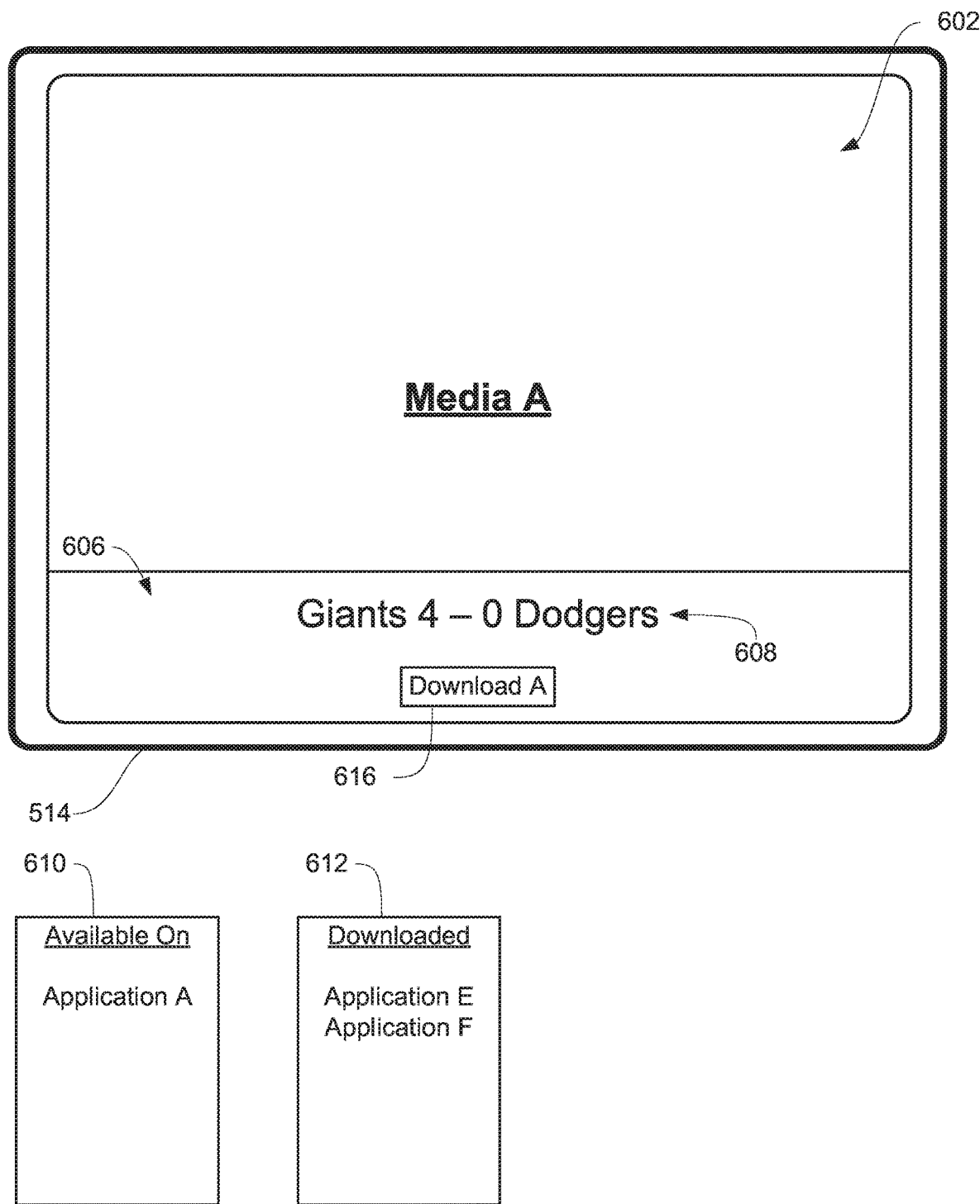

In some circumstances, rather than having multiple applications available for download on which the Giants game is available, only one application on which the Giants game is available is available for download, as in FIG. 6S. In particular, the Giants game is only available on application A, and thus only application A is available for download. As a result, the electronic device displays a single button 616 in overlay 606 that indicates the ability of the user to download a particular application on which the Giants game is available (e.g., "download A"). Single button 616 is optionally selectable to download application A on the electronic device.

In some embodiments, the electronic device optionally does account for entitlement information in making its determinations about which application the user should download, as in FIGS. 6T-6Y. Specifically, in FIG. 6T, the Giants game is available on applications A, B and D that are downloadable by the electronic device, but the electronic device only has entitlement to watch the Giants game on application D. As a result, the electronic device displays a single button 616 in overlay 606 that indicates the ability of the user to download a particular application on which the Giants game is available (e.g., "download D") and on which the electronic device is entitled to watch the Giants game. Single button 616 is optionally selectable to download application D on the electronic device.

Figure 6T:
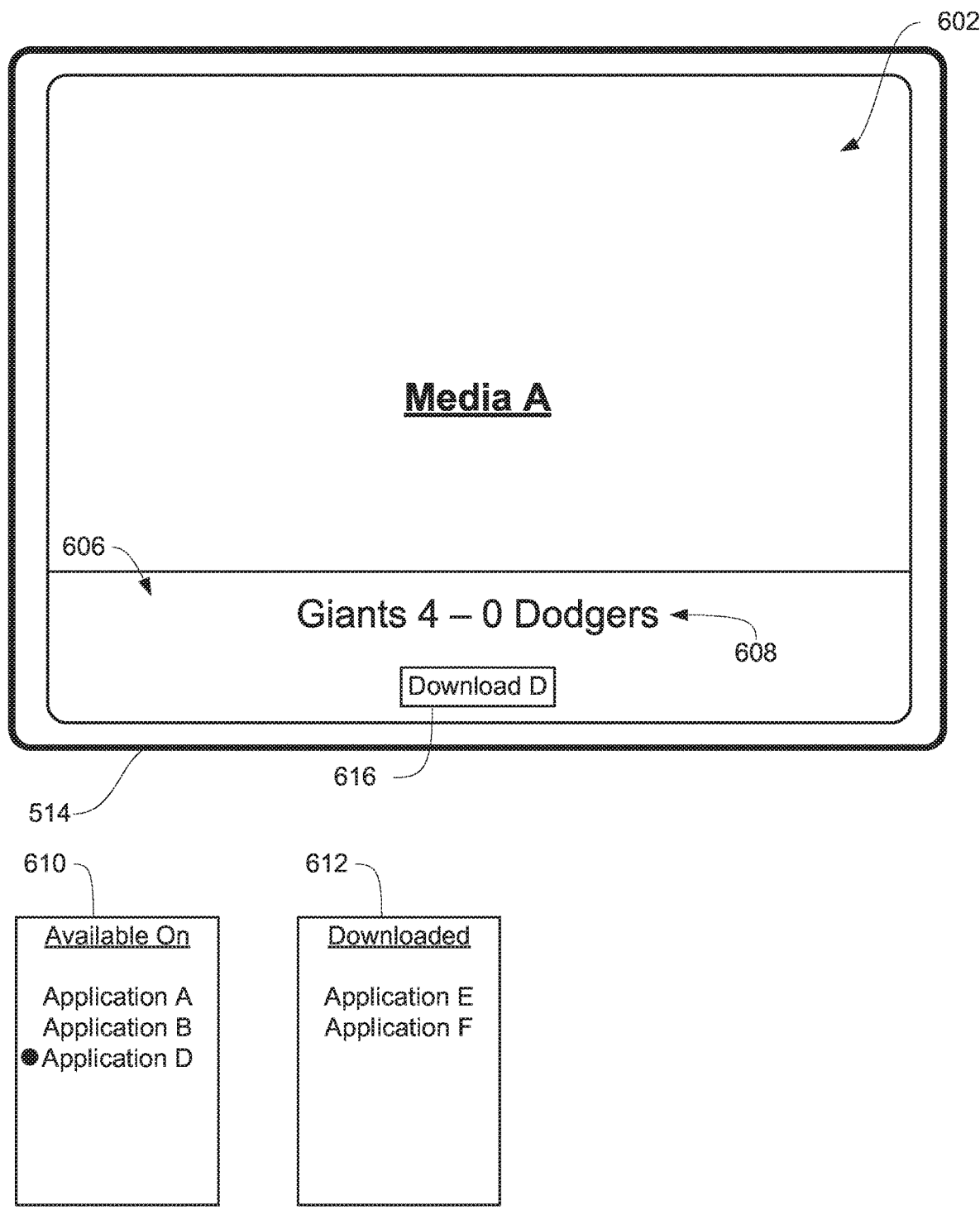
Figure 6U:
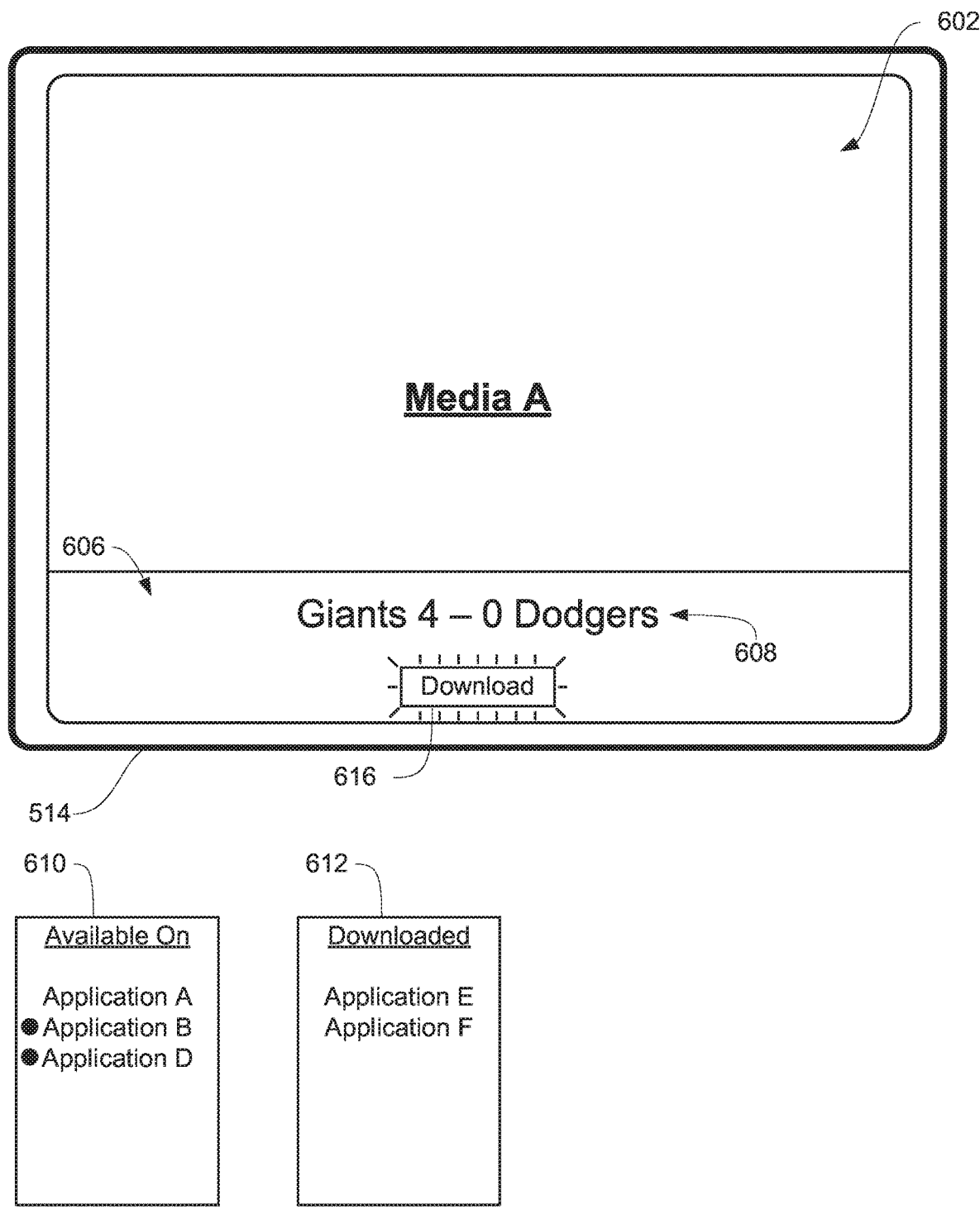
Figure 6V:
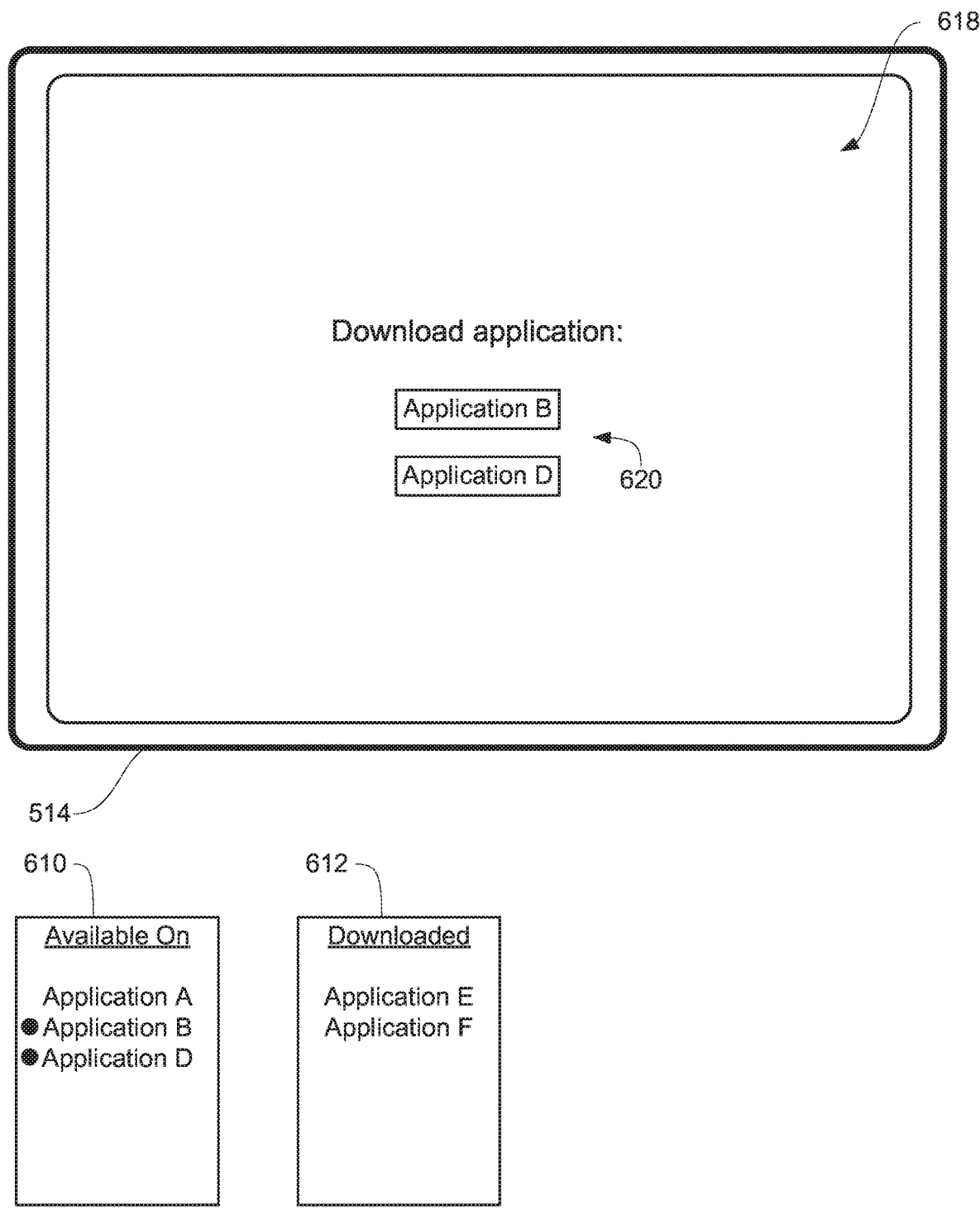

In some circumstances, rather than having a single application on which the Giants game is available and on which the electronic device is entitled to watch the Giants game, there are multiple applications available for download on which the Giants game is available and on which the electronic device has entitlement to watch the Giants game, as in FIG. 6U. Specifically, in FIG. 6U, the Giants game is available on applications A, B and D that are downloadable by the electronic device, and the electronic device has entitlement to watch the Giants game on applications B and D. As a result, the electronic device displays a single button 616 in overlay 606 that indicates the ability of the user to download an application on which the Giants game is available (e.g., "download"), but does not indicate a particular application that will be downloaded. Rather, when the user selects button 616, as shown in FIG. 6U, the electronic device displays disambiguation user interface 618 from which the user selects the application the user wishes to download, as shown in FIG. 6V. Specifically, disambiguation user interface 618 includes buttons 620 selectable by the user for selecting the application the user wishes to download, and on which the Giants game is available and on which the electronic device has entitlement to watch the Giants game (e.g., applications B and D, in FIG. 6V). In response to a selection, by the user, of a particular button in disambiguation user interface 618, the electronic device downloads the selected application.

Figure 6W:
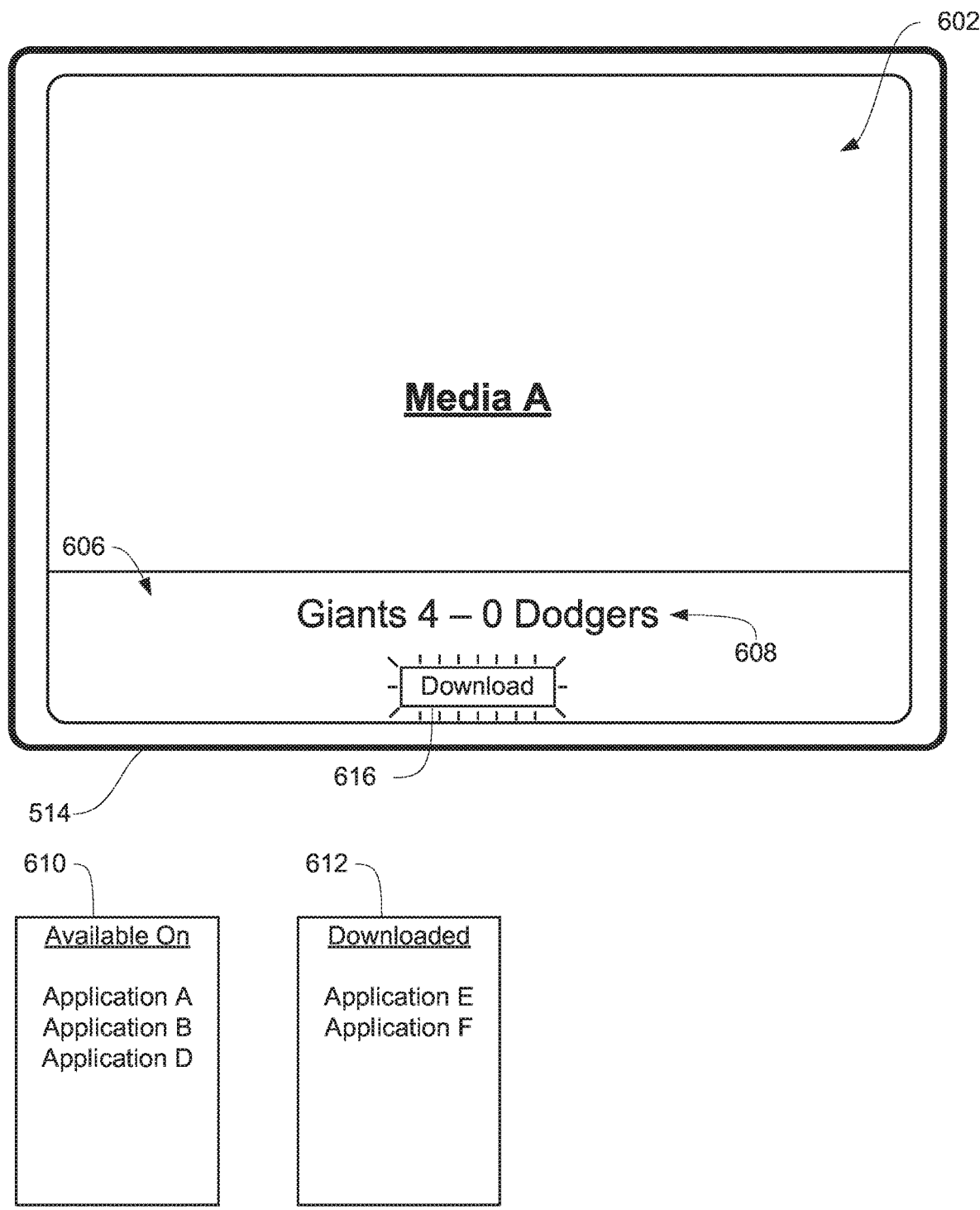
Figure 6X:
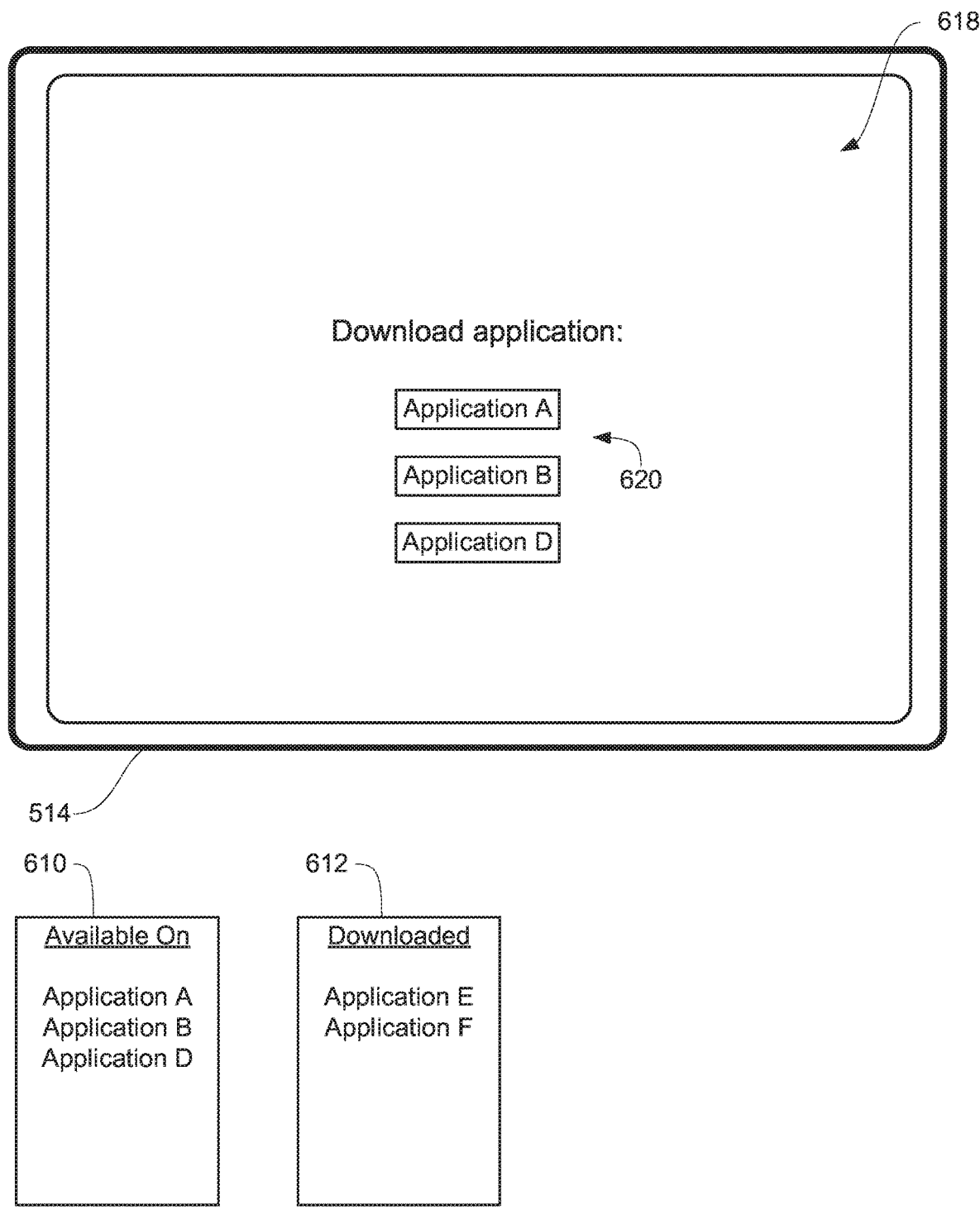

FIG. 6W illustrates a circumstance in which the electronic device has multiple applications available for download on which the Giants game is available, but on none of those applications does the electronic device have entitlement to watch the Giants game. Specifically, the Giants game is available on applications A, B and D that are downloadable by the electronic device, but the electronic device does not have entitlement to watch the Giants game on any of those applications. Because, in this case, there are multiple applications available for download on which the Giants game is available (and no preference for one over the other resulting from entitlement information), the electronic device displays a single button 616 in overlay 606 that indicates the ability of the user to download an application on which the Giants game is available (e.g., "download"), but does not indicate a particular application that will be downloaded. Rather, when the user selects button 616, as shown in FIG. 6W, the electronic device displays disambiguation user interface 618 from which the user selects the application the user wishes to download, as shown in FIG. 6X. Specifically, disambiguation user interface 618 includes buttons 620 selectable by the user for selecting the application the user wishes to download, and on which the Giants game is available (e.g., applications A, B and D, in FIG. 6X). In response to a selection, by the user, of a particular button in disambiguation user interface 618, the electronic device downloads the selected application.

Figure 6Y:
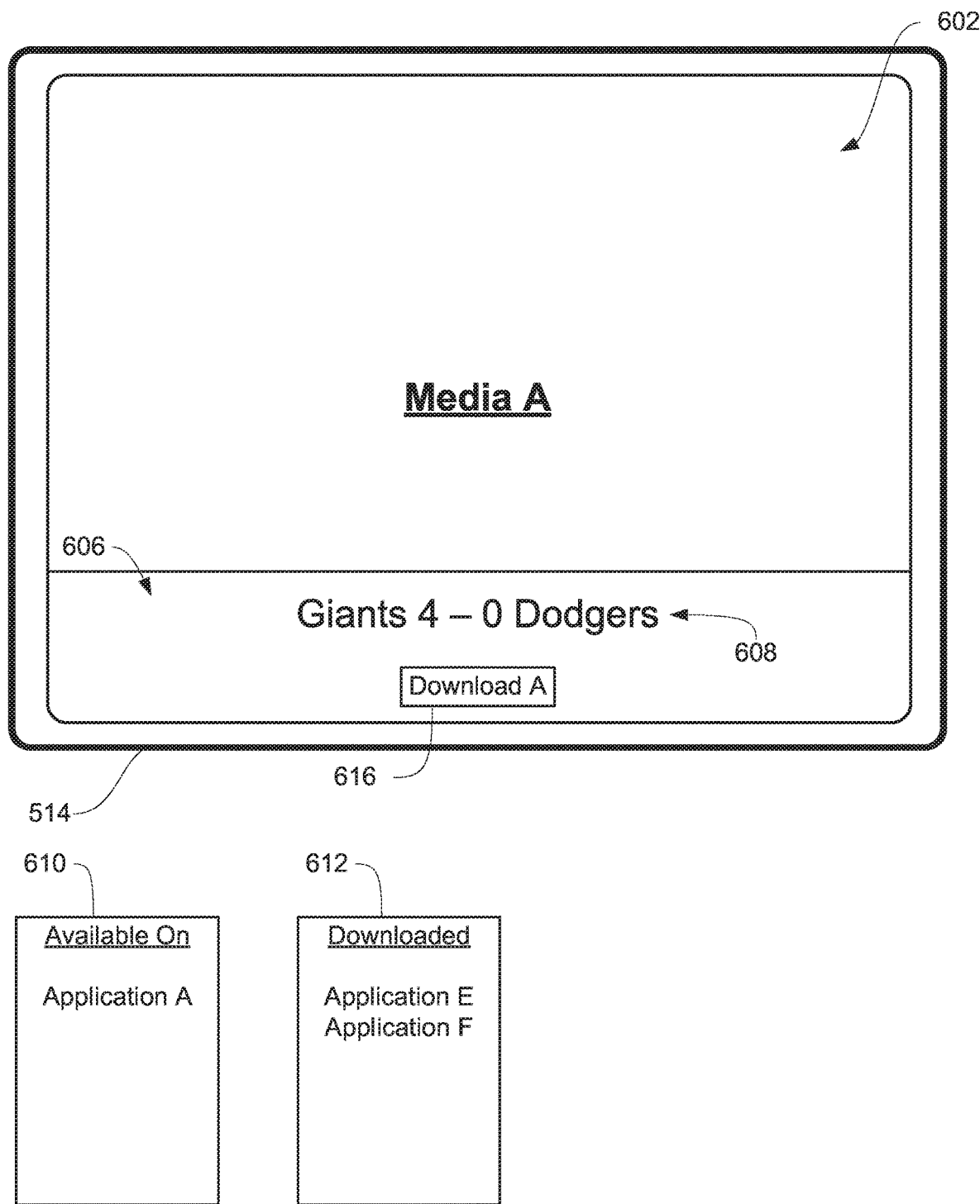

In some circumstances, rather than having multiple applications available for download on which the Giants game is available, only one application on which the Giants game is available is available for download, as in FIG. 6Y. In particular, the Giants game is only available on application A, and thus only application A is available for download. As a result, the electronic device displays a single button 616 in overlay 606 that indicates the ability of the user to download a particular application on which the Giants game is available (e.g., "download A"). Single button 616 is optionally selectable to download application A on the electronic device.

Figure 6Z:
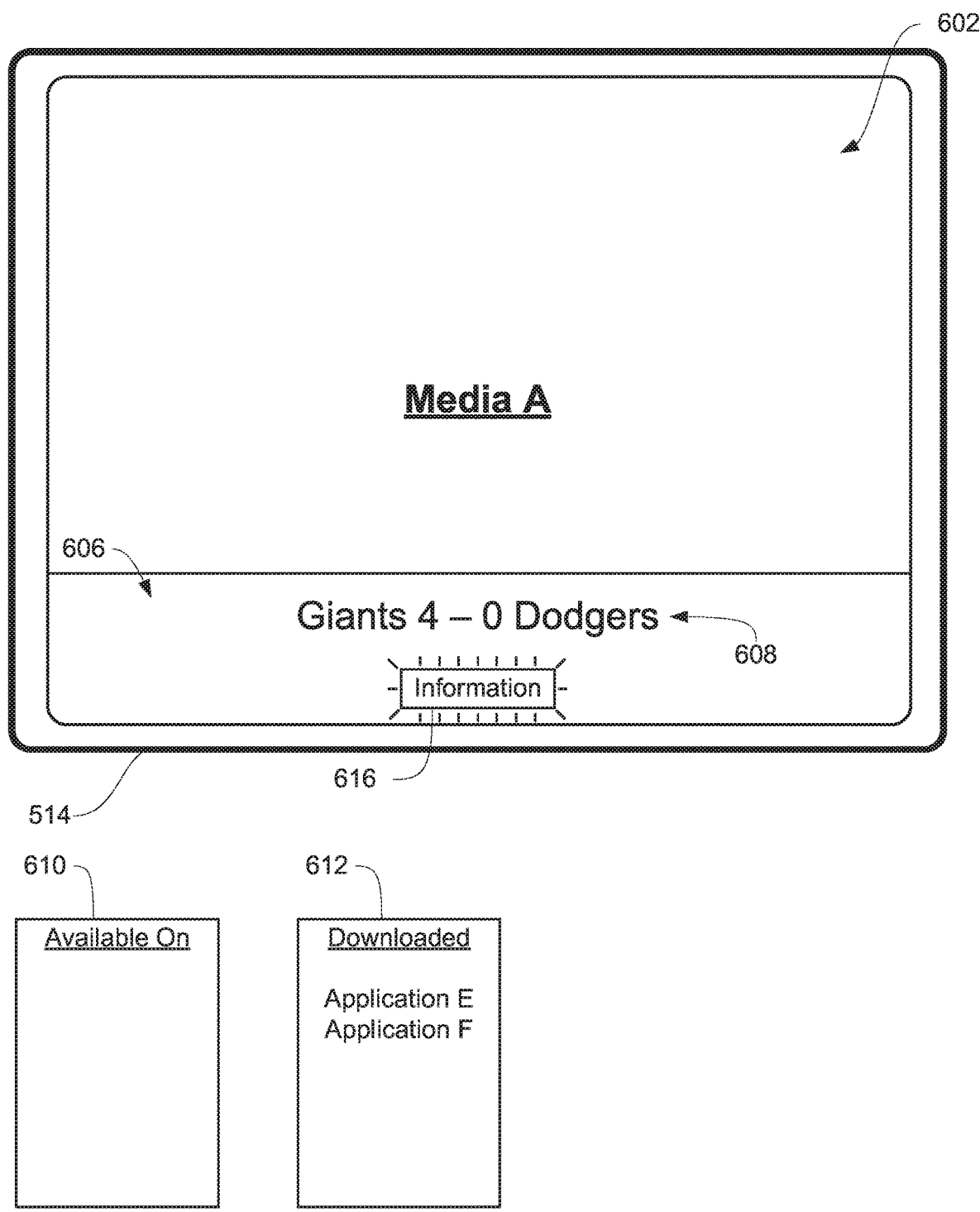
Figure 6A:
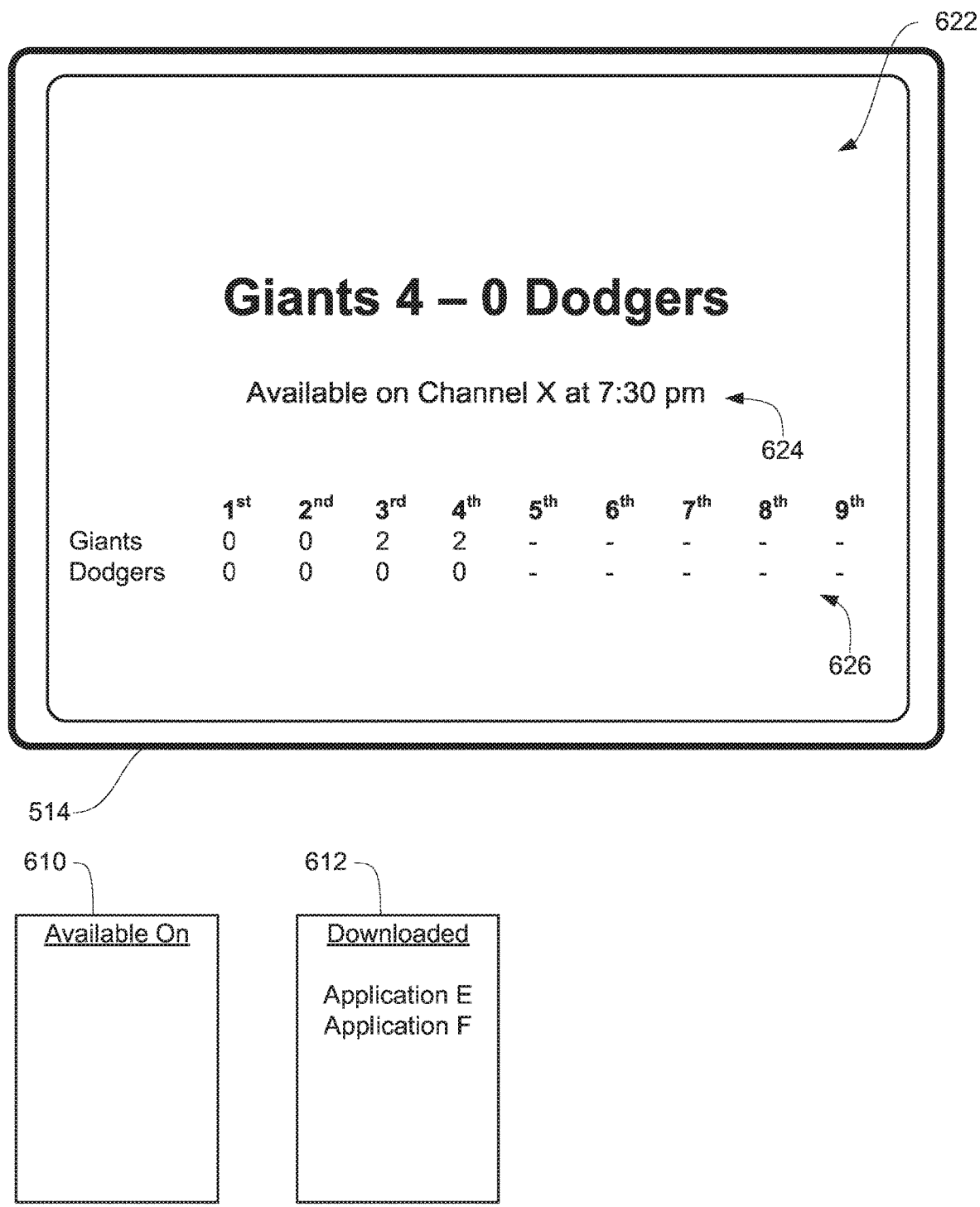
Figure 6B:
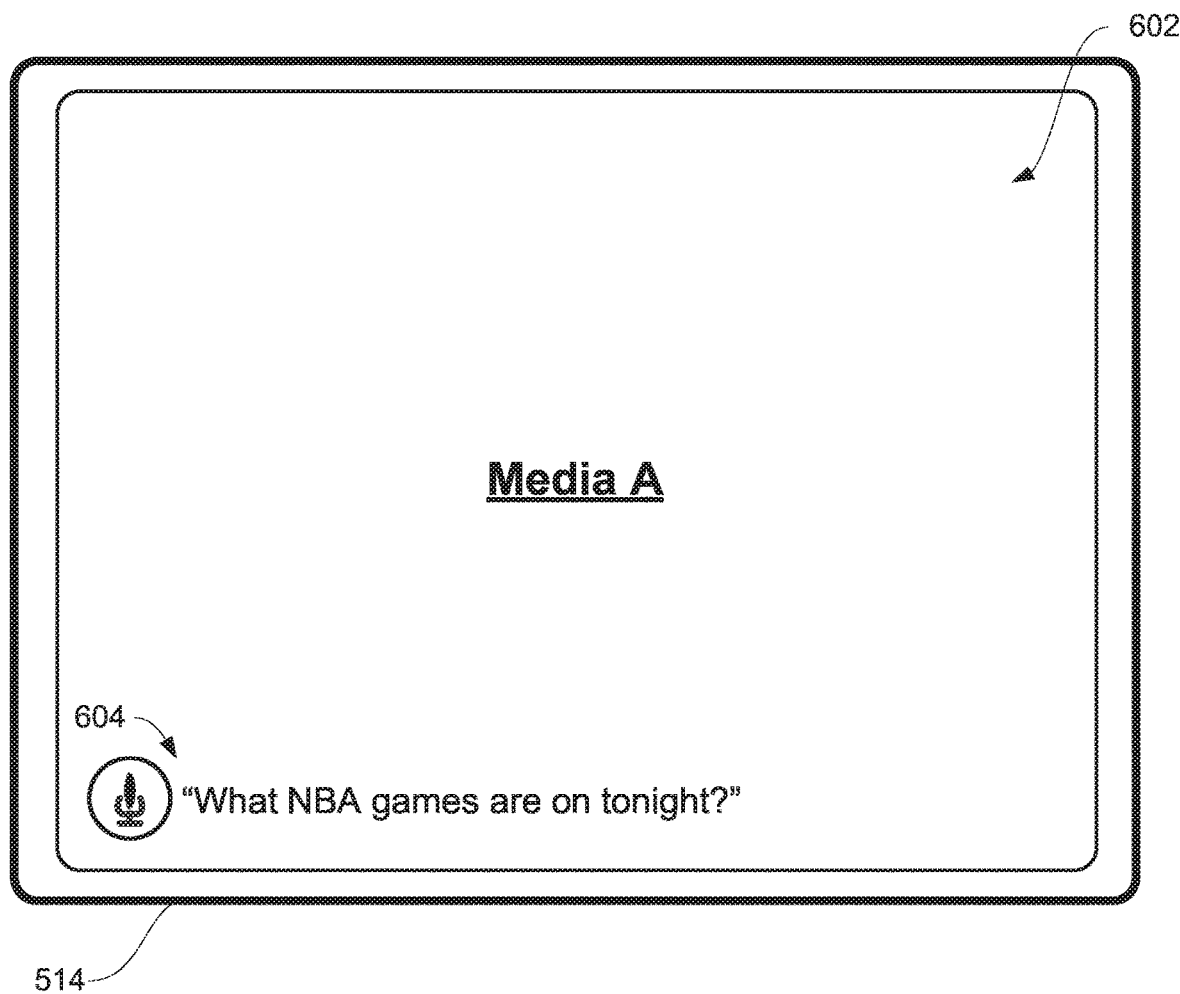
Figure 6C:
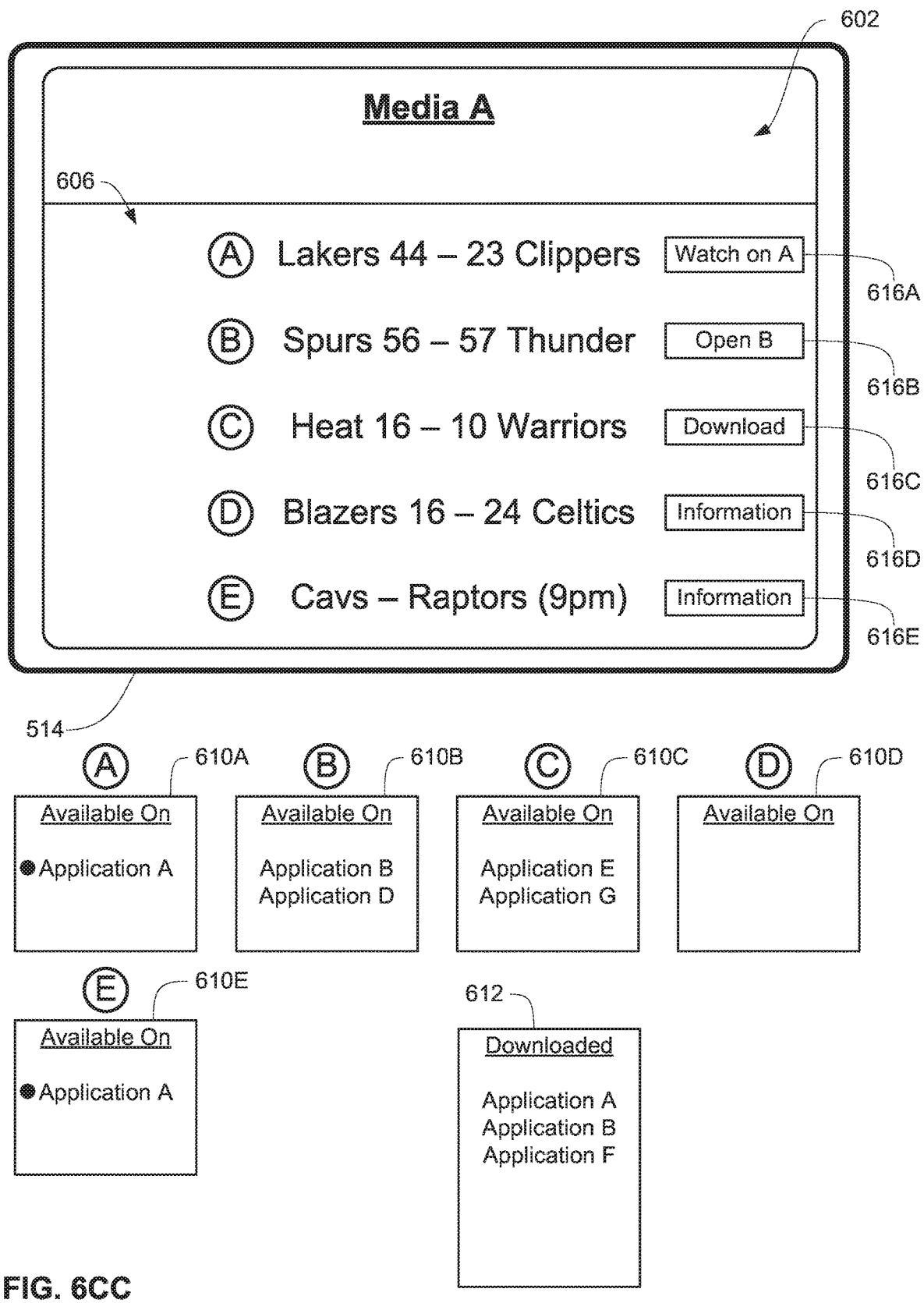
Figure 6D:
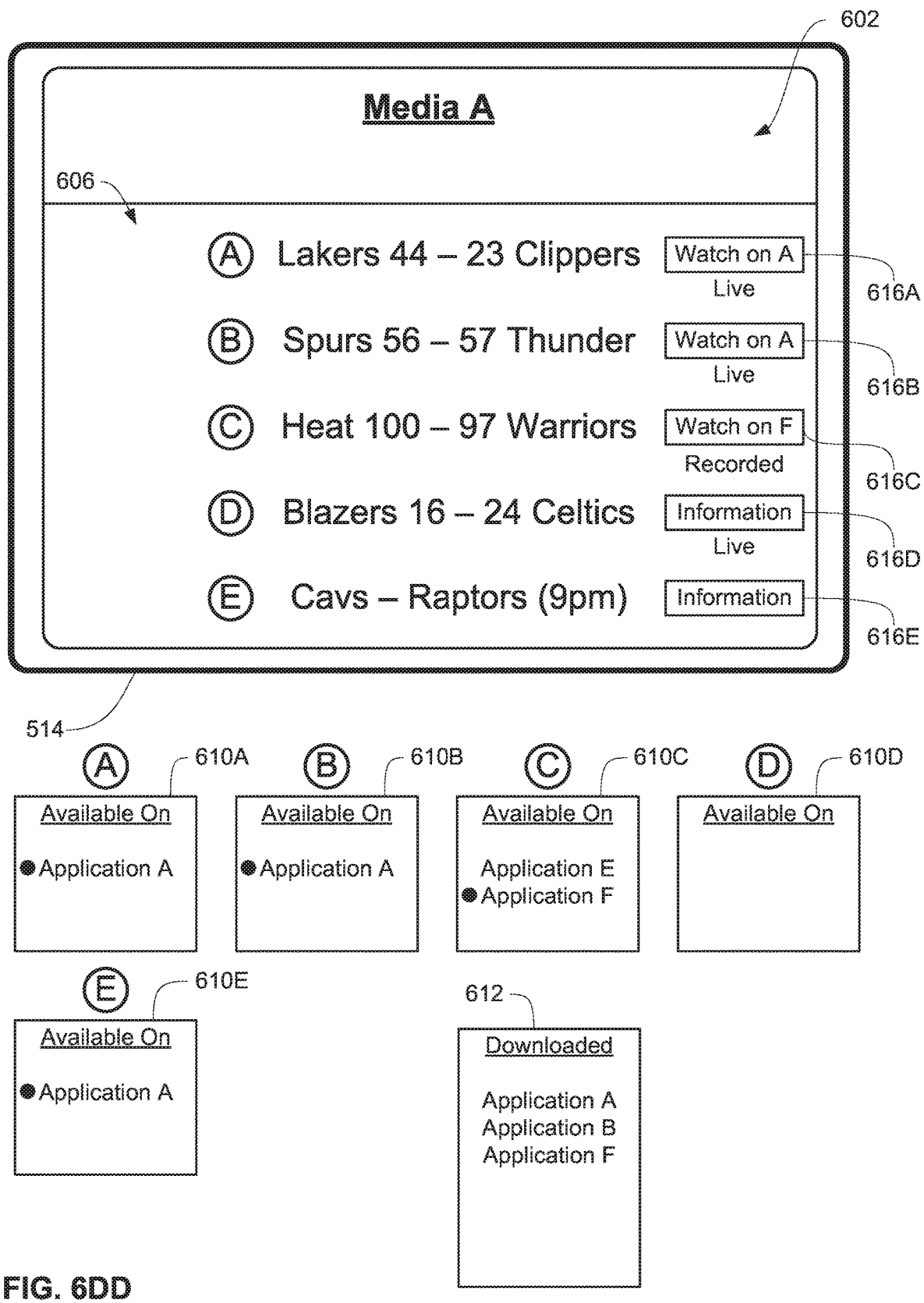
Figure 6E:
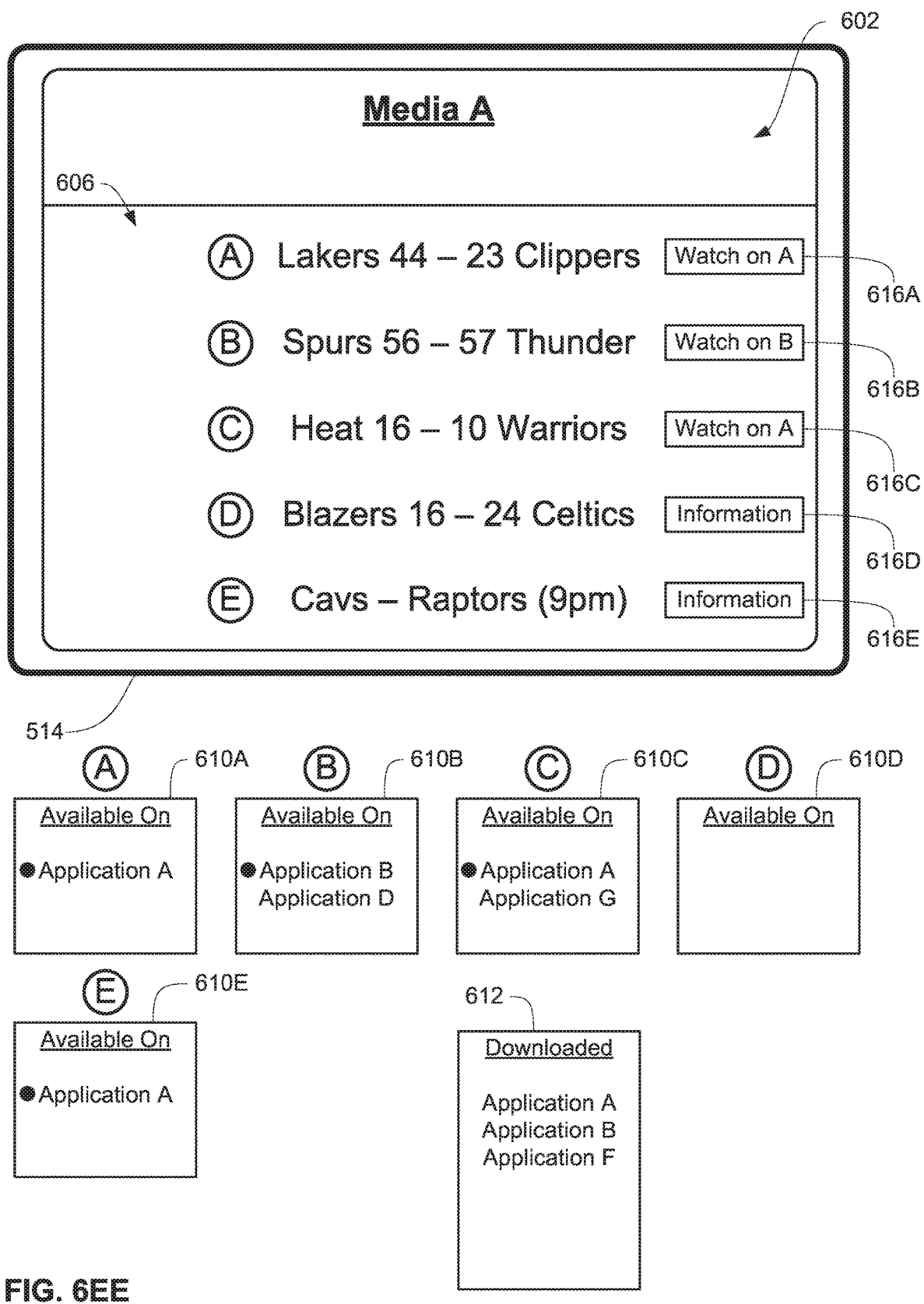

In some embodiments, the Giants game is not available on any applications, as shown in FIG. 6Z. The Giants game is optionally not available on any applications because it will not be available on an application at any time, or because it is not available on any applications at the current time, despite being available on an application at a later time. In such circumstances, the electronic device optionally displays a single button 616 in overlay 606 that indicates the ability of the user to view additional information about the Giants game (e.g., "information"), but does not indicate the ability of the user to download an application. Single button 616 is optionally selectable to view the additional information about the Giants game. Specifically, when the user selects button 616, as shown in FIG. 6Z, the electronic device displays additional information user interface 622 on display 514, as shown in FIG. 6AA. Additional information user interface 622 optionally includes additional information about the Giants game, such as the box score 626, and information 624 about the television channel(s) and the time at which the Giants game is airing. In some embodiments, additional information user interface 622 replaces overlay 606 on display 514, and is larger than overlay 606 on display (e.g., additional information user interface 622 is displayed on the full area of display 514).

In some circumstances, the user of the electronic device requests information about multiple media items (e.g., multiple games). For example, in FIG. 6BB, the user has provided the voice input "What NBA games are on tonight?", as shown by the visual indication 604 of the voice input displayed by the electronic device on display 514. In response, the electronic device displays, on display 514, overlay 606 overlaid on media A that includes multiple representations of media items that are relevant to the user's voice input, and buttons corresponding to those media items, as shown in FIG. 6CC. Specifically, in response to the user's voice input, the electronic device has determined that five NBA games are on tonight. The electronic device is displaying, in overlay 606, representations of these five NBA games (e.g., Lakers-Clippers with the current score, Spurs-Thunder with the current score, Heat-Warriors with the current score, Blazer-Celtics with the current score, and Cavs-Raptors with no score, as it has not yet begun), analogous to as described previously with reference to FIG. 6C, for example. Each of the five NBA games has its own availability information, as shown in boxes 610A (corresponding to Lakers-Clippers), 610B (corresponding to Spurs-Thunder), 610C (corresponding to Heat-Warriors), 610D (corresponding to Blazers-Celtics) and 610E (corresponding to Cavs-Raptors). Further, the electronic device has applications A, B and F downloaded on it, as shown in box 612, and has entitlement to watch the Lakers-Clippers and Cavs-Raptors games on application A.

In FIG. 6C, each representation of the NBA games is displayed with a button 616. The appearance and function of each of buttons 616A (corresponding to Lakers-Clippers), 616B (corresponding to Spurs-Thunder), 616C (corresponding to Heat-Warriors), 616D (corresponding to Blazers-Celtics) and 616E (corresponding to Cavs-Raptors) is determined by the electronic device based on the availability of the games, the entitlement(s) of the electronic device, the applications that are downloaded on the electronic device and/or the status of the games (e.g., live, recorded, future, etc.), as described with reference to FIGS. 6A-6AA. Thus, buttons 616 in FIG. 6CC optionally have any combination of appearances and functions of the buttons described with reference to FIGS. 6A-6AA. For example, in FIG. 6CC, button 616A indicates "watch on A," because the Lakers-Clippers game is available on application A, application A is downloaded on the electronic device, and the electronic device has entitlement to watch the Lakers-Clippers game on application A. Button 616A is optionally selectable to watch the Lakers-Clippers game on application A (e.g., selection of button 616A optionally launches application A on the electronic device, and displays the Lakers-Clippers game in application A). Button 616B indicates "open B," because the Spurs-Thunder game is available on applications B and D, but the electronic device only has application B downloaded on it, and the electronic device does not have entitlement to watch the Spurs-Thunder game on application B. Thus, button 616B is optionally selectable to launch application B on the electronic device, without displaying the Spurs-Thunder game on application B.

Button 616C indicates "download," because the Heat-Warriors game is available on applications E and G, neither of which is downloaded on the electronic device, and via neither of which is the electronic device entitled to watch the Heat-Warriors game. Thus, button 616C is optionally selectable to display a disambiguation user interface (e.g., as described with reference to FIG. 6R) where the user optionally selects which of applications E and G to download to the electronic device. Button 616D indicates "information," because the Blazers-Celtics game is not available to be watched on any application. Thus, button 616D is optionally selectable to display additional information about the Blazers-Celtics game (e.g., as described with reference to FIG. 6AA). Finally, button 616E indicates "information," because while the Cavs-Raptors game is available on application A, and the electronic device has entitlement to watch the Cavs-Raptors game on application A, the Cavs-Raptors game has not yet started (e.g., it starts at 9 pm, which is in the future). Thus, button 616E is optionally selectable to display additional information about the Cavs-Raptors game (e.g., as described with reference to FIG. 6AA).

FIG. 6DD illustrates a scenario in which media having different status are provided by different applications (e.g., live media is available on one or more applications, while recorded media is available on one or more different applications, etc.), and thus the applications associated with buttons 616 depend the status of the media associated with the buttons. For example, the Lakers-Clippers game, the Spurs-Thunder game and the Blazers-Celtics game are live, while the Heat-Warriors game is recorded (the Cavs-Raptors game has not yet started). Button 616A indicates "watch on A," because the Lakers-Clippers game is available on application A because it is live, application A is downloaded on the electronic device, and the electronic device has entitlement to watch the Lakers-Clippers game on application A. Button 616A is optionally selectable to watch the Lakers-Clippers game on application A (e.g., selection of button 616A optionally launches application A on the electronic device, and displays the Lakers-Clippers game in application A). Button 616B also indicates "watch on A," because the Spurs-Thunder game is available on application A because it is live, application A is downloaded on the electronic device, and the electronic device has entitlement to watch the Spurs-Thunder game on application A. Thus, button 616B is optionally selectable to watch the Spurs-Thunder game on application A.

In contrast, button 616C indicates "watch on F," because the Heat-Warriors game is available on application F because it is recorded, application F is downloaded on the electronic device, and the electronic device has entitlement to watch the Heat-Warriors game on application F. Button 616C is optionally selectable to watch the Heat-Warriors game on application F. Button 616D indicates "information," because the Blazers-Celtics game is not available to be watched on any application. Thus, button 616D is optionally selectable to display additional information about the Blazers-Celtics game (e.g., as described with reference to FIG. 6AA). Finally, button 616E indicates "information," because while the Cavs-Raptors game is available on application A, and the electronic device has entitled to watch the Cavs-Raptors game on application A, the Cavs-Raptors game has not yet started (e.g., it starts at 9 pm, which is in the future). Thus, button 616E is optionally selectable to display additional information about the Cavs-Raptors game (e.g., as described with reference to FIG. 6AA).

FIG. 6EE illustrates a scenario in which the applications associated with buttons 616 depend on the entitlements of the electronic device. For example, the electronic device is entitled to watch the Lakers-Clippers and Heat-Warriors games on application A, but is entitled to watch the Spurs-Thunder game on application B. Therefore, buttons 616A and 616C indicate "watch on A," and button 616B indicates "watch on B." The remaining details of buttons 616A, 616B, 616C, 616D and 616E are optionally as described above with respect to FIGS. 6A-6DD.

Figure 7A:
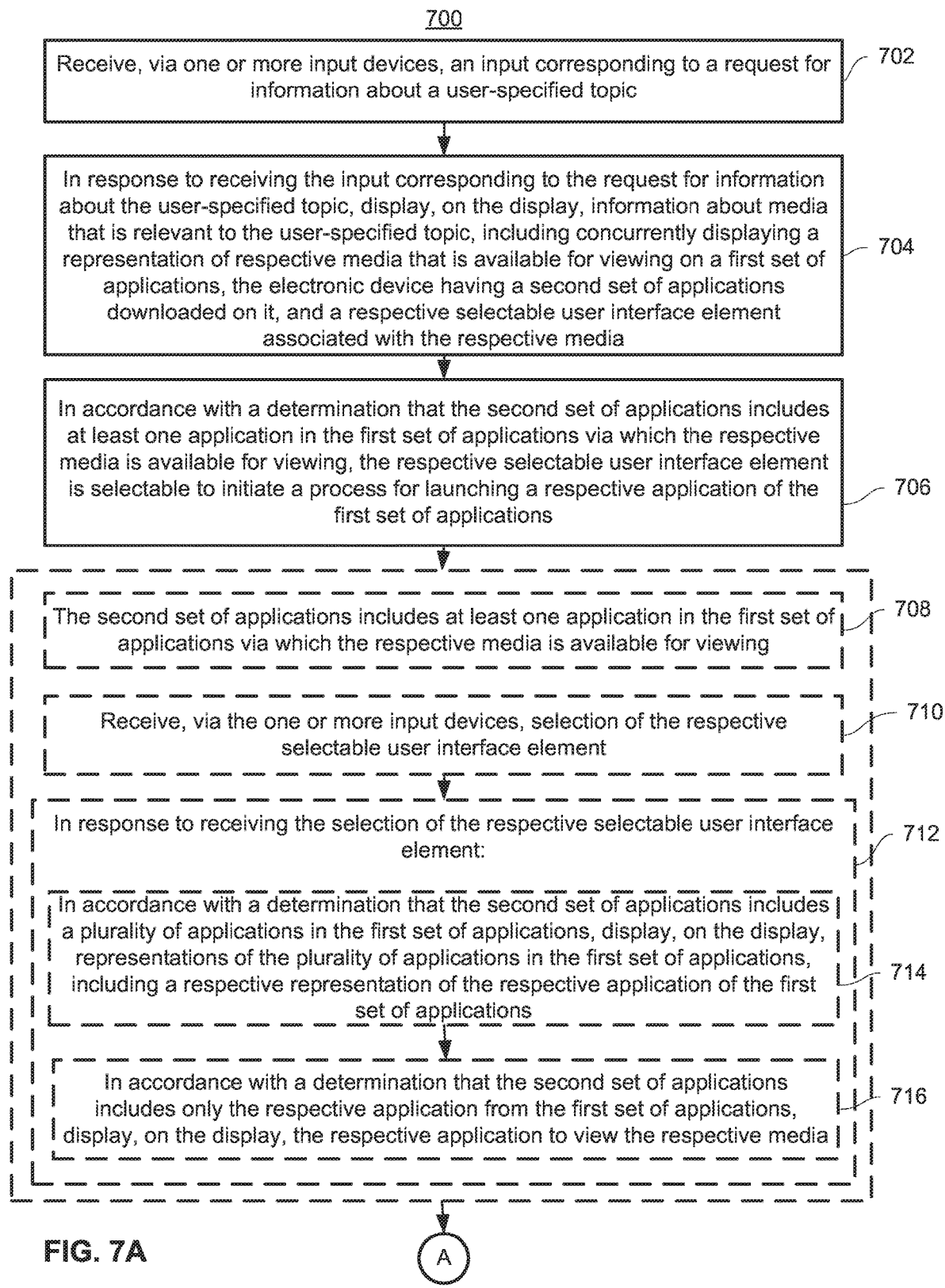
FIGS. 7A-7N are flow diagrams illustrating a method of presenting a user with options for viewing media on one or more applications in accordance with some embodiments of the disclosure.
Figure 7B:
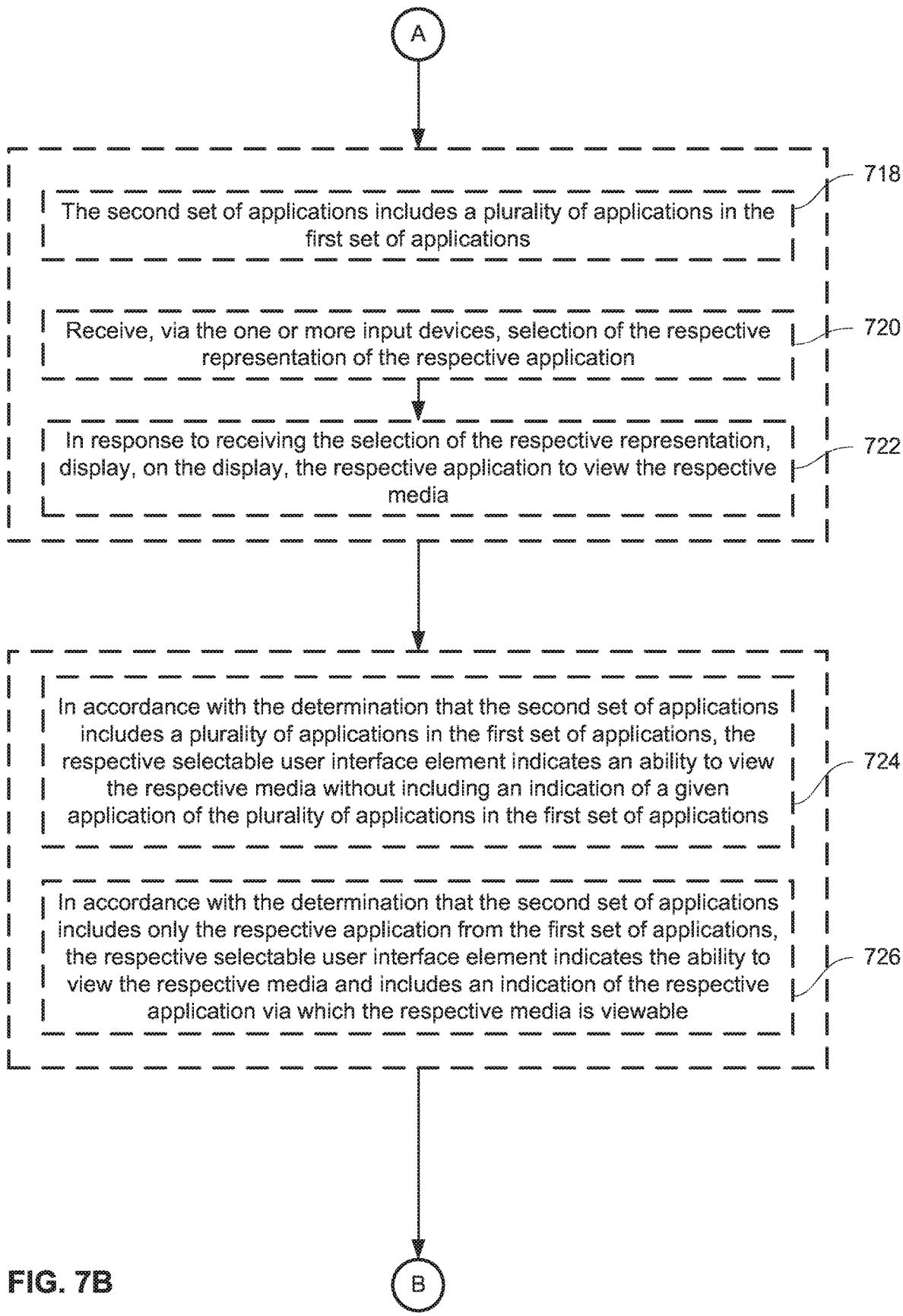
Figure 7C:
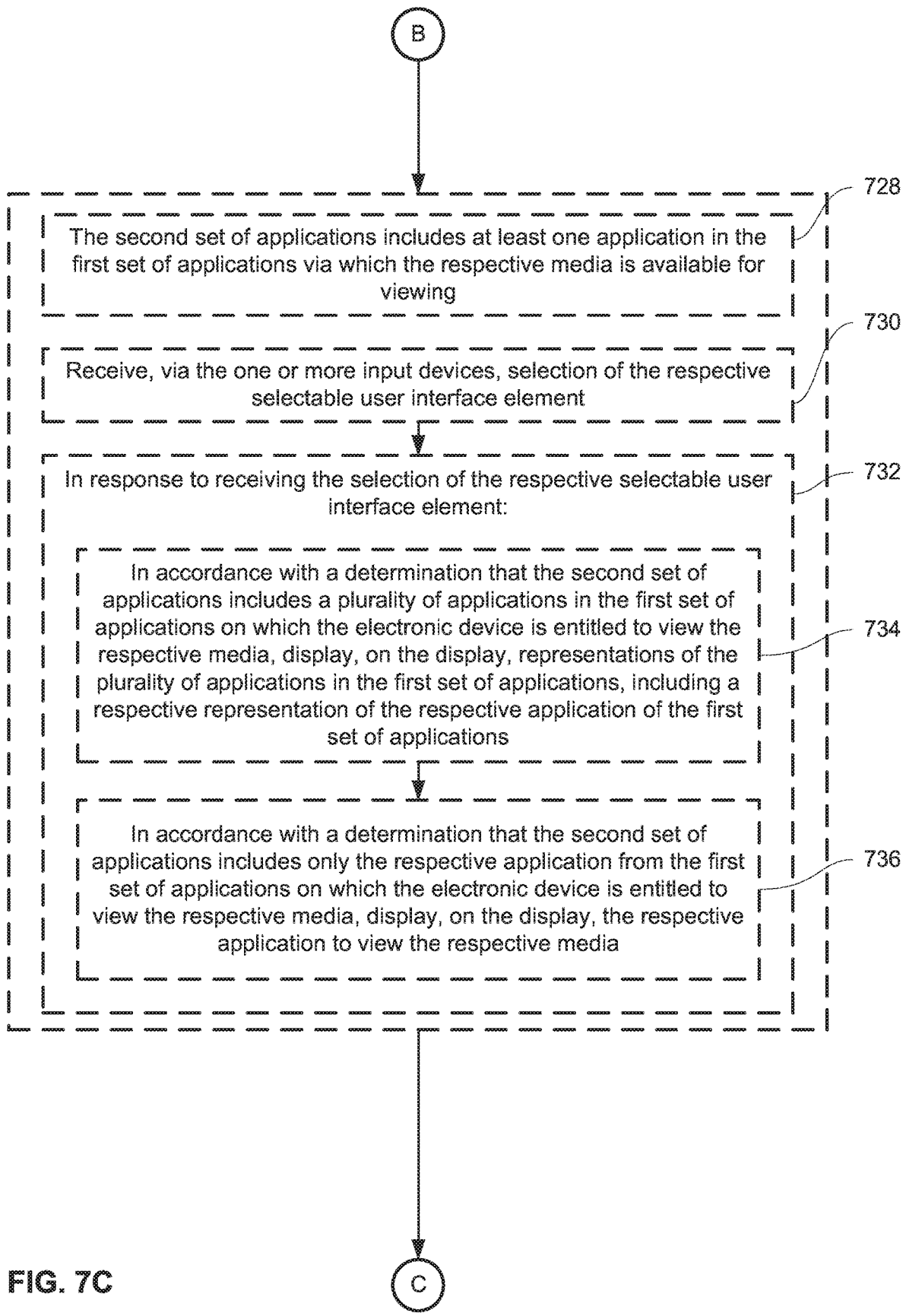
Figure 7D:
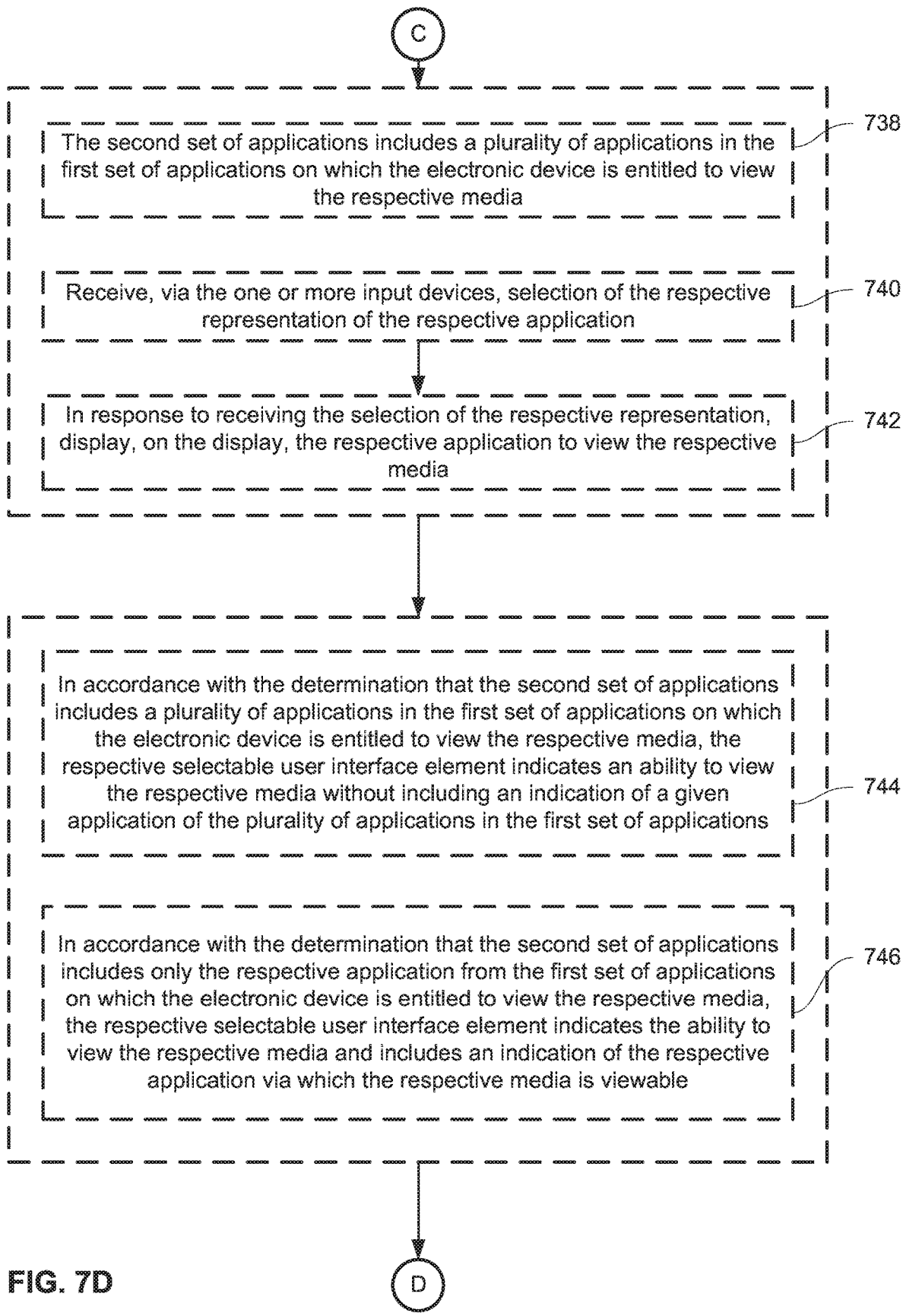
Figure 7E:
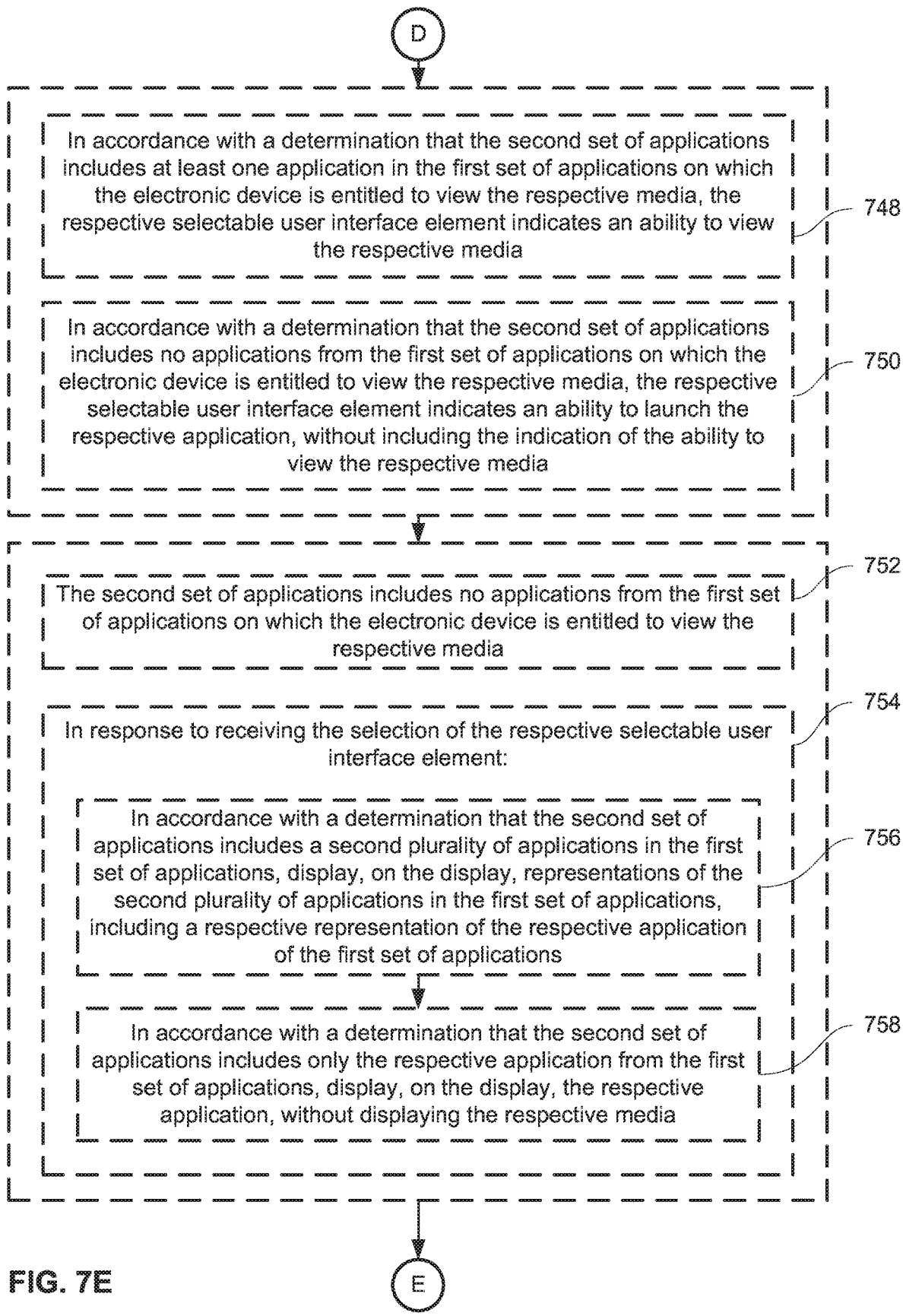
Figure 7F:
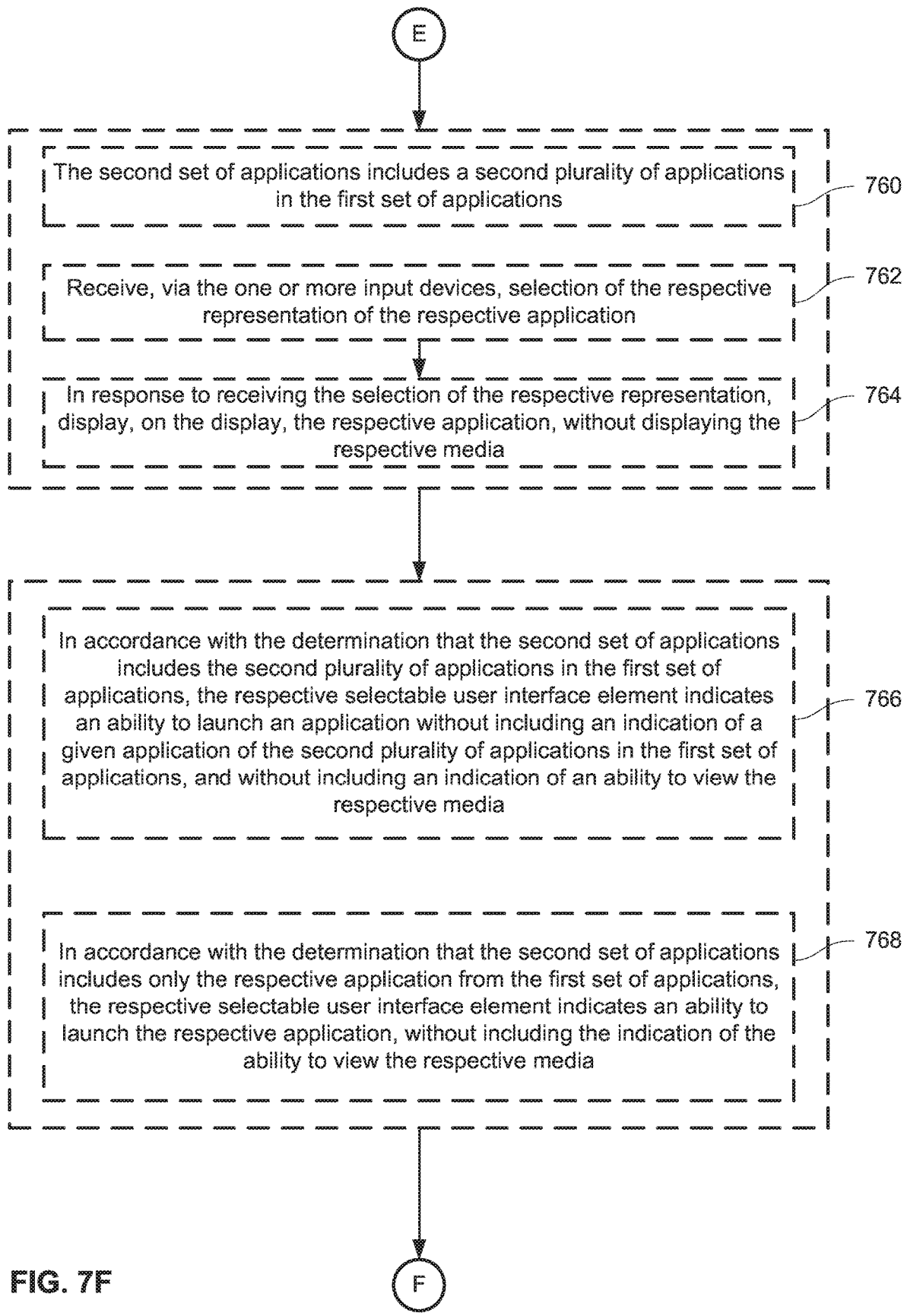
Figure 7G:
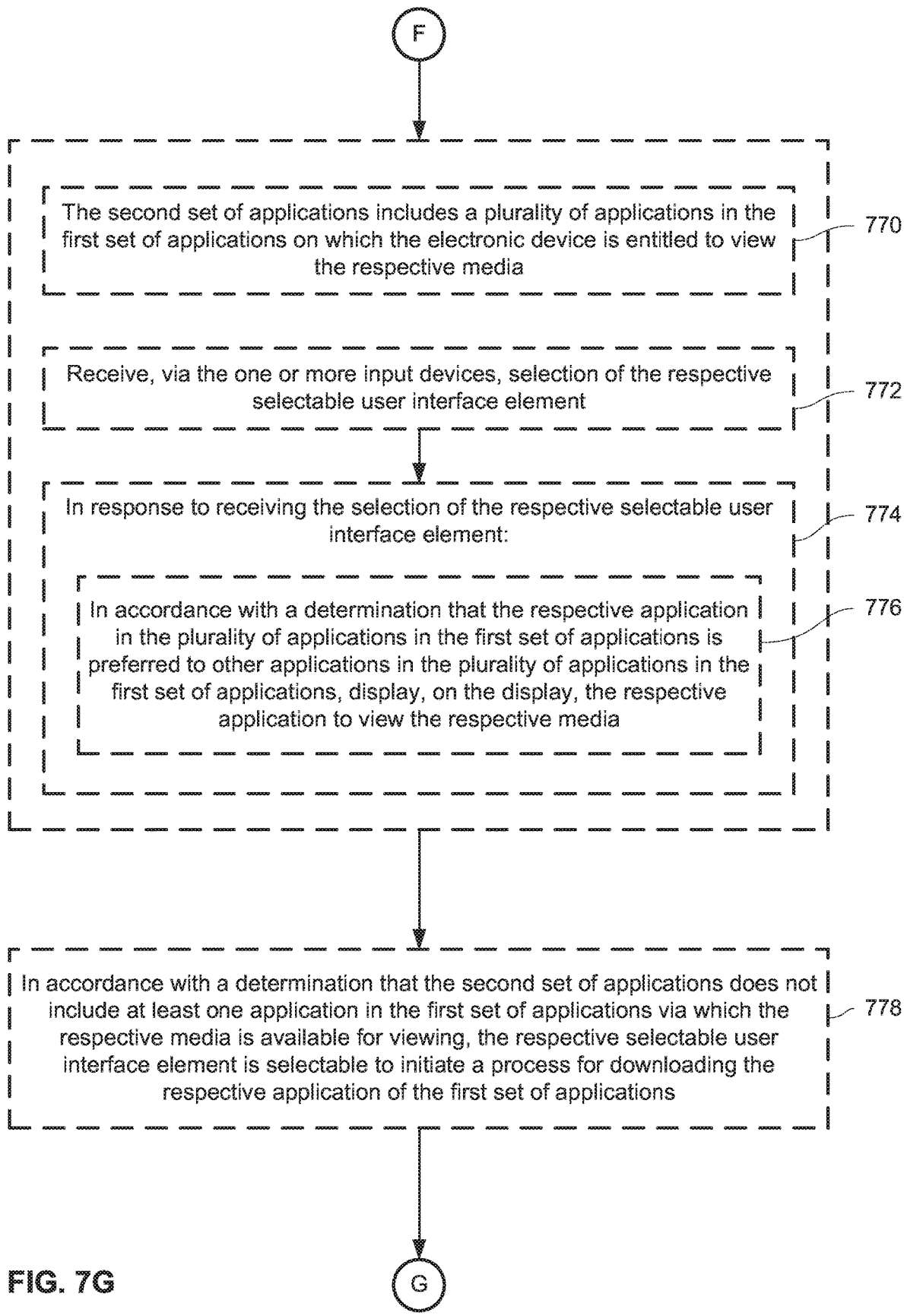
Figure 7H:
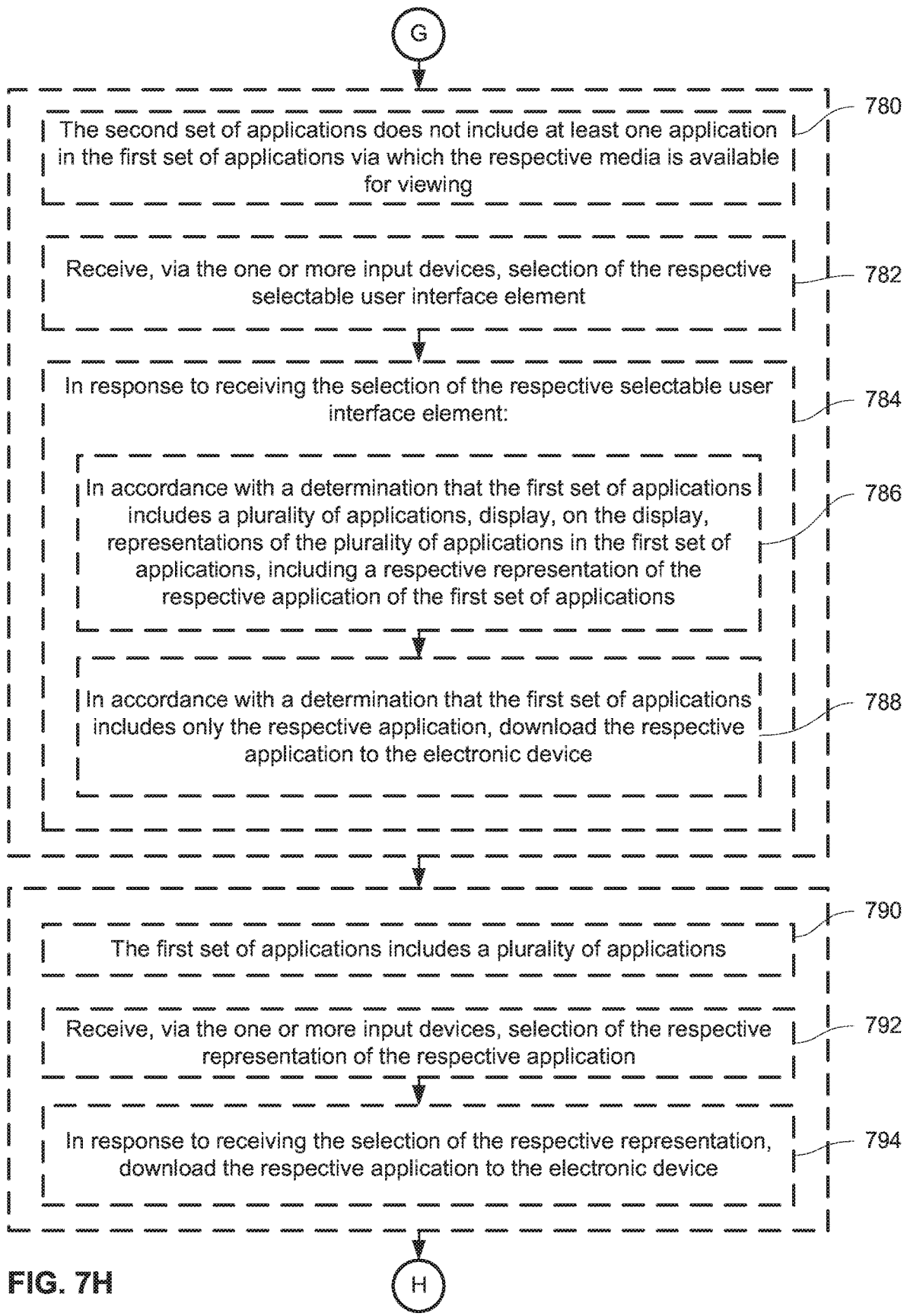
Figure 7I:
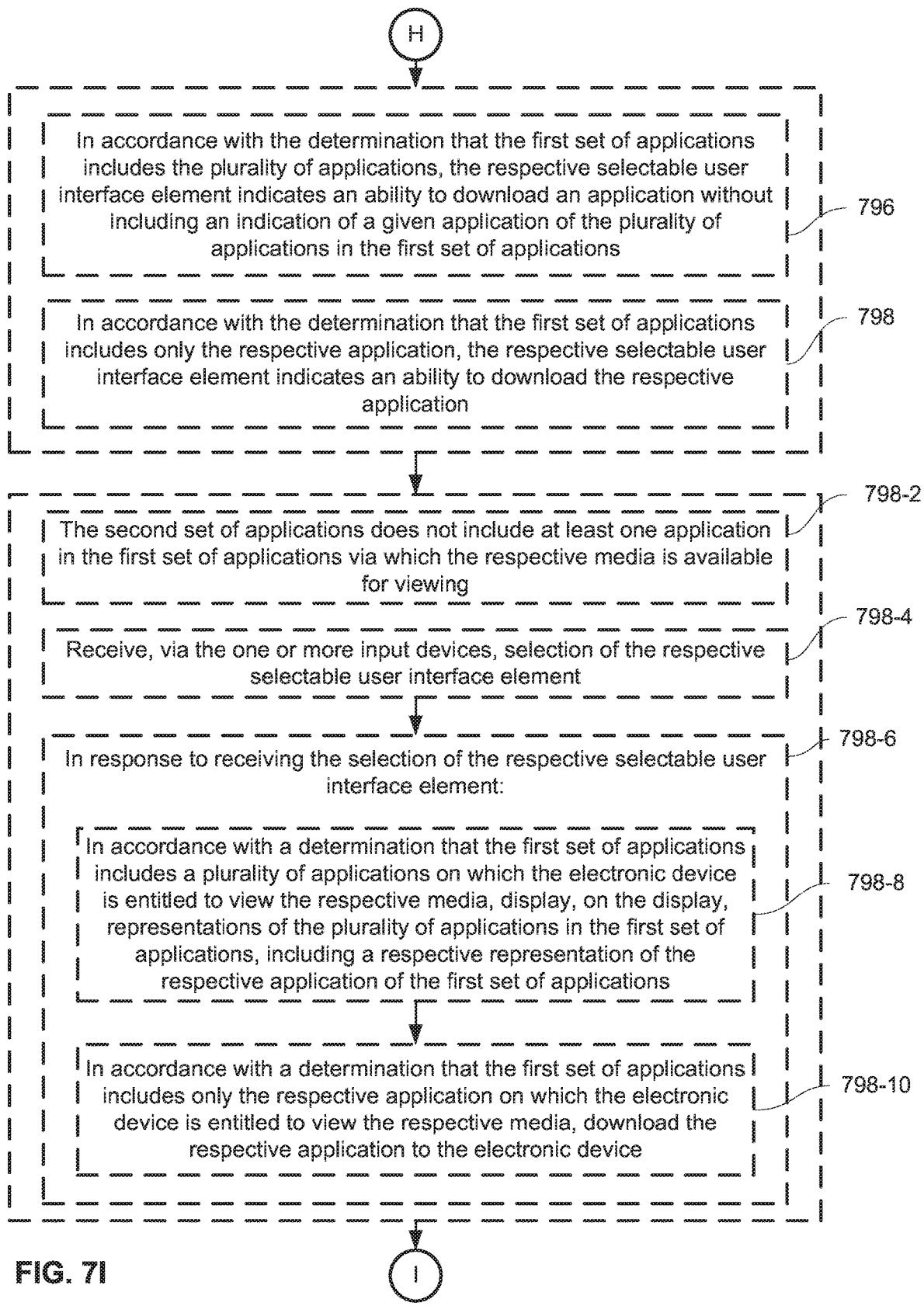
Figure 7J:
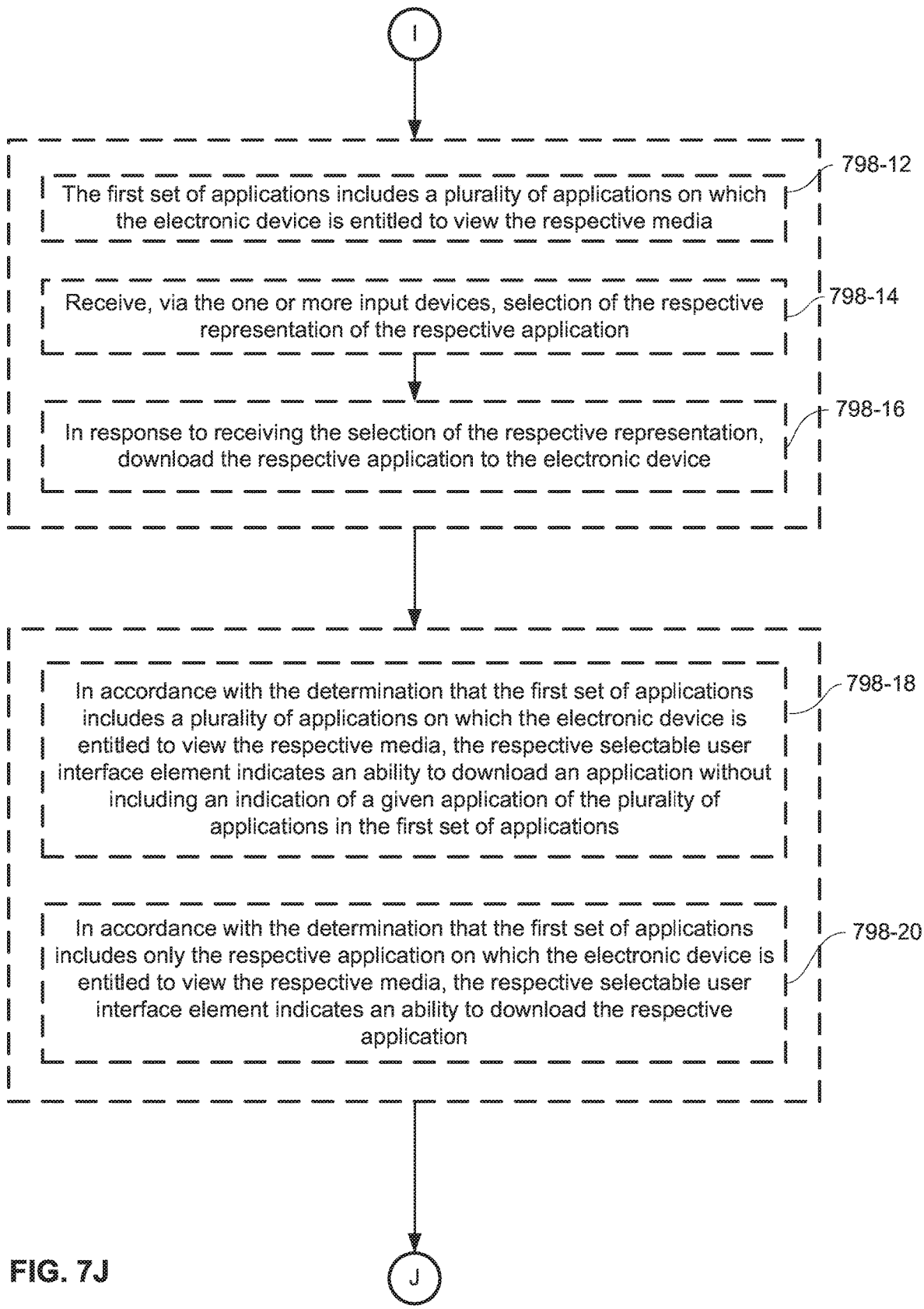
Figure 7K:
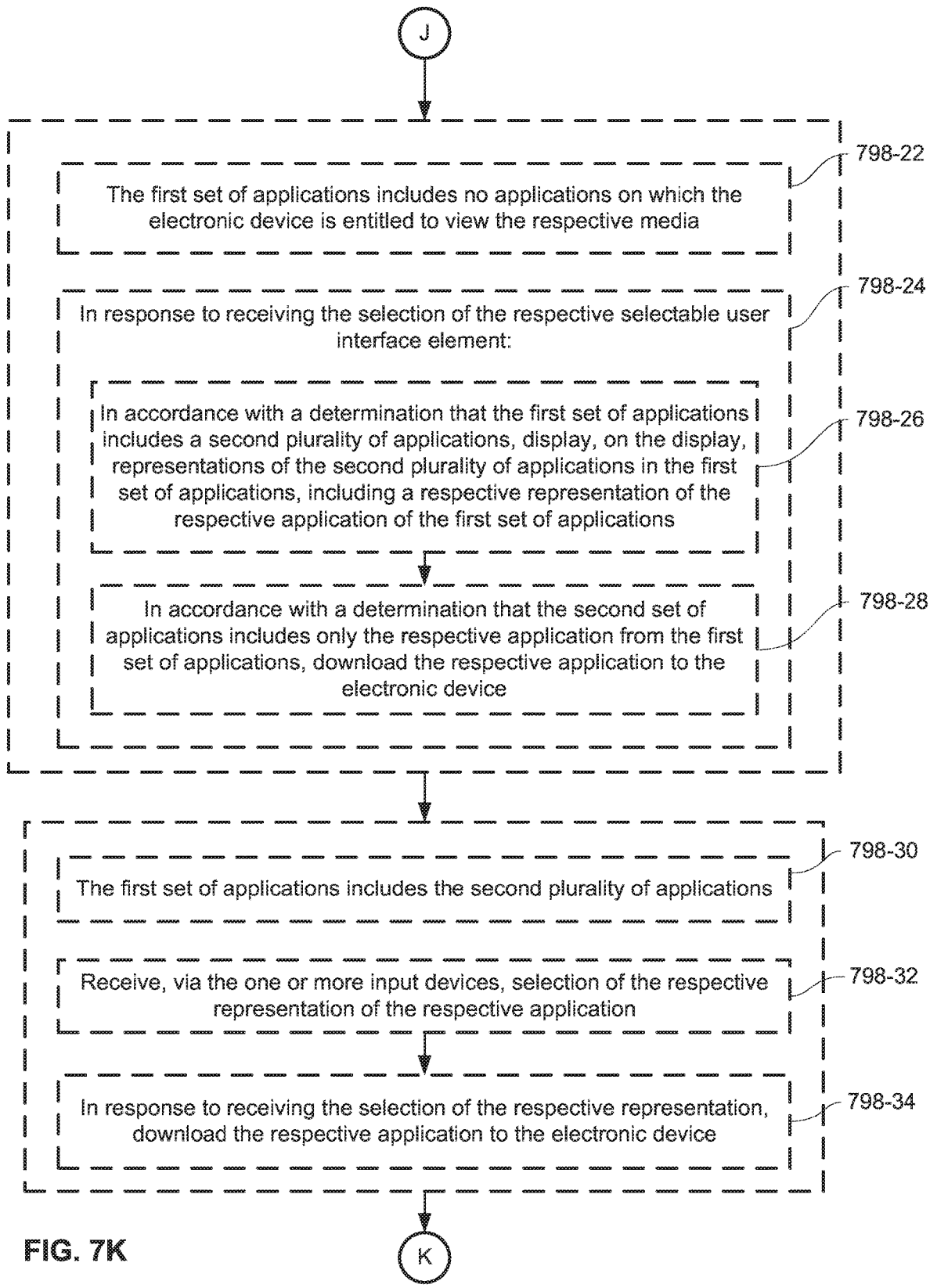
Figure 7L:
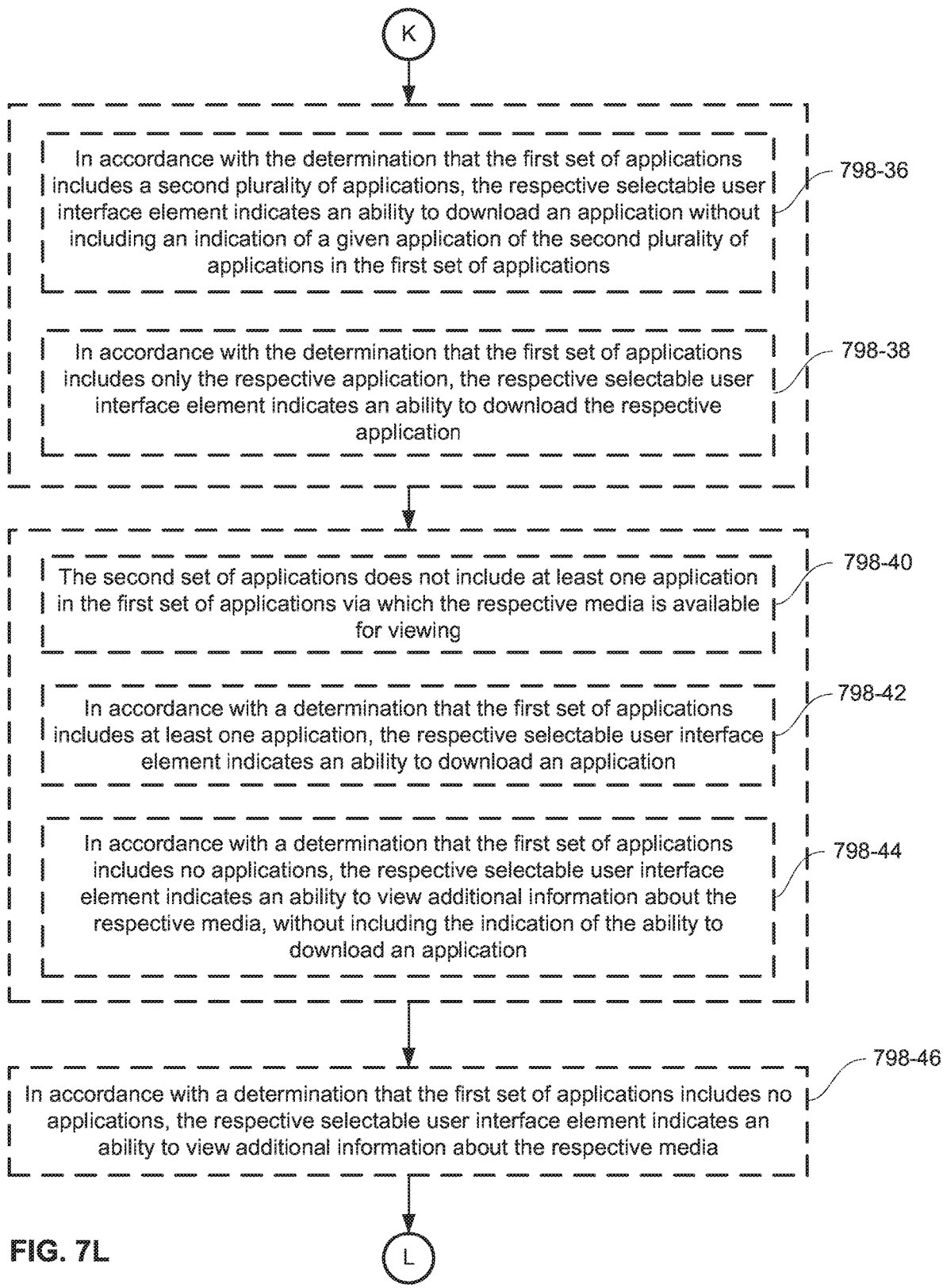
Figure 7M:
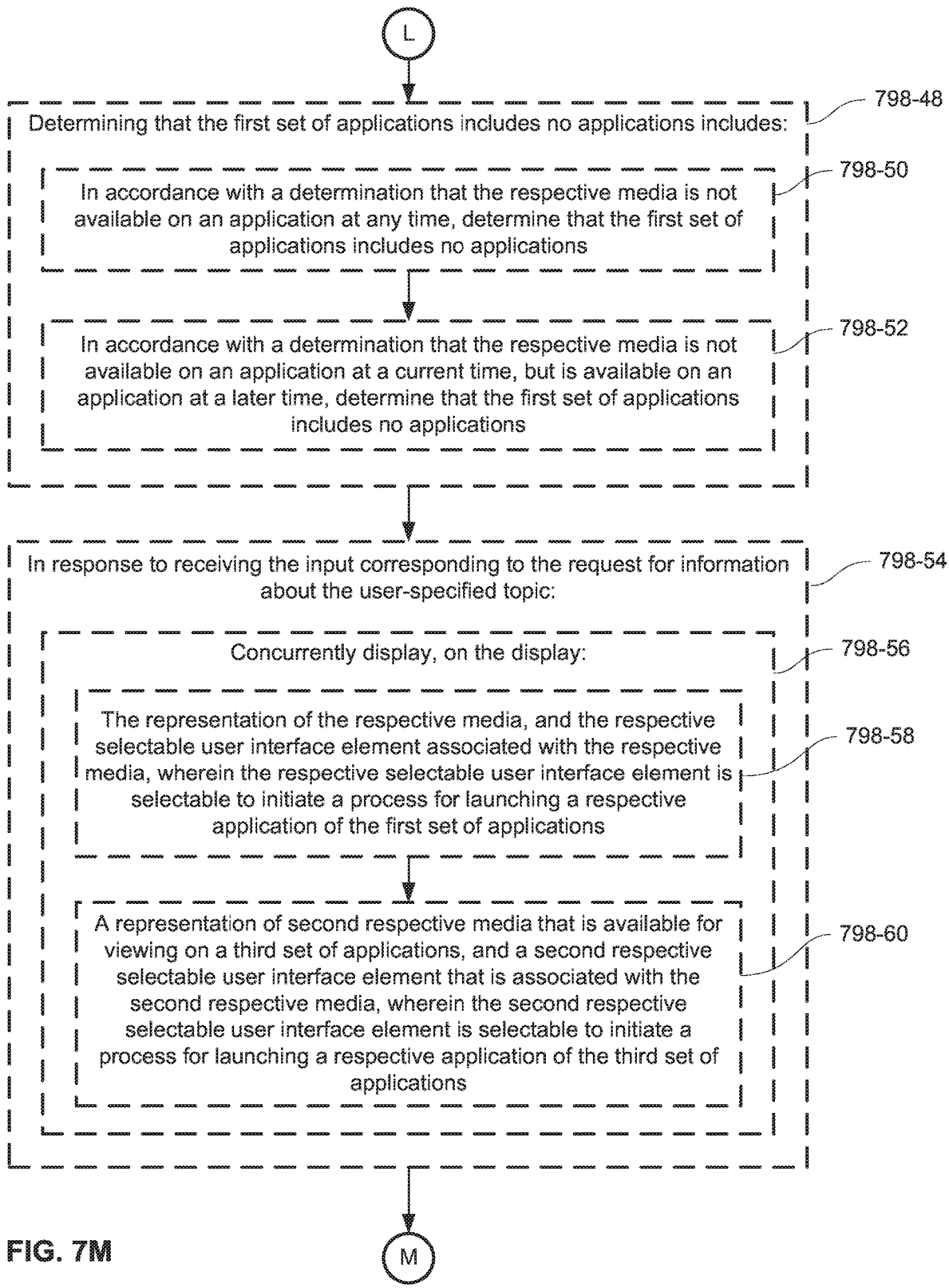
Figure 7N:
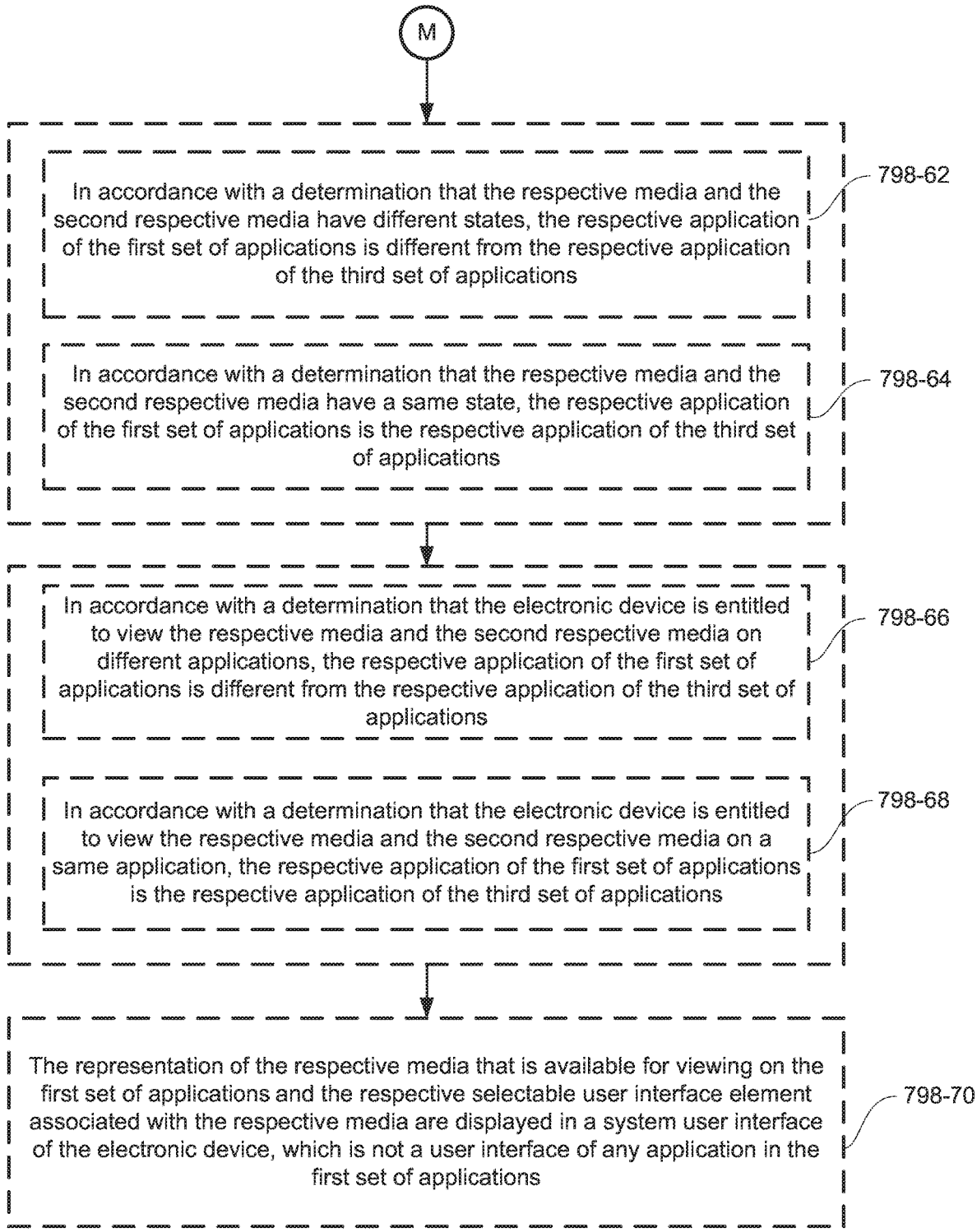

FIGS. 7A-7N are flow diagrams illustrating a method 700 of presenting a user with options for viewing media on one or more applications in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of presenting a user with options for viewing media on one or more applications. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, the method 700 is performed at an electronic device (e.g., a set-top box, a computer, etc., such as device 100, device 300 or device 500) that is in communication with a display (e.g., a television, a computer monitor, etc., such as display 514) and one or more input devices (e.g., a remote control, such as remote 510, a smartphone configured to control the electronic device, such as device 511, a wearable device configured to control the electronic device, etc.). In some embodiments, the method is performed at an electronic device that includes the display and/or the one or more input devices, such as an electronic device with a touch screen (e.g., a tablet computer, a smartphone, etc.), or an electronic device (e.g., a computer) that includes a display and is in communication with an input device, such as a mouse or a trackpad. In some embodiments, the electronic device receives (702), via the one or more input devices, an input (e.g., a voice input, a text input, etc.) corresponding to a request for information about a user-specified topic, such as in FIG. 6B (e.g., an input by a user requesting information about a sports game). In response to receiving the input corresponding to the request for information about the user-specified topic, the electronic device displays (704), on the display, information about media that is relevant to the user-specified topic, such as in FIG. 6C (e.g., information about the sports game inquired about, such as the score, the teams, the remaining time, etc.). In some embodiments, displaying the information about media that is relevant to the user-specified topic includes concurrently displaying a representation of respective media (e.g., a future media event such as a future live concert or sporting event, an ongoing media event such as a live sporting event, or recorded media content such as a recorded sporting event, a movie, or a television show) that is available for viewing on a first set of applications (e.g., an ESPN application, an HBO application, etc.), the electronic device having a second set of applications downloaded (e.g., installed) on it, and a respective selectable user interface element (e.g., a button) associated with the respective media, such as button 614A in FIG. 6C. The respective selectable user interface element is optionally selectable to quickly and easily watch the respective media, launch an application for watching the respective media, download an application for watching the respective media, or obtaining information about the respective media, which increases the efficiency of the human-machine interface. In some embodiments, in accordance with a determination that the second set of applications includes at least one application in the first set of applications via which the respective media is available for viewing (e.g., an application for viewing the respective media is already downloaded on the electronic device), the respective selectable user interface element is selectable to initiate a process for launching a respective application of the first set of applications (706), such as button 614B in FIG. 6D. Optionally, the user interface element is selectable to directly launch the respective application, such as button 614B in FIG. 6D. Optionally, the user interface element is selectable to display a list of applications available on the electronic device for viewing the media, and selection of one of which causes the selected application to launch on the electronic device, such button 616 as in FIG. 6E.

In some embodiments, the second set of applications includes at least one application in the first set of applications via which the respective media is available for viewing (e.g., an application for viewing the respective media is already downloaded on the electronic device) (708). The electronic device receives (710), via the one or more input devices, selection of the respective selectable user interface element. In response to receiving the selection of the respective selectable user interface element (712): in accordance with a determination that the second set of applications includes a plurality of applications in the first set of applications, such as in FIG. 6E (e.g., more than one application for viewing the respective media is downloaded on the electronic device, independent of whether the user of the electronic device is entitled to view the media on those applications), the electronic device displays (714), on the display, representations of the plurality of applications in the first set of applications, including a respective representation of the respective application of the first set of applications, such as in FIG. 6E (e.g., selection of the respective selectable user interface element causes display of the applications on which the media is viewable so that the user can select the application on which the user wishes to view the media). In this way, the electronic device provides an easy way for the user to select an application, increasing the efficiency of the human-machine interface. In accordance with a determination that the second set of applications includes only the respective application from the first set of applications (e.g., only one application for viewing the respective media is downloaded on the electronic device, independent of whether the user of the electronic device is entitled to view the media on that application), the electronic device displays (716), on the display, the respective application to view the respective media, such as in FIG. 6G (e.g., if only one application for viewing the media is downloaded on the electronic device, selection of the respective selectable user interface element automatically launches that one application for viewing the media and, optionally, starts playing the respective media via the respective application). In this way, the electronic device does not require the user to select an application from a list unnecessarily, increasing the efficiency of the human-machine interface.

In some embodiments, the second set of applications includes a plurality of applications in the first set of applications (718), such as in FIG. 6E. The electronic device receives (720), via the one or more input devices, selection of the respective representation of the respective application, such as in FIG. 6F. In response to receiving the selection of the respective representation, the electronic device displays (722), on the display, the respective application to view the respective media (e.g., receiving selection of one of the multiple applications displayed on the display, and launching the selected application and, optionally, starts playing the respective media via the respective application). Thus, a user is able to quickly and easily launch the respective application on the electronic device, increasing the efficiency of the human-machine interface.

In some embodiments, in accordance with the determination that the second set of applications includes a plurality of applications in the first set of applications (e.g., more than one application for viewing the respective media is downloaded on the electronic device, independent of whether the user of the electronic device is entitled to view the media on those applications), the respective selectable user interface element indicates an ability to view the respective media without including an indication of a given application of the plurality of applications in the first set of applications (724), such as in FIG. 6E. For example, if multiple applications are downloaded via which the media is viewable, the respective selectable user interface element indicates that the media is viewable on the electronic device (e.g., "watch now"), without indicating a particular application on which to watch the media, because the user must first select a particular application on which to view the media. In accordance with the determination that the second set of applications includes only the respective application from the first set of applications (e.g., only one application for viewing the respective media is downloaded on the electronic device, independent of whether the user of the electronic device is entitled to view the media on that application), the respective selectable user interface element indicates the ability to view the respective media and includes an indication of the respective application via which the respective media is viewable (726), such as in FIG. 6G. In this way, by simply looking at the respective selectable user interface element, the user is easily able to determine on which application the respective media is available to watch on the electronic device, increasing the efficiency of the human-machine interface. For example, if only one application for viewing the media is downloaded on the electronic device, the respective selectable user interface element indicates that the media is viewable on the electronic device via that particular application (e.g., "watch now on application A").

In some embodiments, the second set of applications includes at least one application in the first set of applications via which the respective media is available for viewing, such as in FIG. 6I (e.g., an application for viewing the respective media is already downloaded on the electronic device) (728). The electronic device receives (730), via the one or more input devices, selection of the respective selectable user interface element. In response to receiving the selection of the respective selectable user interface element (732): in accordance with a determination that the second set of applications includes a plurality of applications in the first set of applications on which the electronic device is entitled to view the respective media (e.g., more than one application for viewing the respective media is downloaded on the electronic device, and the user of the electronic device is entitled to view the respective media on those applications), the electronic device displays (734), on the display, representations of the plurality of applications in the first set of applications, including a respective representation of the respective application of the first set of applications, such as in FIG. 6K (e.g., selection of the respective selectable user interface element causes display of the applications on which the media is viewable so that the user can select the application on which the user wishes to view the media). In accordance with a determination that the second set of applications includes only the respective application from the first set of applications on which the electronic device is entitled to view the respective media (e.g., only one application for viewing the respective media is downloaded on the electronic device via which the user of the electronic device is entitled to view the respective media), the electronic device displays (736), on the display, the respective application to view the respective media, such as in FIG. 6H (e.g., if only one application for viewing the media is downloaded and entitled on the electronic device, selection of the respective selectable user interface element automatically launches that one application for viewing the media). In this way, by simply looking at the respective selectable user interface element, the user is easily able to determine on which application the respective media is available to watch on the electronic device, increasing the efficiency of the human-machine interface.

In some embodiments, the second set of applications includes a plurality of applications in the first set of applications on which the electronic device is entitled to view the respective media (738), such as in FIG. 6I. The electronic device receives (740), via the one or more input devices, selection of the respective representation of the respective application. In response to receiving the selection of the respective representation, the electronic device displays (742), on the display, the respective application to view the respective media. For example, the electronic device receives selection of one of the multiple applications displayed on the display, and launches the selected application. Optionally, the electronic device starts playing the respective media via the respective application.

In some embodiments, in accordance with the determination that the second set of applications includes a plurality of applications in the first set of applications on which the electronic device is entitled to view the respective media (e.g., more than one application for viewing the respective media is downloaded on the electronic device, and the user of the electronic device is entitled to view the respective media on those applications), the respective selectable user interface element indicates an ability to view the respective media without including an indication of a given application of the plurality of applications in the first set of applications (744), such as in FIG. 6I. For example, if multiple applications are downloaded and entitled via which the media is viewable, the respective selectable user interface element indicates that the media is viewable on the electronic device (e.g., "watch now"), without indicating a particular application on which to watch the media, because the user must first select a particular application on which to view the media. In accordance with the determination that the second set of applications includes only the respective application from the first set of applications on which the electronic device is entitled to view the respective media (e.g., only one application for viewing the respective media is downloaded on the electronic device via which the user of the electronic device is entitled to view the respective media), the respective selectable user interface element indicates the ability to view the respective media and includes an indication of the respective application via which the respective media is viewable (746), such as in FIG. 6H. For example, if only one application for viewing the media is downloaded and entitled on the electronic device, the respective selectable user interface element indicates that the media is viewable on the electronic device via that particular application (e.g., "watch now on application A").

In some embodiments, in accordance with a determination that the second set of applications includes at least one application in the first set of applications on which the electronic device is entitled to view the respective media (e.g., at least one application for viewing the respective media is downloaded on the electronic device, and the user of the electronic device is entitled to view the respective media on that at least one application), the respective selectable user interface element indicates an ability to view the respective media (748), such as in FIG. 6L. For example, if one or more applications are downloaded and entitled via which the media is viewable, the respective selectable user interface element indicates that the media is viewable on the electronic device (e.g., "watch now"). In accordance with a determination that the second set of applications includes no applications from the first set of applications on which the electronic device is entitled to view the respective media (e.g., the user of the electronic device is not entitled to view the respective media on any of the applications downloaded on the electronic device), the respective selectable user interface element indicates an ability to launch the respective application, without including the indication of the ability to view the respective media (750), such as in FIG. 6M. For example, if one or more applications for viewing the media are downloaded, but the user of the electronic device is not entitled to view the respective media on any of the downloaded applications, the respective selectable user interface element indicates the ability to open or launch the one or more downloaded applications, without indicating the ability to view the respective media (e.g., "open application A"). In this way, by simply looking at the respective selectable user interface element, the user is easily able to determine that an application for viewing the respective media is available on the electronic device, but the electronic device does not have entitlement to view the respective media on that application, increasing the efficiency of the human-machine interface.

In some embodiments, the second set of applications includes no applications from the first set of applications on which the electronic device is entitled to view the respective media, such as in FIG. 6M (e.g., the user of the electronic device is not entitled to view the respective media on any of the applications downloaded on the electronic device) (752). In response to receiving the selection of the respective selectable user interface element (754): in accordance with a determination that the second set of applications includes a second plurality of applications in the first set of applications (e.g., more than one application for viewing the respective media is downloaded on the electronic device, even though the user of the electronic device is not entitled to view the media on those applications), the electronic device displays (756), on the display, representations of the second plurality of applications in the first set of applications, including a respective representation of the respective application of the first set of applications, such as in FIG. 6N. For example, selection of the respective selectable user interface element causes display of the applications on which the media is viewable so that the user can select the application on which the user wishes to view the media. In accordance with a determination that the second set of applications includes only the respective application from the first set of applications, such as in FIG. 6O (e.g., only one application for viewing the respective media is downloaded on the electronic device, even though the user of the electronic device is not entitled to view the media on that application), the electronic device displays (758), on the display, the respective application, without displaying the respective media. For example, if only one application for viewing the media is downloaded on the electronic device, and the user of the electronic device is not entitled to view the respective media on that one application, selection of the respective selectable user interface element causes the device to automatically launch that one application without displaying the respective media. Optionally, after that one application is launched, the user may enter entitlement credentials to become entitled to view the respective media on that one application, in which case the respective media would be displayed. In this way, the user is able to quickly open an application on which the respective media is available, increasing the efficiency of the human-machine interface.

In some embodiments, the second set of applications includes a second plurality of applications in the first set of applications, such as in FIG. 6M (e.g., more than one application for viewing the respective media is downloaded on the electronic device, even though the user of the electronic device is not entitled to view the media on those applications) (760). The electronic device receives (762), via the one or more input devices, selection of the respective representation of the respective application, for example from FIG. 6N. In response to receiving the selection of the respective representation, the electronic device displays (764), on the display, the respective application, without displaying the respective media. For example, the electronic device receives selection of one of the multiple applications displayed on the display, and launches the selected application without displaying the respective media.

In some embodiments, in accordance with the determination that the second set of applications includes the second plurality of applications in the first set of applications (e.g., more than one application for viewing the respective media is downloaded on the electronic device, even though the user of the electronic device is not entitled to view the media on those applications), the respective selectable user interface element indicates an ability to launch an application without including an indication of a given application of the second plurality of applications in the first set of applications, and without including an indication of an ability to view the respective media (766), such as in FIG. 6M. For example, if multiple applications are downloaded via which the media is viewable, but the user is not entitled to view the respective media on any of those applications, the respective selectable user interface element indicates that an application for viewing the respective media is available to launch (e.g., "open application now"), without indicating a particular application that will be launched, because the user must first select a particular application to launch, and without indicating the ability to view the respective media. In accordance with the determination that the second set of applications includes only the respective application from the first set of applications (e.g., only one application for viewing the respective media is downloaded on the electronic device, even though the user of the electronic device is not entitled to view the media on that application), the respective selectable user interface element indicates an ability to launch the respective application, without including the indication of the ability to view the respective media (768), such as in FIG. 6O. For example, if only one application for viewing the media is downloaded on the electronic device, and the user of the electronic device is not entitled to view the respective media on that one application, the respective selectable user interface element indicates that the one application is available to launch (e.g., "open application A now"), without indicating the ability to view the respective media.

In some embodiments, the second set of applications includes a plurality of applications in the first set of applications on which the electronic device is entitled to view the respective media, such as in FIG. 6P (e.g., more than one application for viewing the respective media is downloaded on the electronic device, and the user of the electronic device is entitled to view the respective media on those applications) (770). The electronic device receives (772), via the one or more input devices, selection of the respective selectable user interface element. In response to receiving the selection of the respective selectable user interface element (774): in accordance with a determination that the respective application in the plurality of applications in the first set of applications is preferred to other applications in the plurality of applications in the first set of applications, the electronic device displays (776), on the display, the respective application to view the respective media (e.g., as indicated in FIG. 6P). In this way, the user is able to quickly and easily open a preferred application for viewing the respective media on the electronic device, increasing the efficiency of the human-machine interface. In some embodiments, the user of the electronic device is entitled to view the respective media on more than one application downloaded on the electronic device, but a first one of those applications is preferred to the others of those applications. For example, viewing on the first application is preferred because viewing the respective media on the first application would be free, and viewing the respective media on the others of those applications would not be free. For example, viewing on the first application is preferred because the media item can be viewed at a higher level of visual quality on the first application than on other applications in the plurality of applications. For example, viewing on the first application is preferred because the media item can be viewed without advertisements on the first application but not on the other applications in the plurality of applications. For example, viewing on the first application is preferred because the user has expressed a preference to view this type of content via the first application (e.g., an explicit preference based on user-selected settings, or an implicit preference based on observed user behavior, such as the user repeatedly selecting the first app to watch prior content of the same type when presented with multiple options). In some embodiments, if more than one application for viewing the media is downloaded and entitled on the electronic device, but one of those is preferred for some reason, selection of the respective selectable user interface element automatically launches that one preferred application to view the respective media.

In some embodiments, in accordance with a determination that the second set of applications does not include at least one application in the first set of applications via which the respective media is available for viewing (e.g., no application for viewing the respective media is already downloaded on the electronic device), the respective selectable user interface element is selectable to initiate a process for downloading the respective application of the first set of applications (778), such as in FIG. 6Q. In this way, the user is able to quickly and easily download an application for viewing the respective media, increasing the efficiency of the human-machine interface. For example, the user interface element is selectable to directly download the respective application, such as in FIG. 6S. For example, the user interface element is selectable to display a list of applications available for download for viewing the media, and selection of one of which causes the electronic device to download the selected application, such as in FIG. 6R. For example, the user interface element is selectable to display an app store user interface that is populated with a search for applications via which the respective media is available for viewing.

In some embodiments, the second set of applications does not include at least one application in the first set of applications via which the respective media is available for viewing, such as in FIG. 6Q (e.g., no application for viewing the respective media is already downloaded on the electronic device) (780). The electronic device receives (782), via the one or more input devices, selection of the respective selectable user interface element. In response to receiving the selection of the respective selectable user interface element (784): in accordance with a determination that the first set of applications includes a plurality of applications (e.g., more than one application for viewing the respective media is available to be downloaded on the electronic device, independent of whether the user of the electronic device is entitled to view the media on those applications), the electronic device displays (786), on the display, representations of the plurality of applications in the first set of applications, including a respective representation of the respective application of the first set of applications, such as in FIG. 6R. For example, selection of the respective selectable user interface element causes display of the applications on which the media is viewable, and which are available for download so that the user can select the application the user wishes to download. In accordance with a determination that the first set of applications includes only the respective application (e.g., only one application for viewing the respective media is available to be downloaded on the electronic device, independent of whether the user of the electronic device is entitled to view the media on that application), the electronic device downloads (788) the respective application to the electronic device (e.g., as indicated in FIG. 6S). For example, if only one application for viewing the media is available to be downloaded on the electronic device, selection of the respective selectable user interface element automatically downloads that one application.

In some embodiments, the first set of applications includes a plurality of applications (790), such as in FIG. 6Q. The electronic device receives (792), via the one or more input devices, selection of the respective representation of the respective application (e.g., as indicated in FIG. 6R). In response to receiving the selection of the respective representation, the electronic device downloads (794) the respective application to the electronic device (e.g., receiving selection of one of the multiple applications displayed on the display, and downloading the selected application).

In some embodiments, in accordance with the determination that the first set of applications includes the plurality of applications (e.g., more than one application for viewing the respective media is available to be downloaded on the electronic device, independent of whether the user of the electronic device is entitled to view the media on those applications), the respective selectable user interface element indicates an ability to download an application without including an indication of a given application of the plurality of applications in the first set of applications (796), such as in FIG. 6Q. For example, if multiple applications are available to be downloaded via which the media is viewable, the respective selectable user interface element indicates that an application is downloadable to the electronic device (e.g., "download application now"), without indicating a particular application that will be downloaded, because the user must first select a particular application to download. In accordance with the determination that the first set of applications includes only the respective application (e.g., only one application for viewing the respective media is available to be downloaded on the electronic device, independent of whether the user of the electronic device is entitled to view the media on that application), the respective selectable user interface element indicates an ability to download the respective application (798), such as in FIG. 6S. For example, if only one application for viewing the media is available to be downloaded on the electronic device, the respective selectable user interface element indicates that that particular application is downloadable to the electronic device (e.g., "download application A now").

In some embodiments, the second set of applications does not include at least one application in the first set of applications via which the respective media is available for viewing, such as in FIG. 6U (e.g., no application for viewing the respective media is already downloaded on the electronic device) (798-2). The electronic device receives (798-3), via the one or more input devices, selection of the respective selectable user interface element. In response to receiving the selection of the respective selectable user interface element (798-6):in accordance with a determination that the first set of applications includes a plurality of applications on which the electronic device is entitled to view the respective media (e.g., more than one application for viewing the respective media is available to be downloaded on the electronic device, and the user of the electronic device is entitled to view the respective media on those applications), the electronic device displays (798-8), on the display, representations of the plurality of applications in the first set of applications, including a respective representation of the respective application of the first set of applications, such as in FIG. 6V. For example, selection of the respective selectable user interface element causes display of the applications on which the media is viewable, which are available for download and on which the user of the electronic device is entitled to view the respective media, so that the user can select the application the user wishes to download. In accordance with a determination that the first set of applications includes only the respective application on which the electronic device is entitled to view the respective media (e.g., only one application for viewing the respective media is available to be downloaded on the electronic device via which the user of the electronic device is entitled to view the respective media), the electronic device downloads (798-10) the respective application to the electronic device (e.g., as indicated in FIG. 6T). For example, if only one application for viewing the respective media, and on which the user of the electronic device is entitled to view the respective media, is available to be downloaded on the electronic device, selection of the respective selectable user interface element automatically downloads that one application.

In some embodiments, the first set of applications includes a plurality of applications on which the electronic device is entitled to view the respective media, such as in FIG. 6Q (798-12). The electronic device receives (798-14), via the one or more input devices, selection of the respective representation of the respective application. In response to receiving the selection of the respective representation, the electronic device downloads (798-16) the respective application to the electronic device (e.g., receiving selection of one of the multiple applications displayed on the display, and downloading the selected application, such as indicated in FIG. 6R).

In some embodiments, in accordance with the determination that the first set of applications includes a plurality of applications on which the electronic device is entitled to view the respective media (e.g., more than one application for viewing the respective media is available to be downloaded on the electronic device, and the user of the electronic device is entitled to view the respective media on those applications), the respective selectable user interface element indicates an ability to download an application without including an indication of a given application of the plurality of applications in the first set of applications (798-18), such as in FIG. 6U. For example, if multiple applications, on which the user of the electronic device is entitled to view the respective media, are available to be downloaded, the respective selectable user interface element indicates that an application is downloadable to the electronic device (e.g., "download application now"), without indicating a particular application that will be downloaded, because the user must first select a particular application to download. In accordance with the determination that the first set of applications includes only the respective application on which the electronic device is entitled to view the respective media (e.g., only one application for viewing the respective media is available to be downloaded on the electronic device via which the user of the electronic device is entitled to view the respective media), the respective selectable user interface element indicates an ability to download the respective application (798-20), such as in FIG. 6T. For example, if only one application for viewing the media, and on which the user of the electronic device is entitled to view the respective media, is available to be downloaded on the electronic device, the respective selectable user interface element indicates that that particular application is downloadable to the electronic device (e.g., "download application A now").

In some embodiments, the first set of applications includes no applications on which the electronic device is entitled to view the respective media, such as in FIG. 6W (e.g., the user of the electronic device is not entitled to view the respective media on any of the applications available to be downloaded on the electronic device) (798-22). In response to receiving the selection of the respective selectable user interface element (798-24): in accordance with a determination that the first set of applications includes a second plurality of applications (e.g., more than one application for viewing the respective media is available to be downloaded on the electronic device, even though the user of the electronic device is not entitled to view the media on those applications), the electronic device displays (798-26), on the display, representations of the second plurality of applications in the first set of applications, including a respective representation of the respective application of the first set of applications, such as in FIG. 6X. For example, selection of the respective selectable user interface element causes display of the applications on which the media is viewable and which are available for download so that the user can select the application the user wishes to download. In accordance with a determination that the second set of applications includes only the respective application from the first set of applications (e.g., only one application for viewing the respective media is available to be downloaded on the electronic device, even though the user of the electronic device is not entitled to view the media on that application), the electronic device downloads (798-28) the respective application to the electronic device (e.g., as indicated in FIG. 6Y). For example, if only one application for viewing the respective media is available to be downloaded on the electronic device, selection of the respective selectable user interface element automatically downloads that one application, even though the user of the electronic device is not entitled to view the respective media on that one application.

In some embodiments, the first set of applications includes the second plurality of applications (798-30). The electronic device receives (798-32), via the one or more input devices, selection of the respective representation of the respective application. In response to receiving the selection of the respective representation, the electronic device downloads (798-34) the respective application to the electronic device (e.g., receiving selection of one of the multiple applications displayed on the display, and downloading the selected application, such as indication in FIG. 6X).

In some embodiments, in accordance with the determination that the first set of applications includes a second plurality of applications (e.g., more than one application for viewing the respective media is available to be downloaded on the electronic device, even though the user of the electronic device is not entitled to view the media on those applications), the respective selectable user interface element indicates an ability to download an application without including an indication of a given application of the second plurality of applications in the first set of applications (798-36), such as in FIG. 6W. For example, if multiple applications for viewing the respective media are available to be downloaded, but the user is not entitled to view the respective media on any of those applications, the respective selectable user interface element indicates that an application is downloadable to the electronic device (e.g., "download application now"), without indicating a particular application that will be downloaded, because the user must first select a particular application to download. In accordance with the determination that the first set of applications includes only the respective application (e.g., only one application for viewing the respective media is available to be downloaded on the electronic device, even though the user of the electronic device is not entitled to view the media on that application), the respective selectable user interface element indicates an ability to download the respective application (798-38), such as in FIG. 6Y. For example, if only one application for viewing the media is available to be downloaded on the electronic device, and the user of the electronic device is not entitled to view the respective media on that one application, the respective selectable user interface element indicates that that particular application is downloadable to the electronic device (e.g., "download application A now").

In some embodiments, the second set of applications does not include at least one application in the first set of applications via which the respective media is available for viewing (e.g., no application for viewing the respective media is already downloaded on the electronic device) (798-40). In accordance with a determination that the first set of applications includes at least one application (e.g., at least one application for viewing the respective media is available to be downloaded on the electronic device), the respective selectable user interface element indicates an ability to download an application (798-42), such as in FIG. 6Y. For example, if one or more applications are available to be downloaded via which the media is viewable, the respective selectable user interface element indicates that an application is downloadable to the electronic device (e.g., "download application now"). In accordance with a determination that the first set of applications includes no applications (e.g., no application for viewing the respective media is available to be downloaded on the electronic device), the respective selectable user interface element indicates an ability to view additional information about the respective media, without including the indication of the ability to download an application (798-44), such as in FIG. 6Z. In this way, by simply looking at the selectable user interface element, the user is able to quickly and easily determine that there is no application on which the respective media is available, increasing the efficiency of the human-machine interface. For example, if no applications are available to be downloaded via which the media is viewable, the respective selectable user interface element indicates the ability to view more information about the respective media, without indicating the ability to download an application to view the media (e.g., "view information").

In some embodiments, in accordance with a determination that the first set of applications includes no applications (e.g., no application for viewing the respective media is available to be downloaded on the electronic device), the respective selectable user interface element indicates an ability to view additional information about the respective media (798-46), such as in FIG. 6Z. For example, the respective selectable user interface element includes a "view information" indication, and is selectable for displaying additional information about the respective media, such as one or more television channels on which the respective media is available, and optionally, when. In some embodiments for events that have not yet occurred (e.g., sports games that will be broadcast at a future date/time that has not yet arrived), the information includes one or more of: statistics from related past events (e.g., past games with one of the same teams), a date/time when the event will occur, and one or more ways to watch the event when the event occurs (e.g., an app or TV channel that will have a live or recorded broadcast of the sport game available when the game occurs).

In some embodiments, determining that the first set of applications includes no applications (e.g., no application for viewing the respective media is available to be downloaded on the electronic device) includes (798-48): in accordance with a determination that the respective media is not available on an application at any time, the electronic device determines (798-50) that the first set of applications includes no applications, such as in FIG. 6Z. In accordance with a determination that the respective media is not available on an application at a current time, but is available on an application at a later time (e.g., the media is live, and has not yet started), the electronic device determines (798-52) that the first set of applications includes no applications. In some embodiments, if the media is available on one or more applications at a later time, but not at the current time, the additional information displayed about the respective media includes information about those one or more applications on which the respective media will become available. In some embodiments, if the media is available on one or more applications at a later time, at that later time, when the media becomes available, the respective selectable user interface element becomes selectable to run or download the one or more applications, in accordance with the examples of the disclosure.

In some embodiments, in response to receiving the input corresponding to the request for information about the user-specified topic (e.g., an input by a user requesting information about sports games that are on right now) (798-54): the electronic device concurrently displays (798-56), on the display: the representation of the respective media, the respective selectable user interface element associated with the respective media (798-58), a representation of second respective media (e.g., a future media event such as a future live concert or sporting event, an ongoing media event such as a live sporting event, or recorded media content such as a recorded sporting event, a movie, or a television show) that is available for viewing on a third set of applications (e.g., an ESPN application, an HBO application, etc.), and a second respective selectable user interface element that is associated with the second respective media (798-60), such as in FIGS. 6BB-6CC. In some embodiments, the respective selectable user interface element is selectable to initiate a process for launching a respective application of the first set of applications. For example, the respective selectable user interface element is selectable to directly launch a respective application, to display a list of applications available on the electronic device for viewing the respective media, etc., as described in this disclosure, such as in FIG. 6CC. In some embodiments, the second respective selectable user interface element is selectable to initiate a process for launching a respective application of the third set of applications. For example, the second respective selectable user interface element is selectable to directly launch a second respective application, to display a list of applications available on the electronic device for viewing the second respective media, etc., as described in this disclosure, such as in FIG. 6CC.

In some embodiments, in accordance with a determination that the respective media and the second respective media have different states (e.g., live, recorded, future), the respective application of the first set of applications is different from the respective application of the third set of applications (798-62), such as in FIG. 6DD. For example, one sports application optionally provides access to live sports games, while a different sports application optionally provides access to past sports games. In accordance with a determination that the respective media and the second respective media have a same state (e.g., live, recorded, future), the respective application of the first set of applications is the respective application of the third set of applications (798-64), such as in FIG. 6DD.

In some embodiments, in accordance with a determination that the electronic device is entitled to view the respective media and the second respective media on different applications (e.g., the electronic device is entitled to view the respective media on application A, and the second respective media on application B), the respective application of the first set of applications is different from the respective application of the third set of applications (798-66), such as in FIG. 6EE. In accordance with a determination that the electronic device is entitled to view the respective media and the second respective media on a same application (e.g., the electronic device is entitled to view the respective media and the second respective media on application A), the respective application of the first set of applications is the respective application of the third set of applications (798-68), such as in FIG. 6DD.

In some embodiments, the representation of the respective media that is available for viewing on the first set of applications (e.g., an ESPN application, an HBO application, etc.) and the respective selectable user interface element associated with the respective media are displayed in a system user interface of the electronic device, which is not a user interface of any application in the first set of applications (798-70), such as in FIGS. 6A-6EE. For example, the results of the user's request for information about the user-specified topic are optionally displayed in a user interface of the operating system of the electronic device, and not in the user interfaces of the applications on which the media is available for viewing.

It should be understood that the particular order in which the operations in FIGS. 7A-7N have been described is merely exemplary and is not intended to indicate that the described order is the only order in which the operations could be performed. One of ordinary skill in the art would recognize various ways to reorder the operations described herein. The operations in the information processing methods described above are, optionally, implemented by running one or more functional modules in an information processing apparatus such as general purpose processors (e.g., as described with respect to FIGS. 1A, 3, 5A and 8) or application specific chips. Further, the operations described above with reference to FIGS. 7A-7N are, optionally, implemented by components depicted in FIGS. 1A-1B. For example, receiving operation 702, displaying operation 704 and initiating operation 706 are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 8:
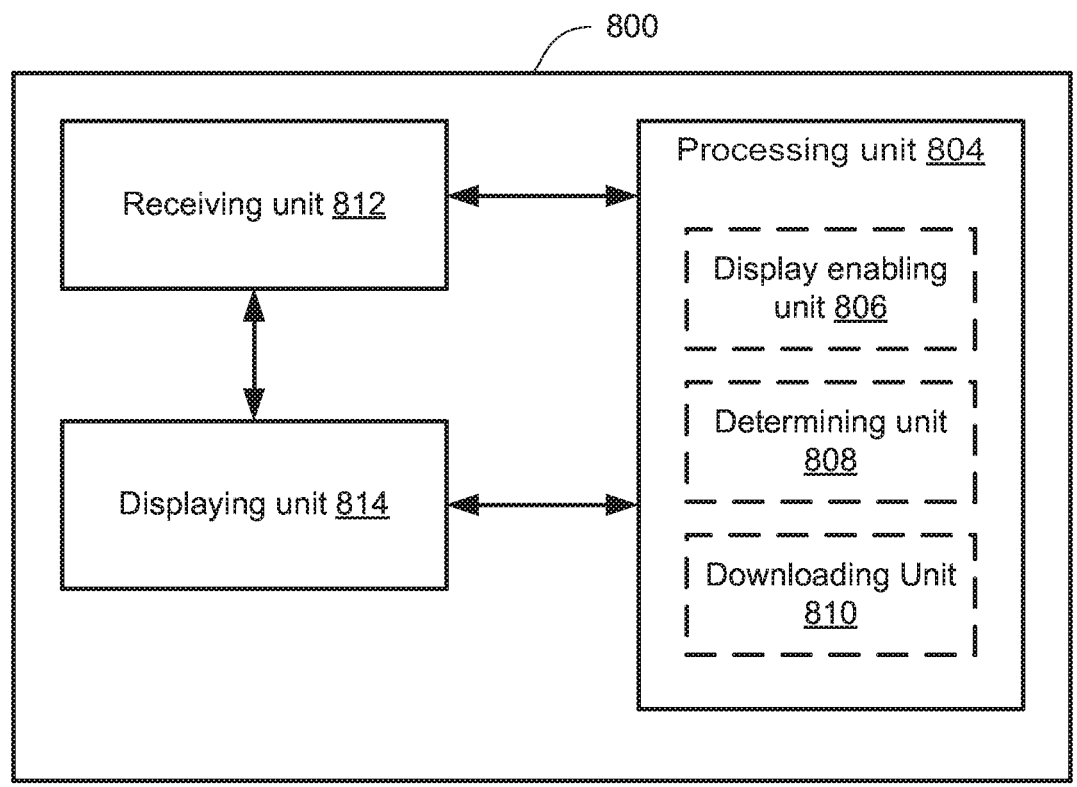
FIG. 8 is a functional block diagram of an electronic device in accordance with some embodiments of the disclosure.

In accordance with some embodiments, FIG. 8 shows a functional block diagram of an electronic device 800 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 800 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 optionally includes a receiving unit 812 configured to receive inputs, a displaying unit 818 coupled to the receiving unit 816 and configured to display content, and a processing unit 804 coupled to each of the receiving unit 816 and the displaying unit 818. In some embodiments, displaying unit 818 is separate from and in communication with electronic device 800. In some embodiments, the processing unit 804 includes a display enabling unit 806, a determining unit 808 and a downloading unit 810.

In some embodiments, the receiving unit 816 is configured to receive an input corresponding to a request for information about a user-specified topic. In some embodiments, the processing unit 804 is configured to, in response to receiving the input corresponding to the request for information about the user-specified topic (e.g., with the receiving unit 816), display (e.g., with the display enabling unit 806), on a display (e.g., displaying unit 818), information about media that is relevant to the user-specified topic, including concurrently displaying: a representation of respective media that is available for viewing on a first set of applications, the electronic device 800 having a second set of applications downloaded on it, and a respective selectable user interface element associated with the respective media. In some embodiments, in accordance with a determination (e.g., with the determining unit 808) that the second set of applications includes at least one application in the first set of applications via which the respective media is available for viewing, the respective selectable user interface element is selectable to initiate a process for launching a respective application of the first set of applications.

In some embodiments, the second set of applications includes at least one application in the first set of applications via which the respective media is available for viewing. The receiving unit 816 is further configured to receive selection of the respective selectable user interface element. The processing unit 804 is further configured to, in response to receiving the selection of the respective selectable user interface element (e.g., with the receiving unit 816): in accordance with a determination (e.g., with the determining unit 808) that the second set of applications includes a plurality of applications in the first set of applications, display (e.g., with the display enabling unit 806), on the display (e.g., displaying unit 818), representations of the plurality of applications in the first set of applications, including a respective representation of the respective application of the first set of applications. In some embodiments, the processing unit 804 is further configured to, in accordance with a determination (e.g., with the determining unit 808) that the second set of applications includes only the respective application from the first set of applications, display (e.g., with the display enabling unit 806), on the display (e.g., displaying unit 818), the respective application to view the respective media.

In some embodiments, the second set of applications includes a plurality of applications in the first set of applications. The receiving unit 816 is further configured to receive selection of the respective representation of the respective application. The processing unit 804 is further configured to, in response to receiving the selection of the respective representation (e.g., with the receiving unit 816), display (e.g., with the display enabling unit 806), on the display (e.g., displaying unit 818), the respective application to view the respective media.

In some embodiments, in accordance with the determination (e.g., with the determining unit 808) that the second set of applications includes a plurality of applications in the first set of applications, the respective selectable user interface element indicates an ability to view the respective media without including an indication of a given application of the plurality of applications in the first set of applications. In accordance with the determination (e.g., with the determining unit 808) that the second set of applications includes only the respective application from the first set of applications, the respective selectable user interface element indicates the ability to view the respective media and includes an indication of the respective application via which the respective media is viewable.

In some embodiments, the second set of applications includes at least one application in the first set of applications via which the respective media is available for viewing. The receiving unit 816 is further configured to receive selection of the respective selectable user interface element. The processing unit 804 is further configured to, in response to receiving the selection of the respective selectable user interface element (e.g., with the receiving unit 816): in accordance with a determination (e.g., with the determining unit 808) that the second set of applications includes a plurality of applications in the first set of applications on which the electronic device 800 is entitled to view the respective media, display (e.g., with the display enabling unit 806), on the display (e.g., displaying unit 818), representations of the plurality of applications in the first set of applications, including a respective representation of the respective application of the first set of applications. In some embodiments, the processing unit 804 is further configured to, in accordance with a determination (e.g., with the determining unit 808) that the second set of applications includes only the respective application from the first set of applications on which the electronic device 800 is entitled to view the respective media, display (e.g., with the display enabling unit 806), on the display (e.g., displaying unit 818), the respective application to view the respective media.

In some embodiments, the second set of applications includes a plurality of applications in the first set of applications on which the electronic device 800 is entitled to view the respective media. The receiving unit 816 is further configured to receive selection of the respective representation of the respective application. The processing unit 804 is further configured to, in response to receiving the selection of the respective representation (e.g., with the receiving unit 816), display (e.g., with the display enabling unit 806), on the display (e.g., displaying unit 818), the respective application to view the respective media.

In some embodiments, in accordance with the determination (e.g., with the determining unit 808) that the second set of applications includes a plurality of applications in the first set of applications on which the electronic device 800 is entitled to view the respective media, the respective selectable user interface element indicates an ability to view the respective media without including an indication of a given application of the plurality of applications in the first set of applications. In accordance with the determination (e.g., with the determining unit 808) that the second set of applications includes only the respective application from the first set of applications on which the electronic device 800 is entitled to view the respective media, the respective selectable user interface element indicates the ability to view the respective media and includes an indication of the respective application via which the respective media is viewable.

In some embodiments, in accordance with a determination (e.g., with the determining unit 808) that the second set of applications includes at least one application in the first set of applications on which the electronic device 800 is entitled to view the respective media, the respective selectable user interface element indicates an ability to view the respective media. In accordance with a determination (e.g., with the determining unit 808) that the second set of applications includes no applications from the first set of applications on which the electronic device 800 is entitled to view the respective media, the respective selectable user interface element indicates an ability to launch the respective application, without including the indication of the ability to view the respective media.

In some embodiments, the second set of applications includes no applications from the first set of applications on which the electronic device is entitled to view the respective media. The processing unit 804 is further configured to, in response to receiving the selection of the respective selectable user interface element (e.g., with receiving unit 816): in accordance with a determination (e.g., with the determining unit 808) that the second set of applications includes a second plurality of applications in the first set of applications, display (e.g., with the display enabling unit 806), on the display (e.g., displaying unit 818), representations of the second plurality of applications in the first set of applications, including a respective representation of the respective application of the first set of applications. In some embodiments, in accordance with a determination (e.g., with the determining unit 808) that the second set of applications includes only the respective application from the first set of applications, display (e.g., with the display enabling unit 806), on the display (e.g., displaying unit 818), the respective application, without displaying the respective media.

In some embodiments, the second set of applications includes a second plurality of applications in the first set of applications. The receiving unit 816 is further configured to receive selection of the respective representation of the respective application. The processing unit 804 is further configured to, in response to receiving the selection of the respective representation (e.g., with receiving unit 816), display (e.g., with the display enabling unit 806), on the display (e.g., displaying unit 818), the respective application, without displaying the respective media.

In some embodiments, in accordance with the determination (e.g., with the determining unit 808) that the second set of applications includes the second plurality of applications in the first set of applications, the respective selectable user interface element indicates an ability to launch an application without including an indication of a given application of the second plurality of applications in the first set of applications, and without including an indication of an ability to view the respective media. In accordance with the determination (e.g., with the determining unit 808) that the second set of applications includes only the respective application from the first set of applications, the respective selectable user interface element indicates an ability to launch the respective application, without including the indication of the ability to view the respective media.

In some embodiments, the second set of applications includes a plurality of applications in the first set of applications on which the electronic device is entitled to view the respective media. The receiving unit 816 is further configured to receive selection of the respective selectable user interface element. The processing unit 804 is further configured to, in response to receiving the selection of the respective selectable user interface element (e.g., with receiving unit 816): in accordance with a determination (e.g., with the determining unit 808) that the respective application in the plurality of applications in the first set of applications is preferred to other applications in the plurality of applications in the first set of applications, display (e.g., with the display enabling unit 806), on the display (e.g., displaying unit 818), the respective application to view the respective media.

In some embodiments, in accordance with a determination (e.g., with the determining unit 808) that the second set of applications does not include at least one application in the first set of applications via which the respective media is available for viewing, the respective selectable user interface element is selectable to initiate a process for downloading the respective application of the first set of applications.

In some embodiments, the second set of applications does not include at least one application in the first set of applications via which the respective media is available for viewing. The receiving unit 816 is further configured to receive selection of the respective selectable user interface element. The processing unit 804 is further configured to, in response to receiving the selection of the respective selectable user interface element (e.g., with receiving unit 816): in accordance with a determination (e.g., with the determining unit 808) that the first set of applications includes a plurality of applications, display (e.g., with the display enabling unit 806), on the display (e.g., displaying unit 818), representations of the plurality of applications in the first set of applications, including a respective representation of the respective application of the first set of applications. In some examples, in accordance with a determination (e.g., with the determining unit 808) that the first set of applications includes only the respective application, the processing unit 804 is further configured to download the respective application to the electronic device (e.g., via downloading unit 810).

In some embodiments, the first set of applications includes a plurality of applications. The receiving unit 816 is further configured to receive selection of the respective representation of the respective application. The processing unit 804 is further configured to, in response to receiving the selection of the respective representation (e.g., with receiving unit 816), download the respective application to the electronic device (e.g., via downloading unit 810).

In some embodiments, in accordance with the determination (e.g., with the determining unit 808) that the first set of applications includes the plurality of applications, the respective selectable user interface element indicates an ability to download an application without including an indication of a given application of the plurality of applications in the first set of applications. In accordance with the determination (e.g., with the determining unit 808) that the first set of applications includes only the respective application, the respective selectable user interface element indicates an ability to download the respective application.

In some examples, the second set of applications does not include at least one application in the first set of applications via which the respective media is available for viewing. The receiving unit 816 is further configured to receive selection of the respective selectable user interface element. The processing unit 804 is further configured to, in response to receiving the selection of the respective selectable user interface element (e.g., with receiving unit 816): in accordance with a determination (e.g., with the determining unit 808) that the first set of applications includes a plurality of applications on which the electronic device 800 is entitled to view the respective media, display (e.g., with the display enabling unit 806), on the display (e.g., displaying unit 818), representations of the plurality of applications in the first set of applications, including a respective representation of the respective application of the first set of applications. In some embodiments, in accordance with a determination (e.g., with the determining unit 808) that the first set of applications includes only the respective application on which the electronic device is entitled to view the respective media, the processing unit 804 is further configured to download the respective application to the electronic device (e.g., via downloading unit 810).

In some embodiments, the first set of applications includes a plurality of applications on which the electronic device is entitled to view the respective media. The receiving unit 816 is further configured to receive selection of the respective representation of the respective application. The processing unit 804 is further configured to, in response to receiving the selection of the respective representation (e.g., with receiving unit 816), download the respective application to the electronic device (e.g., via downloading unit 810).

In some embodiments, in accordance with the determination (e.g., with the determining unit 808) that the first set of applications includes a plurality of applications on which the electronic device 800 is entitled to view the respective media, the respective selectable user interface element indicates an ability to download an application without including an indication of a given application of the plurality of applications in the first set of applications. In accordance with the determination (e.g., with the determining unit 808) that the first set of applications includes only the respective application on which the electronic device is entitled to view the respective media, the respective selectable user interface element indicates an ability to download the respective application.

In some embodiments, the first set of applications includes no applications on which the electronic device is entitled to view the respective media. The processing unit 804 is further configured to, in response to receiving the selection of the respective selectable user interface element (e.g., with receiving unit 816): in accordance with a determination (e.g., with the determining unit 808) that the first set of applications includes a second plurality of applications, display (e.g., with the display enabling unit 806), on the display (e.g., displaying unit 818), representations of the second plurality of applications in the first set of applications, including a respective representation of the respective application of the first set of applications. In some embodiments, in accordance with a determination (e.g., with the determining unit 808) that the second set of applications includes only the respective application from the first set of applications, the processing unit 804 is further configured to download the respective application to the electronic device (e.g., via downloading unit 810).

In some embodiments, the first set of applications includes the second plurality of applications. The receiving unit 816 is further configured to receive selection of the respective representation of the respective application. The processing unit 804 is further configured to, in response to receiving the selection of the respective representation (e.g., with receiving unit 816), download the respective application to the electronic device (e.g., via downloading unit 810).

In some embodiments, in accordance with the determination (e.g., with the determining unit 808) that the first set of applications includes a second plurality of applications, the respective selectable user interface element indicates an ability to download an application without including an indication of a given application of the second plurality of applications in the first set of applications. In accordance with the determination (e.g., with the determining unit 808) that the first set of applications includes only the respective application, the respective selectable user interface element indicates an ability to download the respective application.

In some embodiments, the second set of applications does not include at least one application in the first set of applications via which the respective media is available for viewing. In accordance with a determination (e.g., with the determining unit 808) that the first set of applications includes at least one application, the respective selectable user interface element indicates an ability to download an application. In accordance with a determination (e.g., with the determining unit 808) that the first set of applications includes no applications, the respective selectable user interface element indicates an ability to view additional information about the respective media, without including the indication of the ability to download an application.

In some embodiments, in accordance with a determination (e.g., with the determining unit 808) that the first set of applications includes no applications, the respective selectable user interface element indicates an ability to view additional information about the respective media. In some embodiments, determining (e.g., with the determining unit 808) that the first set of applications includes no applications includes: in accordance with a determination (e.g., with the determining unit 808) that the respective media is not available on an application at any time, determining (e.g., with the determining unit 808) that the first set of applications includes no applications, and in accordance with a determination (e.g., with the determining unit 808) that the respective media is not available on an application at a current time, but is available on an application at a later time, determining (e.g., with the determining unit 808) that the first set of applications includes no applications.

In some embodiments, the processing unit 804 is further configured to: in response to receiving the input corresponding to the request for information about the user-specified topic (e.g., with receiving unit 816): concurrently display (e.g., with display enabling unit 806), on the display (e.g., displaying unit 818): the representation of the respective media, the respective selectable user interface element associated with the respective media, a representation of second respective media that is available for viewing on a third set of applications, and a second respective selectable user interface element that is associated with the second respective media. In some embodiments, the respective selectable user interface element is selectable to initiate a process for launching a respective application of the first set of applications. In some embodiments, the second respective selectable user interface element is selectable to initiate a process for launching a respective application of the third set of applications.

In some embodiments, in accordance with a determination (e.g., with the determining unit 808) that the respective media and the second respective media have different states, the respective application of the first set of applications is different from the respective application of the third set of applications. In accordance with a determination (e.g., with the determining unit 808) that the respective media and the second respective media have a same state, the respective application of the first set of applications is the respective application of the third set of applications.

In some embodiments, in accordance with a determination (e.g., with the determining unit 808) that the electronic device 800 is entitled to view the respective media and the second respective media on different applications, the respective application of the first set of applications is different from the respective application of the third set of applications. In accordance with a determination (e.g., with the determining unit 808) that the electronic device 800 is entitled to view the respective media and the second respective media on a same application, the respective application of the first set of applications is the respective application of the third set of applications.

In some embodiments, the representation of the respective media that is available for viewing on the first set of applications and the respective selectable user interface element associated with the respective media are displayed (e.g., with the display enabling unit 818) in a system user interface of the electronic device 800, which is not a user interface of any application in the first set of applications.

The operations described above with reference to FIGS. 7A-7N are, optionally, implemented by components depicted in FIGS. 1A-1B or FIG. 8. For example, receiving operation 702, displaying operation 704 and initiating operation 706 are, optionally implemented by event sorter 170, event recognizer 180, and event handler 190. Event monitor 171 in event sorter 170 detects a contact on a touch-sensitive surface or touch screen, and event dispatcher module 174 delivers the event information to application 136-1. A respective event recognizer 180 of application 136-1 compares the event information to respective event definitions 186, and determines whether a first contact at a first location on the touch-sensitive surface or touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or FIG. 8.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at an electronic device that is in communication with a display and one or more input devices:
   receiving, via the one or more input devices, an input corresponding to a request for information about a user-specified topic; and
   in response to receiving the input corresponding to the request for information about the user-specified topic, displaying, on the display, information about media that is relevant to the user-specified topic, including concurrently displaying:
   a representation of respective media that is available for viewing on a first set of applications that correspond to respective media content providers, the electronic device having a second set of applications downloaded on it, and
   a respective selectable user interface element associated with the respective media, wherein:
   in accordance with a determination that the second set of applications includes at least one application in the first set of applications via which the respective media is available for viewing from a respective media content provider and a user of the electronic device is entitled to view the respective media from the respective media content provider, the respective selectable user interface element is selectable to initiate a process to display a respective application of the first set of applications and view the respective media via the respective media provider in the respective application;
   in accordance with the determination that the second set of applications includes at least one application in the first set of applications via which the respective media is available for viewing from the respective media content provider and the user of the electronic device is not entitled to view the respective media from the respective media content provider, the respective selectable user interface element is selectable to initiate the process to display the respective application without viewing the respective media in the respective application; and
   in accordance with a determination that the second set of applications does not include at least one application in the first set of applications via which the respective media is available for viewing, the respective selectable user interface element is selectable to initiate a process to download the respective application of the first set of applications corresponding to the respective media provider.

2. The method of claim 1, wherein the second set of applications includes at least one application in the first set of applications via which the respective media is available for viewing, the method further comprising:
   receiving, via the one or more input devices, selection of the respective selectable user interface element; and
   in response to receiving the selection of the respective selectable user interface element:
   in accordance with a determination that the second set of applications includes a plurality of applications in the first set of applications, displaying, on the display, representations of the plurality of applications in the first set of applications, including a respective representation of the respective application of the first set of applications; and
   in accordance with a determination that the second set of applications includes only the respective application from the first set of applications, displaying, on the display, the respective application to view the respective media.

3. The method of claim 2, wherein the second set of applications includes a plurality of applications in the first set of applications, the method further comprising:
- receiving, via the one or more input devices, selection of the respective representation of the respective application; and
- in response to receiving the selection of the respective representation, displaying, on the display, the respective application to view the respective media.

4. The method of claim 2, wherein:
- in accordance with the determination that the second set of applications includes a plurality of applications in the first set of applications, the respective selectable user interface element indicates an ability to view the respective media without including an indication of a given application of the plurality of applications in the first set of applications,
- in accordance with the determination that the second set of applications includes only the respective application from the first set of applications, the respective selectable user interface element indicates the ability to view the respective media and includes an indication of the respective application via which the respective media is viewable.

5. The method of claim 1, wherein the second set of applications includes at least one application in the first set of applications via which the respective media is available for viewing, the method further comprising:
- receiving, via the one or more input devices, selection of the respective selectable user interface element; and
- in response to receiving the selection of the respective selectable user interface element:
  - in accordance with a determination that the second set of applications includes a plurality of applications in the first set of applications on which the electronic device is entitled to view the respective media, displaying, on the display, representations of the plurality of applications in the first set of applications, including a respective representation of the respective application of the first set of applications; and
  - in accordance with a determination that the second set of applications includes only the respective application from the first set of applications on which the electronic device is entitled to view the respective media, displaying, on the display, the respective application to view the respective media.

6. The method of claim 5, wherein the second set of applications includes a plurality of applications in the first set of applications on which the electronic device is entitled to view the respective media, the method further comprising:
- receiving, via the one or more input devices, selection of the respective representation of the respective application; and
- in response to receiving the selection of the respective representation, displaying, on the display, the respective application to view the respective media.

7. The method of claim 5, wherein:
- in accordance with the determination that the second set of applications includes a plurality of applications in the first set of applications on which the electronic device is entitled to view the respective media, the respective selectable user interface element indicates an ability to view the respective media without including an indication of a given application of the plurality of applications in the first set of applications,
- in accordance with the determination that the second set of applications includes only the respective application from the first set of applications on which the electronic device is entitled to view the respective media, the respective selectable user interface element indicates the ability to view the respective media and includes an indication of the respective application via which the respective media is viewable.

8. The method of claim 5, wherein:
- in accordance with a determination that the second set of applications includes at least one application in the first set of applications on which the electronic device is entitled to view the respective media, the respective selectable user interface element indicates an ability to view the respective media,
- in accordance with a determination that the second set of applications includes no applications from the first set of applications on which the electronic device is entitled to view the respective media, the respective selectable user interface element indicates an ability to launch the respective application, without including the indication of the ability to view the respective media.

9. The method of claim 5, wherein the second set of applications includes no applications from the first set of applications on which the electronic device is entitled to view the respective media, the method further comprising:
- in response to receiving the selection of the respective selectable user interface element:
  - in accordance with a determination that the second set of applications includes a second plurality of applications in the first set of applications, displaying, on the display, representations of the second plurality of applications in the first set of applications, including a respective representation of the respective application of the first set of applications; and
  - in accordance with a determination that the second set of applications includes only the respective application from the first set of applications, displaying, on the display, the respective application, without displaying the respective media.

10. The method of claim 9, wherein the second set of applications includes the second plurality of applications in the first set of applications, the method further comprising:
- receiving, via the one or more input devices, selection of the respective representation of the respective application; and
- in response to receiving the selection of the respective representation, displaying, on the display, the respective application, without displaying the respective media.

11. The method of claim 9, wherein:
- in accordance with the determination that the second set of applications includes the second plurality of applications in the first set of applications, the respective selectable user interface element indicates an ability to launch an application without including an indication of a given application of the second plurality of applications in the first set of applications, and without including an indication of an ability to view the respective media,
- in accordance with the determination that the second set of applications includes only the respective application from the first set of applications, the respective selectable user interface element indicates an ability to launch the respective application, without including the indication of the ability to view the respective media.

12. The method of claim 1, wherein the second set of applications includes a plurality of applications in the first set of applications on which the electronic device is entitled to view the respective media, the method further comprising:
  receiving, via the one or more input devices, selection of the respective selectable user interface element; and
  in response to receiving the selection of the respective selectable user interface element:
    in accordance with a determination that the respective application in the plurality of applications in the first set of applications is preferred to other applications in the plurality of applications in the first set of applications, displaying, on the display, the respective application to view the respective media.

13. The method of claim 1, wherein the second set of applications does not include at least one application in the first set of applications via which the respective media is available for viewing, the method further comprising:
  receiving, via the one or more input devices, selection of the respective selectable user interface element; and
  in response to receiving the selection of the respective selectable user interface element:
    in accordance with a determination that the first set of applications includes a plurality of applications, displaying, on the display, representations of the plurality of applications in the first set of applications, including a respective representation of the respective application of the first set of applications; and
    in accordance with a determination that the first set of applications includes only the respective application, downloading the respective application to the electronic device.

14. The method of claim 13, wherein the first set of applications includes a plurality of applications, the method further comprising:
  receiving, via the one or more input devices, selection of the respective representation of the respective application; and
  in response to receiving the selection of the respective representation, downloading the respective application to the electronic device.

15. The method of claim 13, wherein:
  in accordance with the determination that the first set of applications includes the plurality of applications, the respective selectable user interface element indicates an ability to download an application without including an indication of a given application of the plurality of applications in the first set of applications,
  in accordance with the determination that the first set of applications includes only the respective application, the respective selectable user interface element indicates an ability to download the respective application.

16. The method of claim 1, wherein the second set of applications does not include at least one application in the first set of applications via which the respective media is available for viewing, the method further comprising:
  receiving, via the one or more input devices, selection of the respective selectable user interface element; and
  in response to receiving the selection of the respective selectable user interface element:
    in accordance with a determination that the first set of applications includes a plurality of applications on which the electronic device is entitled to view the respective media, displaying, on the display, representations of the plurality of applications in the first set of applications, including a respective representation of the respective application of the first set of applications; and
    in accordance with a determination that the first set of applications includes only the respective application on which the electronic device is entitled to view the respective media, downloading the respective application to the electronic device.

17. The method of claim 16, wherein the first set of applications includes a plurality of applications on which the electronic device is entitled to view the respective media, the method further comprising:
  receiving, via the one or more input devices, selection of the respective representation of the respective application; and
  in response to receiving the selection of the respective representation, downloading the respective application to the electronic device.

18. The method of claim 16, wherein:
  in accordance with the determination that the first set of applications includes a plurality of applications on which the electronic device is entitled to view the respective media, the respective selectable user interface element indicates an ability to download an application without including an indication of a given application of the plurality of applications in the first set of applications,
  in accordance with the determination that the first set of applications includes only the respective application on which the electronic device is entitled to view the respective media, the respective selectable user interface element indicates an ability to download the respective application.

19. The method of claim 16, wherein the first set of applications includes no applications on which the electronic device is entitled to view the respective media, the method further comprising:
  in response to receiving the selection of the respective selectable user interface element:
    in accordance with a determination that the first set of applications includes a second plurality of applications, displaying, on the display, representations of the second plurality of applications in the first set of applications, including a respective representation of the respective application of the first set of applications; and
    in accordance with a determination that the second set of applications includes only the respective application from the first set of applications, downloading the respective application to the electronic device.

20. The method of claim 19, wherein the first set of applications includes the second plurality of applications, the method further comprising:
  receiving, via the one or more input devices, selection of the respective representation of the respective application; and
  in response to receiving the selection of the respective representation, downloading the respective application to the electronic device.

21. The method of claim 19, wherein:
  in accordance with the determination that the first set of applications includes a second plurality of applications, the respective selectable user interface element indicates an ability to download an application without including an indication of a given application of the second plurality of applications in the first set of applications, in accordance with the determination that the first set of applications includes only the respective application, the respective selectable user interface element indicates an ability to download the respective application.

22. The method of claim 1, wherein:

the second set of applications does not include at least one application in the first set of applications via which the respective media is available for viewing, in accordance with a determination that the first set of applications includes at least one application, the respective selectable user interface element indicates an ability to download an application, in accordance with a determination that the first set of applications includes no applications, the respective selectable user interface element indicates an ability to view additional information about the respective media, without including the indication of the ability to download an application.

23. The method of claim 1, wherein in accordance with a determination that the first set of applications includes no applications, the respective selectable user interface element indicates an ability to view additional information about the respective media.

24. The method of claim 1, wherein determining that the first set of applications includes no applications includes:

in accordance with a determination that the respective media is not available on an application at any time, determining that the first set of applications includes no applications; and in accordance with a determination that the respective media is not available on an application at a current time, but is available on an application at a later time, determining that the first set of applications includes no applications.

25. The method of claim 1, further comprising:

in response to receiving the input corresponding to the request for information about the user-specified topic: concurrently displaying, on the display:

the representation of the respective media, and the respective selectable user interface element associated with the respective media, wherein the respective selectable user interface element is selectable to initiate a process for launching a respective application of the first set of applications; and a representation of second respective media that is available for viewing on a third set of applications, and a second respective selectable user interface element that is associated with the second respective media, wherein the second respective selectable user interface element is selectable to initiate a process for launching a respective application of the third set of applications.

26. The method of claim 25, wherein:

in accordance with a determination that the respective media and the second respective media have different states, the respective application of the first set of applications is different from the respective application of the third set of applications, in accordance with a determination that the respective media and the second respective media have a same state, the respective application of the first set of applications is the respective application of the third set of applications.

27. The method of claim 25, wherein:

in accordance with a determination that the electronic device is entitled to view the respective media and the second respective media on different applications, the respective application of the first set of applications is different from the respective application of the third set of applications, in accordance with a determination that the electronic device is entitled to view the respective media and the second respective media on a same application, the respective application of the first set of applications is the respective application of the third set of applications.

28. The method of claim 1, wherein the representation of the respective media that is available for viewing on the first set of applications and the respective selectable user interface element associated with the respective media are displayed in a system user interface of the electronic device, which is not a user interface of any application in the first set of applications.

29. An electronic device, comprising:

one or more processors in communication with a display and one or more input devices;

memory; and one or more programs, wherein the one or more programs are stored in the memory and configured to be executed by the one or more processors, the one or more programs including instructions for:

receiving, via the one or more input devices, an input corresponding to a request for information about a user-specified topic; and in response to receiving the input corresponding to the request for information about the user-specified topic, displaying, on the display, information about media that is relevant to the user-specified topic, including concurrently displaying:

a representation of respective media that is available for viewing on a first set of applications that correspond to respective media content providers, the electronic device having a second set of applications downloaded on it, and a respective selectable user interface element associated with the respective media, wherein:

in accordance with a determination that the second set of applications includes at least one application in the first set of applications via which the respective media is available for viewing from a respective media content provider and a user of the electronic device is entitled to view the respective media from the respective media content provider, the respective selectable user interface element is selectable to initiate a process to display a respective application of the first set of applications and view the respective media via the respective media provider in the respective application;

in accordance with the determination that the second set of applications includes at least one application in the first set of applications via which the respective media is available for viewing from the respective media content provider and the user of the electronic device is not entitled to view the respective media from the respective media content provider, the respective selectable user interface element is selectable to initiate the process to display the respective application without viewing the respective media in the respective application; and in accordance with a determination that the second set of applications does not include at least one application in the first set of applications via which the respective media is available for viewing, the respective selectable user interface element is selectable to initiate a process to download the respective application of the first set of applications corresponding to the respective media provider.

30. A non-transitory computer readable storage medium storing one or more programs, the one or more programs comprising instructions, which when executed by one or more processors of an electronic device in communication with a display and one or more input devices, cause the electronic device to:
receive, via the one or more input devices, an input corresponding to a request for information about a user-specified topic; and
in response to receiving the input corresponding to the request for information about the user-specified topic, display, on the display, information about media that is relevant to the user-specified topic, including concurrently displaying:
a representation of respective media that is available for viewing on a first set of applications that correspond to respective media content providers, the electronic device having a second set of applications downloaded on it, and
a respective selectable user interface element associated with the respective media, wherein:
in accordance with a determination that the second set of applications includes at least one application in the first set of applications via which the respective media is available for viewing from a respective media content provider and a user of the electronic device is entitled to view the respective media from the respective media content provider, the respective selectable user interface element is selectable to initiate a process to display a respective application of the first set of applications and view the respective media via the respective media provider in the respective application;
in accordance with the determination that the second set of applications includes at least one application in the first set of applications via which the respective media is available for viewing from the respective media content provider and the user of the electronic device is not entitled to view the respective media from the respective media content provider, the respective selectable user interface element is selectable to initiate the process to display the respective application without viewing the respective media in the respective application; and
in accordance with a determination that the second set of applications does not include at least one application in the first set of applications via which the respective media is available for viewing, the respective selectable user interface element is selectable to initiate a process to download the respective application of the first set of applications corresponding to the respective media provider.

31. The method of claim 1, wherein the second set of applications includes a first application in the first set of applications via which the respective media is available for viewing from a first media content provider and a second application in the first set of applications via which the respective media is available for viewing from a second media content provider, different from the first media content provider, the method further comprising:
receiving, via the one or more input devices, selection of the respective selectable user interface element; and
in response to receiving the selection of the respective selectable user interface element:
in accordance with a determination that the user of the electronic device is entitled to view the respective media from the first media content provider, initiating a process to display the first application of the first set of applications and view the respective media in the first application; and
in accordance with a determination that the user is not entitled to view the respective media from the first media content provider and the user is entitled to view the respective media from the second media content provider, initiating a process to display the second application of the first set of applications and view the respective media in the second application.

32. The electronic device of claim 29, wherein the second set of applications includes at least one application in the first set of applications via which the respective media is available for viewing, the one or more programs further including instructions for:
receiving, via the one or more input devices, selection of the respective selectable user interface element; and
in response to receiving the selection of the respective selectable user interface element:
in accordance with a determination that the second set of applications includes a plurality of applications in the first set of applications, displaying, on the display, representations of the plurality of applications in the first set of applications, including a respective representation of the respective application of the first set of applications; and
in accordance with a determination that the second set of applications includes only the respective application from the first set of applications, displaying, on the display, the respective application to view the respective media.

33. The electronic device of claim 32, wherein the second set of applications includes a plurality of applications in the first set of applications, the one or more programs further including instructions for:
receiving, via the one or more input devices, selection of the respective representation of the respective application; and
in response to receiving the selection of the respective representation, displaying, on the display, the respective application to view the respective media.

34. The electronic device of claim 32, wherein:
in accordance with the determination that the second set of applications includes a plurality of applications in the first set of applications, the respective selectable user interface element indicates an ability to view the respective media without including an indication of a given application of the plurality of applications in the first set of applications,
in accordance with the determination that the second set of applications includes only the respective application from the first set of applications, the respective selectable user interface element indicates the ability to view the respective media and includes an indication of the respective application via which the respective media is viewable.

35. The electronic device of claim 29, wherein the second set of applications includes at least one application in the first set of applications via which the respective media is available for viewing, the one or more programs further including instructions for:
   receiving, via the one or more input devices, selection of the respective selectable user interface element; and
   in response to receiving the selection of the respective selectable user interface element:
      in accordance with a determination that the second set of applications includes a plurality of applications in the first set of applications on which the electronic device is entitled to view the respective media, displaying, on the display, representations of the plurality of applications in the first set of applications, including a respective representation of the respective application of the first set of applications; and
      in accordance with a determination that the second set of applications includes only the respective application from the first set of applications on which the electronic device is entitled to view the respective media, displaying, on the display, the respective application to view the respective media.

36. The electronic device of claim 35, wherein the second set of applications includes a plurality of applications in the first set of applications on which the electronic device is entitled to view the respective media, the one or more programs further including instructions for:
   receiving, via the one or more input devices, selection of the respective representation of the respective application; and
   in response to receiving the selection of the respective representation, displaying, on the display, the respective application to view the respective media.

37. The electronic device of claim 35, wherein:
   in accordance with the determination that the second set of applications includes a plurality of applications in the first set of applications on which the electronic device is entitled to view the respective media, the respective selectable user interface element indicates an ability to view the respective media without including an indication of a given application of the plurality of applications in the first set of applications,
   in accordance with the determination that the second set of applications includes only the respective application from the first set of applications on which the electronic device is entitled to view the respective media, the respective selectable user interface element indicates the ability to view the respective media and includes an indication of the respective application via which the respective media is viewable.

38. The electronic device of claim 35, wherein:
   in accordance with a determination that the second set of applications includes at least one application in the first set of applications on which the electronic device is entitled to view the respective media, the respective selectable user interface element indicates an ability to view the respective media,
   in accordance with a determination that the second set of applications includes no applications from the first set of applications on which the electronic device is entitled to view the respective media, the respective selectable user interface element indicates an ability to launch the respective application, without including the indication of the ability to view the respective media.

39. The electronic device of claim 35, wherein the second set of applications includes no applications from the first set of applications on which the electronic device is entitled to view the respective media, the one or more programs further including instructions for:
   in response to receiving the selection of the respective selectable user interface element:
      in accordance with a determination that the second set of applications includes a second plurality of applications in the first set of applications, displaying, on the display, representations of the second plurality of applications in the first set of applications, including a respective representation of the respective application of the first set of applications; and
      in accordance with a determination that the second set of applications includes only the respective application from the first set of applications, displaying, on the display, the respective application, without displaying the respective media.

40. The electronic device of claim 39, wherein the second set of applications includes the second plurality of applications in the first set of applications, the one or more programs further including instructions for:
   receiving, via the one or more input devices, selection of the respective representation of the respective application; and
   in response to receiving the selection of the respective representation, displaying, on the display, the respective application, without displaying the respective media.

41. The electronic device of claim 40, wherein:
   in accordance with the determination that the second set of applications includes the second plurality of applications in the first set of applications, the respective selectable user interface element indicates an ability to launch an application without including an indication of a given application of the second plurality of applications in the first set of applications, and without including an indication of an ability to view the respective media,
   in accordance with the determination that the second set of applications includes only the respective application from the first set of applications, the respective selectable user interface element indicates an ability to launch the respective application, without including the indication of the ability to view the respective media.

42. The electronic device of claim 29, wherein the second set of applications includes a plurality of applications in the first set of applications on which the electronic device is entitled to view the respective media, the one or more programs further including instructions for:
   receiving, via the one or more input devices, selection of the respective selectable user interface element; and
   in response to receiving the selection of the respective selectable user interface element:
      in accordance with a determination that the respective application in the plurality of applications in the first set of applications is preferred to other applications in the plurality of applications in the first set of applications, displaying, on the display, the respective application to view the respective media.

43. The electronic device of claim 29, wherein the second set of applications does not include at least one application in the first set of applications via which the respective media is available for viewing, the one or more programs further including instructions for:

receiving, via the one or more input devices, selection of the respective selectable user interface element; and in response to receiving the selection of the respective selectable user interface element:

in accordance with a determination that the first set of applications includes a plurality of applications, displaying, on the display, representations of the plurality of applications in the first set of applications, including a respective representation of the respective application of the first set of applications; and in accordance with a determination that the first set of applications includes only the respective application, downloading the respective application to the electronic device.

44. The electronic device of claim 43, wherein the first set of applications includes a plurality of applications, the one or more programs further including instructions for:

receiving, via the one or more input devices, selection of the respective representation of the respective application; and in response to receiving the selection of the respective representation, downloading the respective application to the electronic device.

45. The electronic device of claim 44, wherein:

in accordance with the determination that the first set of applications includes the plurality of applications, the respective selectable user interface element indicates an ability to download an application without including an indication of a given application of the plurality of applications in the first set of applications, in accordance with the determination that the first set of applications includes only the respective application, the respective selectable user interface element indicates an ability to download the respective application.

46. The electronic device of claim 29, wherein the second set of applications does not include at least one application in the first set of applications via which the respective media is available for viewing, the one or more programs further including instructions for:

receiving, via the one or more input devices, selection of the respective selectable user interface element; and in response to receiving the selection of the respective selectable user interface element:

in accordance with a determination that the first set of applications includes a plurality of applications on which the electronic device is entitled to view the respective media, displaying, on the display, representations of the plurality of applications in the first set of applications, including a respective representation of the respective application of the first set of applications; and in accordance with a determination that the first set of applications includes only the respective application on which the electronic device is entitled to view the respective media, downloading the respective application to the electronic device.

47. The electronic device of claim 46, wherein the first set of applications includes a plurality of applications on which the electronic device is entitled to view the respective media, the one or more programs further including instructions for:

receiving, via the one or more input devices, selection of the respective representation of the respective application; and in response to receiving the selection of the respective representation, downloading the respective application to the electronic device.

48. The electronic device of claim 46, wherein:

in accordance with the determination that the first set of applications includes a plurality of applications on which the electronic device is entitled to view the respective media, the respective selectable user interface element indicates an ability to download an application without including an indication of a given application of the plurality of applications in the first set of applications, in accordance with the determination that the first set of applications includes only the respective application on which the electronic device is entitled to view the respective media, the respective selectable user interface element indicates an ability to download the respective application.

49. The electronic device of claim 46, wherein the first set of applications includes no applications on which the electronic device is entitled to view the respective media, the one or more programs further including instructions for:

in response to receiving the selection of the respective selectable user interface element:

in accordance with a determination that the first set of applications includes a second plurality of applications, displaying, on the display, representations of the second plurality of applications in the first set of applications, including a respective representation of the respective application of the first set of applications; and in accordance with a determination that the second set of applications includes only the respective application from the first set of applications, downloading the respective application to the electronic device.

50. The electronic device of claim 49, wherein the first set of applications includes the second plurality of applications, the one or more programs further including instructions for:

receiving, via the one or more input devices, selection of the respective representation of the respective application; and in response to receiving the selection of the respective representation, downloading the respective application to the electronic device.

51. The electronic device of claim 49, wherein:

in accordance with the determination that the first set of applications includes a second plurality of applications, the respective selectable user interface element indicates an ability to download an application without including an indication of a given application of the second plurality of applications in the first set of applications, in accordance with the determination that the first set of applications includes only the respective application, the respective selectable user interface element indicates an ability to download the respective application.

52. The electronic device of claim 29, wherein:

the second set of applications does not include at least one application in the first set of applications via which the respective media is available for viewing, in accordance with a determination that the first set of applications includes at least one application, the respective selectable user interface element indicates an ability to download an application, in accordance with a determination that the first set of applications includes no applications, the respective selectable user interface element indicates an ability to view additional information about the respective media, without including the indication of the ability to download an application.

53. The electronic device of claim 29, wherein in accordance with a determination that the first set of applications includes no applications, the respective selectable user interface element indicates an ability to view additional information about the respective media.

54. The electronic device of claim 29, wherein determining that the first set of applications includes no applications includes:
in accordance with a determination that the respective media is not available on an application at any time, determining that the first set of applications includes no applications; and
in accordance with a determination that the respective media is not available on an application at a current time, but is available on an application at a later time, determining that the first set of applications includes no applications.

55. The electronic device of claim 29, the one or more programs further including instructions for:
in response to receiving the input corresponding to the request for information about the user-specified topic: concurrently displaying, on the display:
the representation of the respective media, and the respective selectable user interface element associated with the respective media, wherein the respective selectable user interface element is selectable to initiate a process for launching a respective application of the first set of applications; and
a representation of second respective media that is available for viewing on a third set of applications, and a second respective selectable user interface element that is associated with the second respective media, wherein the second respective selectable user interface element is selectable to initiate a process for launching a respective application of the third set of applications.

56. The electronic device of claim 55, wherein:
in accordance with a determination that the respective media and the second respective media have different states, the respective application of the first set of applications is different from the respective application of the third set of applications,
in accordance with a determination that the respective media and the second respective media have a same state, the respective application of the first set of applications is the respective application of the third set of applications.

57. The electronic device of claim 55, wherein:
in accordance with a determination that the electronic device is entitled to view the respective media and the second respective media on different applications, the respective application of the first set of applications is different from the respective application of the third set of applications,
in accordance with a determination that the electronic device is entitled to view the respective media and the second respective media on a same application, the respective application of the first set of applications is the respective application of the third set of applications.

58. The electronic device of claim 29, wherein the representation of the respective media that is available for viewing on the first set of applications and the respective selectable user interface element associated with the respective media are displayed in a system user interface of the electronic device, which is not a user interface of any application in the first set of applications.

59. The electronic device of claim 29, wherein the second set of applications includes a first application in the first set of applications via which the respective media is available for viewing from a first media content provider and a second application in the first set of applications via which the respective media is available for viewing from a second media content provider, different from the first media content provider, the one or more programs further including instructions for:
receiving, via the one or more input devices, selection of the respective selectable user interface element; and
in response to receiving the selection of the respective selectable user interface element:
in accordance with a determination that the user of the electronic device is entitled to view the respective media from the first media content provider, initiating a process to display the first application of the first set of applications and view the respective media in the first application; and
in accordance with a determination that the user is not entitled to view the respective media from the first media content provider and the user is entitled to view the respective media from the second media content provider, initiating a process to display the second application of the first set of applications and view the respective media in the second application.

60. The computer readable storage medium of claim 30, wherein the second set of applications includes at least one application in the first set of applications via which the respective media is available for viewing, the one or more programs further comprising instructions which cause the electronic device to:
receive, via the one or more input devices, selection of the respective selectable user interface element; and
in response to receiving the selection of the respective selectable user interface element:
in accordance with a determination that the second set of applications includes a plurality of applications in the first set of applications, display, on the display, representations of the plurality of applications in the first set of applications, including a respective representation of the respective application of the first set of applications; and
in accordance with a determination that the second set of applications includes only the respective application from the first set of applications, display, on the display, the respective application to view the respective media.

61. The computer readable storage medium of claim 60, wherein the second set of applications includes a plurality of applications in the first set of applications, the one or more programs further comprising instructions which cause the electronic device to:
receive, via the one or more input devices, selection of the respective representation of the respective application; and
in response to receiving the selection of the respective representation, display, on the display, the respective application to view the respective media.

62. The computer readable storage medium of claim 60, wherein:
in accordance with the determination that the second set of applications includes a plurality of applications in the first set of applications, the respective selectable user interface element indicates an ability to view the respective media without including an indication of a given application of the plurality of applications in the first set of applications, in accordance with the determination that the second set of applications includes only the respective application from the first set of applications, the respective selectable user interface element indicates the ability to view the respective media and includes an indication of the respective application via which the respective media is viewable.

63. The computer readable storage medium of claim 30, wherein the second set of applications includes at least one application in the first set of applications via which the respective media is available for viewing, the one or more programs further comprising instructions which cause the electronic device to:

receive, via the one or more input devices, selection of the respective selectable user interface element; and in response to receiving the selection of the respective selectable user interface element:

in accordance with a determination that the second set of applications includes a plurality of applications in the first set of applications on which the electronic device is entitled to view the respective media, display, on the display, representations of the plurality of applications in the first set of applications, including a respective representation of the respective application of the first set of applications; and in accordance with a determination that the second set of applications includes only the respective application from the first set of applications on which the electronic device is entitled to view the respective media, display, on the display, the respective application to view the respective media.

64. The computer readable storage medium of claim 63, wherein the second set of applications includes a plurality of applications in the first set of applications on which the electronic device is entitled to view the respective media, the one or more programs further comprising instructions which cause the electronic device to:

receive, via the one or more input devices, selection of the respective representation of the respective application; and in response to receiving the selection of the respective representation, display, on the display, the respective application to view the respective media.

65. The computer readable storage medium of claim 63, wherein:

in accordance with the determination that the second set of applications includes a plurality of applications in the first set of applications on which the electronic device is entitled to view the respective media, the respective selectable user interface element indicates an ability to view the respective media without including an indication of a given application of the plurality of applications in the first set of applications, in accordance with the determination that the second set of applications includes only the respective application from the first set of applications on which the electronic device is entitled to view the respective media, the respective selectable user interface element indicates the ability to view the respective media and includes an indication of the respective application via which the respective media is viewable.

66. The computer readable storage medium of claim 63, wherein:

in accordance with a determination that the second set of applications includes at least one application in the first set of applications on which the electronic device is entitled to view the respective media, the respective selectable user interface element indicates an ability to view the respective media, in accordance with a determination that the second set of applications includes no applications from the first set of applications on which the electronic device is entitled to view the respective media, the respective selectable user interface element indicates an ability to launch the respective application, without including the indication of the ability to view the respective media.

67. The computer readable storage medium of claim 63, wherein the second set of applications includes no applications from the first set of applications on which the electronic device is entitled to view the respective media, the one or more programs further comprising instructions which cause the electronic device to:

in response to receiving the selection of the respective selectable user interface element:

in accordance with a determination that the second set of applications includes a second plurality of applications in the first set of applications, display, on the display, representations of the second plurality of applications in the first set of applications, including a respective representation of the respective application of the first set of applications; and in accordance with a determination that the second set of applications includes only the respective application from the first set of applications, display, on the display, the respective application, without displaying the respective media.

68. The computer readable storage medium of claim 67, wherein the second set of applications includes the second plurality of applications in the first set of applications, the one or more programs further comprising instructions which cause the electronic device to:

receive, via the one or more input devices, selection of the respective representation of the respective application; and in response to receiving the selection of the respective representation, display, on the display, the respective application, without displaying the respective media.

69. The computer readable storage medium of claim 67, wherein:

in accordance with the determination that the second set of applications includes the second plurality of applications in the first set of applications, the respective selectable user interface element indicates an ability to launch an application without including an indication of a given application of the second plurality of applications in the first set of applications, and without including an indication of an ability to view the respective media, in accordance with the determination that the second set of applications includes only the respective application from the first set of applications, the respective selectable user interface element indicates an ability to launch the respective application, without including the indication of the ability to view the respective media.

70. The computer readable storage medium of claim 29, wherein the second set of applications includes a plurality of applications in the first set of applications on which the electronic device is entitled to view the respective media, the one or more programs further comprising instructions which cause the electronic device to:

receive, via the one or more input devices, selection of the respective selectable user interface element; and in response to receiving the selection of the respective selectable user interface element:

in accordance with a determination that the respective application in the plurality of applications in the first set of applications is preferred to other applications in the plurality of applications in the first set of applications, display, on the display, the respective application to view the respective media.

71. The computer readable storage medium of claim 30, wherein the second set of applications does not include at least one application in the first set of applications via which the respective media is available for viewing, the one or more programs further comprising instructions which cause the electronic device to:

receive, via the one or more input devices, selection of the respective selectable user interface element; and in response to receiving the selection of the respective selectable user interface element:

in accordance with a determination that the first set of applications includes a plurality of applications, display, on the display, representations of the plurality of applications in the first set of applications, including a respective representation of the respective application of the first set of applications; and in accordance with a determination that the first set of applications includes only the respective application, download the respective application to the electronic device.

72. The computer readable storage medium of claim 71, wherein the first set of applications includes a plurality of applications, the one or more programs further comprising instructions which cause the electronic device to:

receive, via the one or more input devices, selection of the respective representation of the respective application; and in response to receiving the selection of the respective representation, download the respective application to the electronic device.

73. The computer readable storage medium of claim 72, wherein:

in accordance with the determination that the first set of applications includes the plurality of applications, the respective selectable user interface element indicates an ability to download an application without including an indication of a given application of the plurality of applications in the first set of applications, in accordance with the determination that the first set of applications includes only the respective application, the respective selectable user interface element indicates an ability to download the respective application.

74. The computer readable storage medium of claim 30, wherein the second set of applications does not include at least one application in the first set of applications via which the respective media is available for viewing, the one or more programs further comprising instructions which cause the electronic device to:

receive, via the one or more input devices, selection of the respective selectable user interface element; and in response to receiving the selection of the respective selectable user interface element:

in accordance with a determination that the first set of applications includes a plurality of applications on which the electronic device is entitled to view the respective media, display, on the display, representations of the plurality of applications in the first set of applications, including a respective representation of the respective application of the first set of applications; and in accordance with a determination that the first set of applications includes only the respective application on which the electronic device is entitled to view the respective media, download the respective application to the electronic device.

75. The computer readable storage medium of claim 74, wherein the first set of applications includes a plurality of applications on which the electronic device is entitled to view the respective media, the one or more programs further comprising instructions which cause the electronic device to:

receive, via the one or more input devices, selection of the respective representation of the respective application; and in response to receiving the selection of the respective representation, download the respective application to the electronic device.

76. The computer readable storage medium of claim 74, wherein:

in accordance with the determination that the first set of applications includes a plurality of applications on which the electronic device is entitled to view the respective media, the respective selectable user interface element indicates an ability to download an application without including an indication of a given application of the plurality of applications in the first set of applications, in accordance with the determination that the first set of applications includes only the respective application on which the electronic device is entitled to view the respective media, the respective selectable user interface element indicates an ability to download the respective application.

77. The computer readable storage medium of claim 74, wherein the first set of applications includes no applications on which the electronic device is entitled to view the respective media, the one or more programs further comprising instructions which cause the electronic device to:

in response to receiving the selection of the respective selectable user interface element:

in accordance with a determination that the first set of applications includes a second plurality of applications, display, on the display, representations of the second plurality of applications in the first set of applications, including a respective representation of the respective application of the first set of applications; and in accordance with a determination that the second set of applications includes only the respective application from the first set of applications, download the respective application to the electronic device.

78. The computer readable storage medium of claim 77, wherein the first set of applications includes the second plurality of applications, the one or more programs further comprising instructions which cause the electronic device to:

receive, via the one or more input devices, selection of the respective representation of the respective application; and in response to receiving the selection of the respective representation, download the respective application to the electronic device.

79. The computer readable storage medium of claim 77, wherein:

in accordance with the determination that the first set of applications includes a second plurality of applications, the respective selectable user interface element indicates an ability to download an application without including an indication of a given application of the second plurality of applications in the first set of applications, in accordance with the determination that the first set of applications includes only the respective application, the respective selectable user interface element indicates an ability to download the respective application.

80. The computer readable storage medium of claim 30, wherein:

the second set of applications does not include at least one application in the first set of applications via which the respective media is available for viewing, in accordance with a determination that the first set of applications includes at least one application, the respective selectable user interface element indicates an ability to download an application, in accordance with a determination that the first set of applications includes no applications, the respective selectable user interface element indicates an ability to view additional information about the respective media, without including the indication of the ability to download an application.

81. The computer readable storage medium of claim 30, wherein in accordance with a determination that the first set of applications includes no applications, the respective selectable user interface element indicates an ability to view additional information about the respective media.

82. The computer readable storage medium of claim 30, wherein determining that the first set of applications includes no applications includes:

in accordance with a determination that the respective media is not available on an application at any time, determining that the first set of applications includes no applications; and in accordance with a determination that the respective media is not available on an application at a current time, but is available on an application at a later time, determining that the first set of applications includes no applications.

83. The computer readable storage medium of claim 30, the one or more programs further comprising instructions which cause the electronic device to:

in response to receiving the input corresponding to the request for information about the user-specified topic: concurrently display, on the display:

the representation of the respective media, and the respective selectable user interface element associated with the respective media, wherein the respective selectable user interface element is selectable to initiate a process for launching a respective application of the first set of applications; and a representation of second respective media that is available for viewing on a third set of applications, and a second respective selectable user interface element that is associated with the second respective media, wherein the second respective selectable user interface element is selectable to initiate a process for launching a respective application of the third set of applications.

84. The computer readable storage medium of claim 83, wherein:

in accordance with a determination that the respective media and the second respective media have different states, the respective application of the first set of applications is different from the respective application of the third set of applications, in accordance with a determination that the respective media and the second respective media have a same state, the respective application of the first set of applications is the respective application of the third set of applications.

85. The computer readable storage medium of claim 84, wherein:

in accordance with a determination that the electronic device is entitled to view the respective media and the second respective media on different applications, the respective application of the first set of applications is different from the respective application of the third set of applications, in accordance with a determination that the electronic device is entitled to view the respective media and the second respective media on a same application, the respective application of the first set of applications is the respective application of the third set of applications.

86. The computer readable storage medium of claim 30, wherein the representation of the respective media that is available for viewing on the first set of applications and the respective selectable user interface element associated with the respective media are displayed in a system user interface of the electronic device, which is not a user interface of any application in the first set of applications.

87. The computer readable storage medium of claim 30, wherein the second set of applications includes a first application in the first set of applications via which the respective media is available for viewing from a first media content provider and a second application in the first set of applications via which the respective media is available for viewing from a second media content provider, different from the first media content provider, the one or more programs further comprising instructions which cause the electronic device to:

receive, via the one or more input devices, selection of the respective selectable user interface element; and in response to receiving the selection of the respective selectable user interface element:

in accordance with a determination that the user of the electronic device is entitled to view the respective media from the first media content provider, initiate a process to display the first application of the first set of applications and view the respective media in the first application; and in accordance with a determination that the user is not entitled to view the respective media from the first media content provider and the user is entitled to view the respective media from the second media content provider, initiate a process to display the second application of the first set of applications and view the respective media in the second application.

\* \* \* \* \*

UNITED STATES PATENT AND TRADEMARK OFFICE
CERTIFICATE OF CORRECTION

PATENT NO. : 10,642,449 B2  
APPLICATION NO. : 15/272393  
DATED : May 5, 2020  
INVENTOR(S) : Graham R. Clarke Page 1 of 1

It is certified that error appears in the above-identified patent and that said Letters Patent is hereby corrected as shown below:

In the Claims

In Column 66, Line 32, in Claim 41, delete "claim 40," and insert -- claim 39, --.

In Column 67, Line 25, in Claim 45, delete "claim 44," and insert -- claim 43, --.

In Column 72, Line 62, in Claim 70, delete "claim 29," and insert -- claim 30, --.

In Column 73, Line 41, in Claim 73, delete "claim 72," and insert -- claim 71, --.

In Column 76, Line 14, in Claim 85, delete "claim 84," and insert -- claim 83, --.

Signed and Sealed this  
Thirtieth Day of June, 2020

Andrei Iancu  
*Director of the United States Patent and Trademark Office*